US008300892B2

(12) United States Patent
Iwasaki et al.

(10) Patent No.: US 8,300,892 B2
(45) Date of Patent: Oct. 30, 2012

(54) MOVING OBJECT DETECTION APPARATUS AND MOVING OBJECT DETECTION METHOD

(75) Inventors: Masahiro Iwasaki, Kyoto (JP); Kunio Nobori, Osaka (JP)

(73) Assignee: Panasonic Corporation, Osaka (JP)

( * ) Notice: Subject to any disclaimer, the term of this patent is extended or adjusted under 35 U.S.C. 154(b) by 180 days.

(21) Appl. No.: 12/976,169

(22) Filed: Dec. 22, 2010

(65) Prior Publication Data
US 2011/0091073 A1    Apr. 21, 2011

Related U.S. Application Data

(63) Continuation of application No. PCT/JP2010/004378, filed on Jul. 5, 2010.

(30) Foreign Application Priority Data

Jul. 31, 2009  (JP) .................................. 2009-178788

(51) Int. Cl.
*G06K 9/00* (2006.01)
(52) U.S. Cl. ........ 382/103; 382/107; 382/173; 382/181; 382/203; 382/224; 348/143; 348/155
(58) Field of Classification Search ........................ None
See application file for complete search history.

(56) References Cited

U.S. PATENT DOCUMENTS

| 5,734,737 | A | * | 3/1998 | Chang et al. .................. 382/107 |
| 6,643,387 | B1 | * | 11/2003 | Sethuraman et al. ......... 382/107 |
| 6,804,398 | B2 | * | 10/2004 | Kaneko et al. ................ 382/190 |
| 6,859,554 | B2 | * | 2/2005 | Porikli et al. ................. 382/173 |
| 7,003,156 | B1 | * | 2/2006 | Yamamoto et al. ........... 382/181 |
| 2003/0123704 | A1 | * | 7/2003 | Farmer et al. ................ 382/103 |
| 2006/0045349 | A1 | * | 3/2006 | Yamamoto et al. ........... 382/190 |

FOREIGN PATENT DOCUMENTS

| JP | 8-214289 | 8/1996 |
| JP | 11-66319 | 3/1999 |
| JP | 4456181 | 4/2010 |
| WO | 2010/050110 | 5/2010 |

OTHER PUBLICATIONS

Min et al., "Extraction and Temporal Segmentation of Multiple Motion Trajectories in Human Motion", 2004, (CVPRW'04).*

(Continued)

*Primary Examiner* — Matthew Bella
*Assistant Examiner* — Jason Heidemann
(74) *Attorney, Agent, or Firm* — Wenderoth, Lind & Ponack, L.L.P.

(57) ABSTRACT

To provide a moving object detection apparatus which accurately performs region extraction, regardless of the pose or size of a moving object. The moving object detection apparatus includes: an image receiving unit receiving the video sequence; a motion analysis unit calculating movement trajectories based on motions of the image; a segmentation unit performing segmentation so as to divide the movement trajectories into subsets, and setting a part of the movement trajectories as common points shared by the subsets; a distance calculation unit calculating a distance representing a similarity between a pair of movement trajectories, for each of the subsets; a geodesic distance calculation unit transforming the calculated distance into a geodesic distance; an approximate geodesic distance calculation unit calculating an approximate geodesic distance bridging over the subsets, by integrating geodesic distances including the common points; and a region extraction unit performing clustering on the calculated approximate geodesic distance.

21 Claims, 32 Drawing Sheets

OTHER PUBLICATIONS

Bai et al. "Geodesic Matting: A Framework for Fast Interactive Image and Video Segmentation and Matting", 2008. International Journal on Computer Vision.*

Bai et al. "A Geodesic Framework for Fast Interactive Image and Video Segmentation and Matting", 14-21 Oct. 2007, IEEE ICCV 2007, 1-8.*

Joshua B. Tenenbaum et al., "*A Global Geometric Framework for Nonlinear Dimensionality Reduction*", Science, vol. 290, Dec. 22, 2000.

Vin de Silva et al., "*Global Versus Local Methods in Nonlinear Dimensionality Reduction*", Neural Information Processing Systems 15, pp. 705-712, 2002.

Vin de Silva et al. "*Sparse Multidimensional Scaling using Landmark Points*", Technical Report, Stanford University, Jun. 2004.

P. Anandan, "*A Computational Framework and an Algorithm for the Measurement of Visual Motion*", International Journal of Computer Vision, vol. 2, pp. 283-310, 1989.

Vladimir Kolmogorov et al., "*Computing Visual Correspondence with Occlusions via Graph Cuts*", International Conference on Computer Vision, 2001.

Jianbo Shi et al., "*Good Features to Track*", IEEE Conference on Computer Vision and Pattern Recognition, 1994.

E.W. Dijkstra, "*A Note on Two Problems in Connexion with Graphs*", Numerische Mathematik, pp. 269-271, 1959.

* cited by examiner

FIG. 5
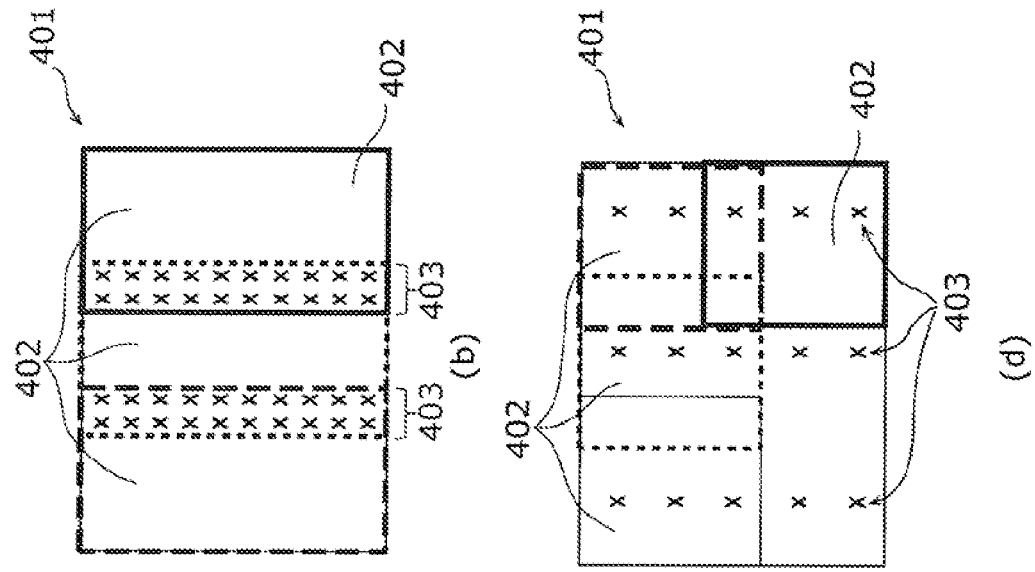
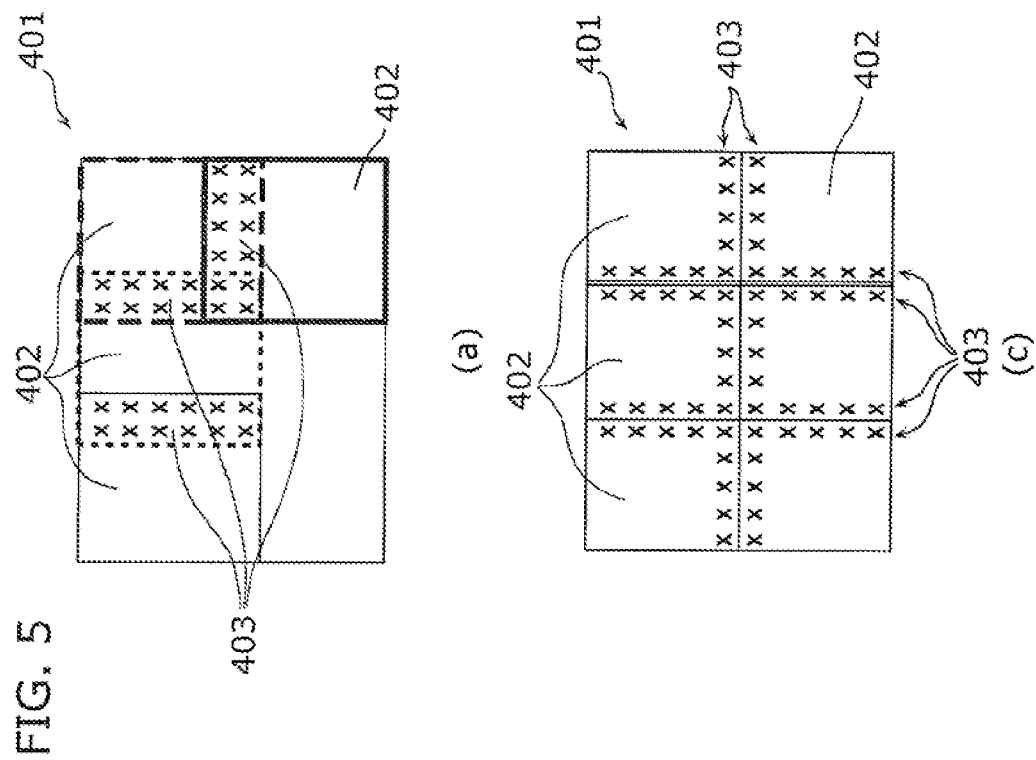

FIG. 17
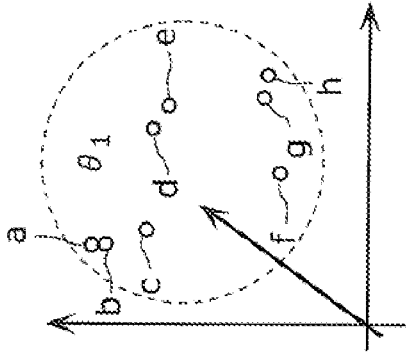
(a) Movement trajectories
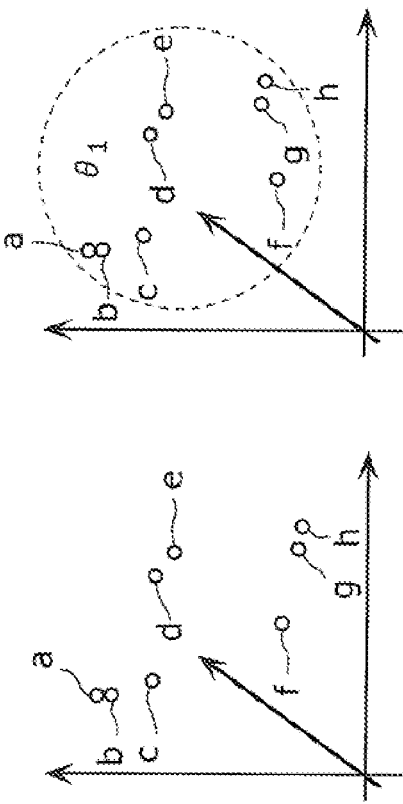
(b) Multidimensional space including movement trajectories
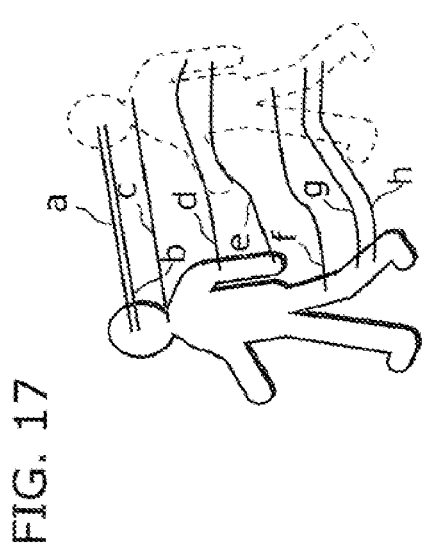
(c) Clustering when threshold $R_k$ is sufficiently large
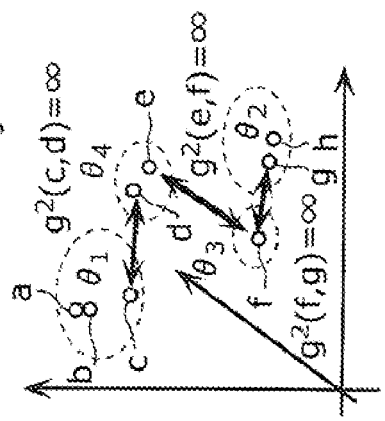
(d) Clustering in the case of threshold $R_1$
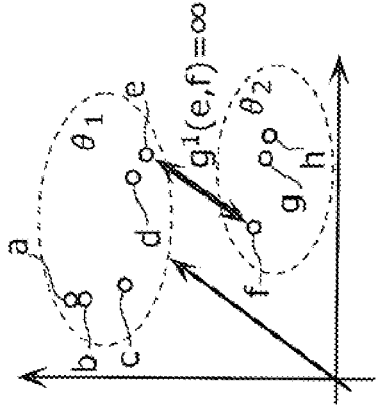
(e) Clustering in the case of threshold $R_2$ FIG. 19
(a)
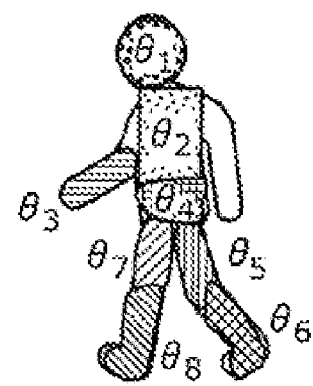
(b)

FIG. 21

| Label | Value and position of pixel | Movement trajectory information of pixel |
|---|---|---|
| $\theta_1$ | Value and position of pixel belonging to $\theta_1$ in the image at time T | $u^1_T, v^1_T, u^1_{T+1}, v^1_{T+1}, \cdots, u^1_{T+t}, v^1_{T+t}$ |
| $\theta_2$ | Value and position of pixel belonging to $\theta_2$ in the image at time T | $u^2_T, v^2_T, u^2_{T+1}, v^2_{T+1}, \cdots, u^2_{T+t}, v^2_{T+t}$ |
| $\theta_3$ | Value and position of pixel belonging to $\theta_3$ in the image at time T | $u^3_T, v^3_T, u^3_{T+1}, v^3_{T+1}, \cdots, u^3_{T+t}, v^3_{T+t}$ |

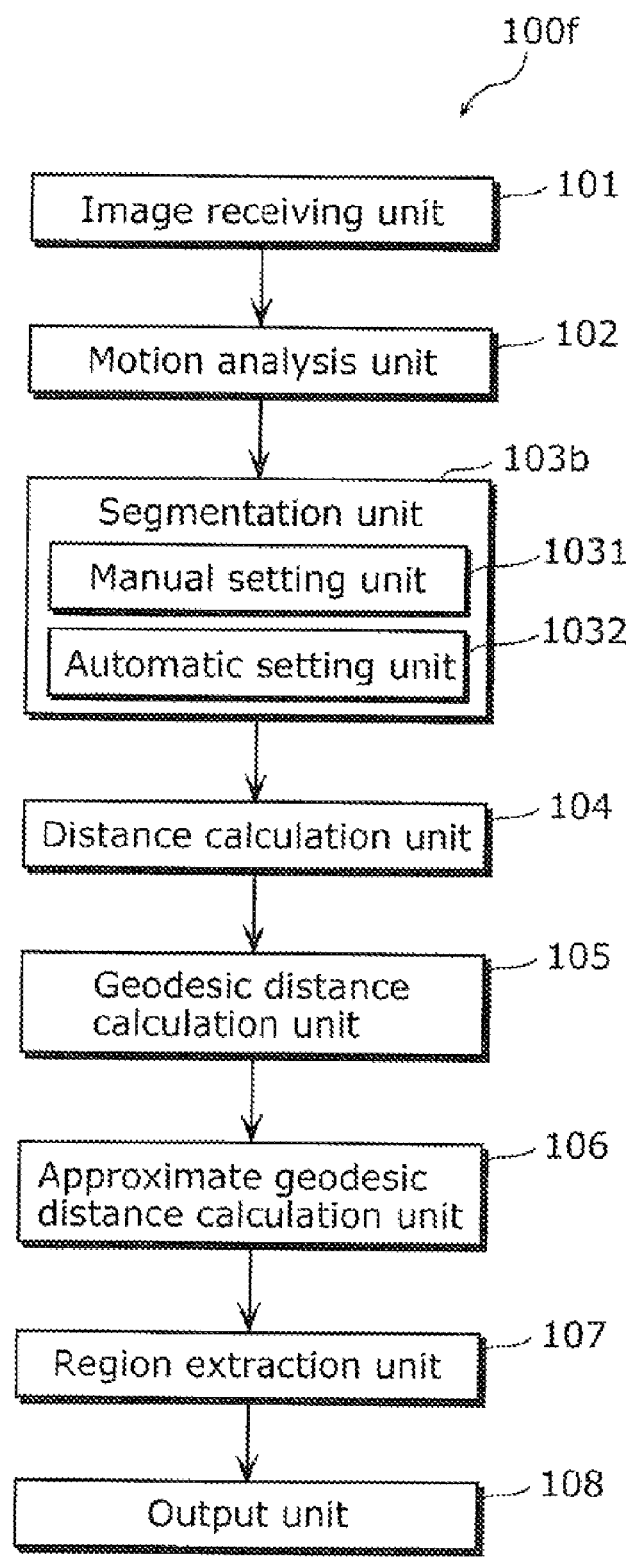

MOVING OBJECT DETECTION APPARATUS AND MOVING OBJECT DETECTION METHOD

CROSS REFERENCE TO RELATED APPLICATION

This is a continuation application of PCT application No. PCT/JP2010/004378 filed on Jul. 5, 2010, designating the United States of America.

BACKGROUND OF THE INVENTION (1) Field of the Invention

The present invention relates to apparatuses which detect a moving object in an image, and particularly relates to an apparatus which detects a moving object in a video sequence including images by performing region extraction to determine a region showing the whole or a part of the moving object such as a person that moves and changes shape in the video sequence, on the basis of motion information on the moving object.

(2) Description of the Related Art

As a method of detecting a moving object such as a person that moves and changes shape or extracting an image region including the moving object, there is a combination of techniques to extract a candidate region showing a target moving object from an image and to apply a previously-provided object model to the extracted candidate region including the target moving object. For example, Japanese Unexamined Patent Application Publication No. 8-214289 (referred to as Patent Reference 1 hereafter) discloses a method whereby a silhouette image of a target moving object such as a person is extracted from an image as a candidate region and a model corresponding to the target moving object is applied to the extracted silhouette image. In the model used here, parts of the target moving object, such as body parts, are parameterized in advance based on knowledge about such a target moving object. With this method, the parameterized model is applied to the image of the target moving object such as a person that moves and changes shape, so that the target moving object can be detected and also the corresponding image region can be extracted.

Moreover, the following method is disclosed by Joshua Tenenbaum, Vin de Silva, and John Langford in "A Global Geometric Framework for Nonlinear Dimensionality Reduction", Science, VOL290, pp. 2319-2322, 22 Dec., 2000 (referred to as Non-Patent Reference 1 hereafter). Using input images obtained by capturing one fixed object from different viewpoints, a Euclidean distance indicating similarity between the images is calculated based on pixel values of the images. Then, geodesic distance transformation and then dimensionality reduction is sequentially performed on the Euclidean distance. As a result, the images captured from the similar viewpoints can be projected at a short distance from one another on a two-dimensional space. Here, Non-Patent Reference 1 discloses that, as compared to conventional linear dimensionality reduction methods such as Principal Component Analysis (PCA), lower dimensionality can be achieved through the geodesic distance transformation, and that nonlinearly-distributed data can also be processed.

Here, suppose that an "N" number of data pieces are to be processed according to the method disclosed in Non-Patent Reference 1. In this case, the aforementioned geodesic distance transformation and dimensionality reduction need to be performed using a matrix having an "$N^2$" number of elements. On this account, it is known, as the problem, that when the number "N" is large, an enormous amount of calculation is required.

To address this problem, the methods of reducing the amount of calculation are disclosed by Vin de Silva and Joshua B. Tenenbaum in "Global Versus Local Methods in Nonlinear Dimensionality Reduction", Neural Information Processing Systems 15, 705-712, 2002 (referred to as Non-Patent Reference 2) and by Vin de Silva and Joshua B. Tenenbaum in "Sparse Multidimensional Scaling using Landmark Points", Technical Report, Stanford University, June 2004 (referred to as Non-Patent Reference 3). To be more specific, a smaller number of landmark points than the number of data points are selected from the data points, and the geodesic distance transformation and dimensionality reduction are performed using a matrix generated using the selected landmark points.

SUMMARY OF THE INVENTION

However, Patent Reference 1 described above has a problem that the moving object cannot be accurately extracted especially in a scene, like a street, where moving objects such as people come and go. According to the region extraction technique typified by the method disclosed in Patent Reference 1, the candidate region including the target moving object needs to be extracted from the picture as explained above. Here, when the candidate region is not accurately extracted, it is impossible to correctly apply, to the candidate region, the parameterized model that corresponds to such a target moving object. Especially in a crowded scene, it is difficult to accurately extract the candidate region. For example, several moving objects may be detected as one moving object and then end up being extracted as the candidate region by mistake. Or, a region having no moving objects, i.e., having no extraction targets, may end up being extracted as the candidate region by mistake. Moreover, even when the candidate region is accurately extracted, the present method still has a problem as follows. Especially in the case where a target is an articulated object such as a human body, there are numerous variations in appearances on the image because of various poses and sizes of the target object. That is to say, a huge number of parameters are required for parameterizing such a target object to obtain a model. This may result in an incorrect matching of the model to the candidate region. To be more specific, the model that does not correspond to the actual pose of the target object is applied to the candidate region. Therefore, the region extraction cannot be accurately performed when the method disclosed in Patent Reference 1 is employed.

A first objective of the present invention is to solve the problem that the candidate region cannot be accurately extracted according to the method disclosed in Patent Reference 1. In order to achieve this objective, the following efficient method of representing the nonlinearly-distributed data that is disclosed in Non-Patent Reference 1 is employed.

The image processing technique typified by the method disclosed in Non-Patent Reference 1 allows images to be projected on an efficiently-reduced low-dimensional space by performing nonlinear processing on distances between the images. Moreover, through geodesic distance transformation and dimensionality reduction, data which is continuously and nonlinearly distributed can be represented efficiently. However, the main objective of Non-Patent Reference 1 is to visualize the similarity between still images by projecting these images on a low-dimensional space. In other words, Non-Patent Reference 1 does not disclose a method of accurately extracting a moving articulated object such as a person while responding to constant variations in pose of the moving articulated object. Also, as described above, Non-Patent Reference 1 has another problem that when the number of input data pieces is large, an enormous amount of calculation is required. Here, according to the technique typified by the methods disclosed in Non-Patent References 2 and 3 for reducing the amount of calculation, data points present between the landmark points, namely, data points which were not selected as landmark points, are linearly interpolated using the selected landmark points. Especially in the case of a moving object such as a person that changes shape, the head and foot move differently. That is, motion is different for each of the parts that belong to the same moving object. For example, when landmark points are located in the head and foot and the linear interpolation is performed between these landmarks, joint motion of arm or knee cannot appropriately detected. On account of this, it is difficult to accurately extract a moving articulated object such as a person while responding to constant variations in pose of the moving articulated object. Moreover, when the target object is not extracted in advance, it is difficult to set landmark points in an image corresponding to an articulated object such as a person.

A second objective of the present invention is to solve the problem associated with the amount of calculation in Non-Patent Reference 1. Thus, the present invention is to solve these two problems, and an objective of the present invention is to provide a moving object detection apparatus which accurately performs region extraction at high speed on a picture including an image of a moving object such as a person that moves and changes shape, regardless of the pose or size of the moving object.

In order to achieve the aforementioned objective, the moving object detection apparatus according to an aspect of the present invention is a moving object detection apparatus which detects a moving object in a video sequence by extracting a region corresponding to a whole or a part of an image of the moving object, the moving object detection apparatus including: an image receiving unit which receives a set of images included in the video sequence; a motion analysis unit which calculates movement trajectories, each of the trajectories being calculated by: detecting a motion of the image between a pair of images included in the set of images, for each pair of blocks included in the pair of images, each block having one or more pixels; and concatenating motions detected from all pairs of images included in the set of images; a segmentation unit which performs segmentation so that the movement trajectories are divided into subsets, and to set a part of the trajectories as common points shared by the subsets; a distance calculation unit which calculates a distance representing a similarity between a pair of trajectories, for each of the subsets; a geodesic distance calculation unit which transforms the distance calculated by the distance calculation unit into a geodesic distance; an approximate geodesic distance calculation unit which calculates an approximate geodesic distance bridging over the subsets, by integrating geodesic distances including the common points, among the geodesic distances obtained by the geodesic distance calculation unit; and a region extraction unit which extracts at least one region from the video sequence, by performing clustering using the calculated approximate geodesic distance so that blocks having similar movement trajectories are classified into one region.

Also, in order to achieve the aforementioned objective, a vector data classification apparatus according to another aspect of the present invention is a vector data classification apparatus which classifies vector data pieces into classes, each class including similar vector data pieces out of the vector data pieces, the vector data classification apparatus including: a vector data receiving unit which receives vector data pieces; a segmentation unit which performs segmentation so that the vector data pieces are divided into subsets each used for calculating a geodesic distance, and to set a part of the vector data pieces included in at least one of the subsets as a common point shared by the subsets; a distance calculation unit which calculates a distance representing a similarity between a pair of vector data pieces, for each of the subsets; a geodesic distance calculation unit which transforms the distance calculated by the distance calculation unit into a geodesic distance which is a length of a path between the pair of vector data pieces via a vector data piece serving as a relay point; an approximate geodesic distance calculation unit which calculates an approximate geodesic distance bridging over the subsets, by integrating geodesic distances including the common points, among the geodesic distances obtained by the geodesic distance calculation unit; and a data classification unit which generates at least one class from the video sequence, by performing clustering using the calculated approximate geodesic distance so that similar vector data pieces are classified into one class.

It should be noted that the present invention can be implemented not only as the moving detection apparatus and the vector data classification apparatus described above, but also as: a moving object detection method and a vector data classification method having, as steps, the components included in the moving detection apparatus and the vector data classification apparatus, respectively; a program causing a computer to execute the steps; and a computer-readable recording medium, such as a CD-ROM, having the program recorded thereon.

From a picture including an image of a moving object such as a person that moves and changes shape, the above apparatus and method according to the present invention can detect the moving object and perform region extraction with accuracy at high speed, regardless of the pose or size of the moving object. Also, based on the result of the detection and extraction, motion of the moving object can be estimated, for example.

FURTHER INFORMATION ABOUT TECHNICAL BACKGROUND TO THIS APPLICATION

The disclosure of Japanese Patent Application No. 2009-178788 filed on Jul. 31, 2009 including specification, drawings and claims is incorporated herein by reference in its entirety.

The disclosure of PCT application No. PCT/JP2010/004378 filed on Jul. 5, 2010, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 5 is a diagram showing examples of processing performed by a segmentation unit in the first embodiment of the present invention.

FIG. 17 is a diagram showing an example of processing performed by a region extraction unit in the third modification of the first embodiment according to the present invention.

FIG. 19 is a diagram showing examples displayed by an image display unit in the fourth modification of the first embodiment according to the present invention.

FIG. 21 is a diagram showing an example of data to be recorded and transmitted in the fifth modification of the first embodiment according to the present invention.

FIG. 32 is a diagram showing an example of a configuration of a moving object detection apparatus in a modification of the embodiments according to the present invention.

DESCRIPTION OF THE PREFERRED EMBODIMENTS

Figure 1:
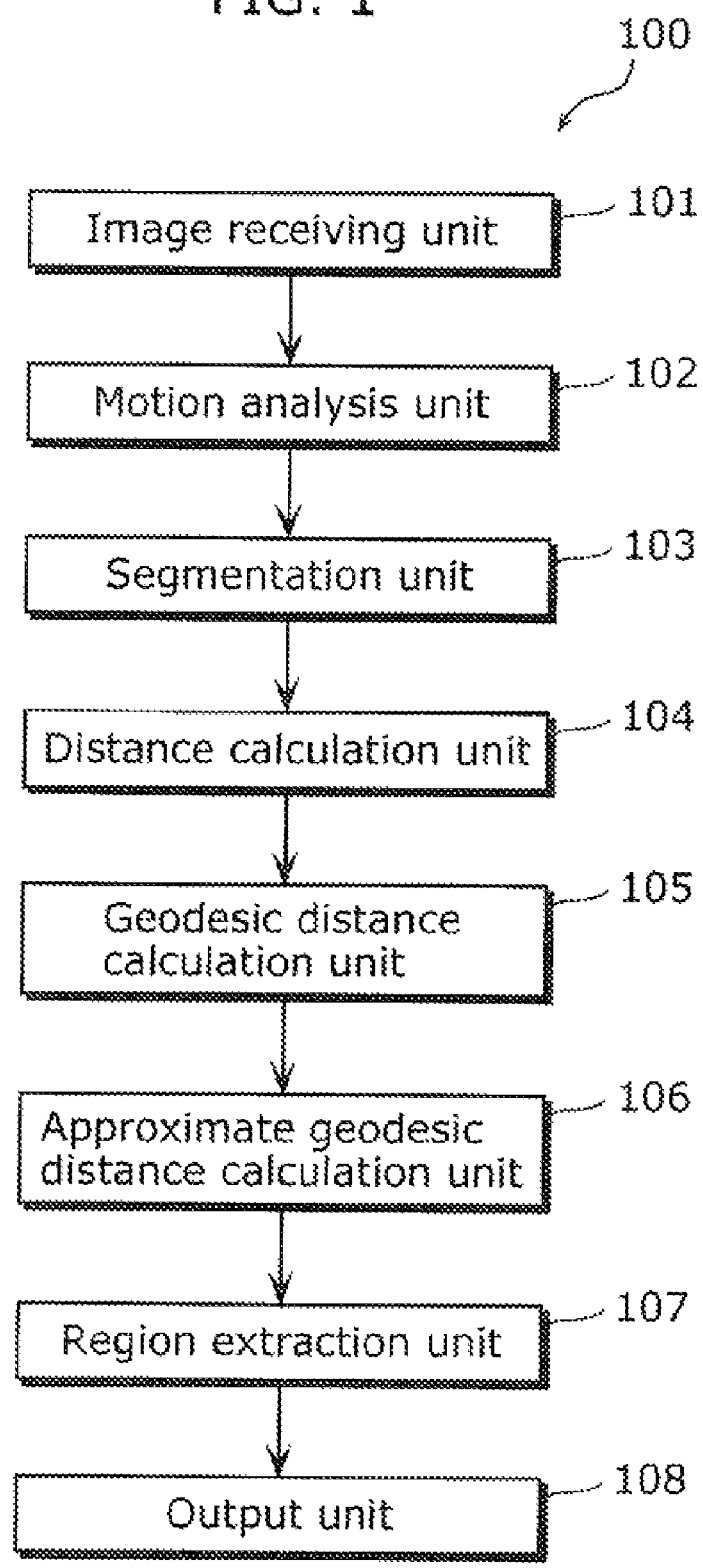
FIG. 1 is a diagram showing a basic configuration of a moving object detection apparatus in a first embodiment of the present invention.

The moving object detection apparatus according to an aspect of the present invention is a moving object detection apparatus which detects a moving object in a video sequence by extracting a region corresponding to a whole or a part of an image of the moving object, the moving object detection apparatus including: an image receiving unit which receives a set of images included in the video sequence; a motion analysis unit which calculates movement trajectories, each of the movement trajectories being calculated by: detecting motions from a pair of images included in the set of images, for each pair of blocks included in the pair of images, each block having one or more pixels; and concatenating motions detected from all pairs of images included in the set of images; a segmentation unit which performs segmentation so that the movement trajectories are divided into subsets, and to set a part of the movement trajectories as common points shared by the subsets; a distance calculation unit which calculates a distance representing a similarity between a pair of movement trajectories, for each of the subsets; a geodesic distance calculation unit which transforms the distance calculated by the distance calculation unit into a geodesic distance; an approximate geodesic distance calculation unit which calculates an approximate geodesic distance bridging over the subsets, by integrating geodesic distances including the common points, among the geodesic distances obtained by the geodesic distance calculation unit; and a region extraction unit which extracts at least one region from the video sequence, by performing clustering using the calculated approximate geodesic distance so that blocks having similar movement trajectories are classified into one region.

In this way, similar movement trajectories are classified into one group. Suppose that an articulated object, such as a person, which is formed of parts moving differently is to be detected as a moving object. Even in such a case, the similar movement trajectories are classified as belonging to one region. Therefore, the region extraction is accurately performed, meaning that the moving object is reliably detected. To be more specific, the region extraction is accurately performed on a moving object, such as a person, that moves and changes shape, so that the moving object in a picture can be reliably detected at high speed.

Moreover, after the calculation of the geodesic distance for each of the subsets, the approximate geodesic distance bridging over the subsets is calculated by integrating the geodesic distances using the common points. On this account, as compared to the case where the movement trajectories are not classified into subsets, the geodesic distance is calculated for each pair of two movement trajectories with a smaller amount of calculation, which allows a high-speed moving object detection to be performed. More specifically, since the amount of calculation required for calculating the geodesic distance is reduced, the moving object can be detected at high speed. On top of that, advance information, such as shape information, on the target moving object does not need to be held or learned beforehand.

Here, the image receiving unit may receive sets of images corresponding to video sequences captured by cameras, respectively; the motion analysis unit may calculate the movement trajectories for each of the video sequences; the segmentation unit may hold the movement trajectories calculated for each of the video sequences as one subset; and the region extraction unit may extract at least one region from the video sequences by performing the clustering. With this, the images captured by the cameras can be processed in an integrative way. Moreover, similar movement trajectories are classified into one group. Suppose that an articulated object, such as a person, which is formed of parts moving differently is to be detected as a moving object. Even in such a case, the similar movement trajectories are classified as belonging to one region. Therefore, the region extraction is accurately performed, meaning that the moving object is reliably detected. Furthermore, the region extraction is accurately performed on a moving object that moves, for example, across the capturing ranges of the cameras or a moving object such as a person that moves and changes shape, so that the moving object in the pictures can be reliably detected at high speed.

As a method of dividing into the subsets, the segmentation unit may perform the segmentation, so as to divide the movement trajectories into the subsets on the image in a position space of the blocks corresponding to the movement trajectories. With this, it becomes easier to classify, into one subset, the movement trajectories located close to one another on the image. Since the object is usually in one spatially-connected form, which is a problem unique to images in particular, the geodesic distance can be calculated at high speed.

Here, the segmentation unit may perform the segmentation, so as to divide the movement trajectories into the subsets according to a spatial segmentation designated by a user for the video sequence. With this, when the user roughly knows the region that includes the moving object, the user can designate the region. This can avoid the risk of reducing the accuracy of the geodesic distance calculation, the risk being caused by the segmentation of the region including the moving object into subsets. Accordingly, degradation in the accuracy of detecting the moving object can be prevented.

As another method of segmenting into subsets, each of the movement trajectories may be represented by a multidimensional vector, and the segmentation unit may perform the segmentation, so as to divide the movement trajectories into the subsets in a multidimensional vector space expressing the multidimensional vector. With this, it becomes easier to classify, into one subset, the movement trajectories or vector data pieces located close to one another on the image in the multidimensional vector space. Thus, the geodesic distance can be calculated at high speed.

Also, as a method of setting common points, the segmentation unit may perform the segmentation so that subsets close to each other, among the subsets, partly overlap one another, and may set a movement trajectory included in an overlapping region as the common points. Moreover, the segmentation unit may set, as the common points set for each of the subsets, a movement trajectory, among the movement trajectories included in the subset, which is located close to a boundary with an adjacent subset. By setting the common points such that regions located close to one another in the image overlap one another or are connected to one another, the geodesic distance can be accurately calculated at high speed for the movement trajectories located at a distance in the image. Moreover, by setting the common points such that regions located close to one another in the multidimensional vector space overlap one another or are connected to one another, the geodesic distance can be accurately calculated at high speed even in the case of the multidimensional vectors located at a distance in the multidimensional vector space.

Moreover, regarding the geodesic distance transformation, it is preferable that the geodesic distance transformation unit transform each of the distances calculated by the distance calculation unit into the geodesic distance, by calculating a shortest path between a pair of movement trajectories calculated by the motion analysis unit, the shortest path being obtained by combining short distances satisfying a predetermined condition, among the distances calculated by the distance calculation unit. To be more specific, it is preferable that the geodesic distance transformation unit transform each of the distances calculated by the distance calculation unit into the geodesic distance, by calculating the shortest path after: selecting a predetermined number of distances in ascending order, from among distances each between a pair of movement trajectories included in an individual subset; and performing nonlinear processing to change an unselected distance into an infinite distance. With this, the distances selected and unselected based on the threshold have a nonlinear relationship. Therefore, as compared to the case of a linear distance, the similarity or dissimilarity between the movement trajectories is emphasized, thereby accurately representing the motion of the articulated object such as a person.

Furthermore, the geodesic distance transformation unit may transform each of the distances calculated by the distance calculation unit into the geodesic distance, by calculating the shortest path after: selecting distances each being equal to or shorter than a threshold, from among distances each between a pair of movement trajectories included in an individual subset; and performing nonlinear processing to change an unselected distance into an infinite distance. Therefore, as compared to the case of a linear distance, the similarity or dissimilarity between the movement trajectories is emphasized, thereby accurately representing the motion of the articulated object such as a person.

As a specific method of region extraction, it is preferable that the region extraction unit detect at least one discontinuous point in a distribution of the approximate geodesic distances calculated by the approximate geodesic distance calculation unit, and to perform the clustering so that the movement trajectories separated by a geodesic distance shorter than a length of the detected discontinuous point are classified into one cluster. With this, the movement trajectories which are away from each other by a distance shorter than the length of the discontinuous point are classified into one cluster. Therefore, the number of clusters to be generated can be controlled by changing the condition concerning the discontinuous point.

As another specific method of region extraction, the region extraction unit may perform dimensionality reduction on the approximate geodesic distance calculated by the approximate geodesic distance calculation unit, by calculating an eigenvalue and an eigenvector, and to perform the clustering in a lower-dimensional (an eigen) space. With this, the moving object can be robustly detected regardless of noise or motion detection error, through the dimensionality reduction performed on the geodesic distance.

Moreover, as another specific method of region extraction: the geodesic distance transformation unit may generate criteria used for transforming the distance into the geodesic distance, and transform the distance into the geodesic distance using each of the criteria so as to generate the geodesic distances for each of the criteria; the approximate geodesic distance calculation unit may integrate the geodesic distances for each of the criteria; and the region extraction unit may include: a candidate generation unit which generates a result of the region extraction as a candidate for each of the criteria, by extracting the region through the clustering performed on the integrated approximate geodesic distance corresponding to the criterion; and a candidate selection unit which obtains an instruction regarding the number of classes, selects a candidate having the number of extracted regions close to the obtained number of classes, from among the candidates generated by the candidate generation unit, and outputs the selected candidate as a result of the region extraction performed by the region extraction unit. With this, the clustering is executed for each of the previously-generated criteria. Thus, a desired number of clusters are generated as a result of these clustering executions.

As a specific example of the criteria, it is preferable that the geodesic distance transformation unit generates thresholds as the criteria, and generates the geodesic distance for each of the criteria by combining distances shorter than the threshold, among the distances calculated by the distance calculation unit. With this, the similarity between the movement trajectories is determined based on the geodesic distance formed by connecting short distances. Thus, as compared to the case of clustering performed using a linear Euclidean distance, the clustering is performed in consideration of the continuity related to the similarity between the movement trajectories. On this account, it is reliably determined whether blocks in the image belong to the same object (or the same part) or to different objects (or different parts).

Moreover, it is preferable that the moving object detection apparatus further include an image display unit which displays a result of the region extraction performed by the region extraction unit by superimposing the result onto the image received by the image receiving unit. By displaying the extracted part on the image, it becomes possible to apply this to, for example, form adjustment in the sports field or walk rehabilitation.

Furthermore, the moving object detection apparatus may further include a recording-transmitting unit which: determines a region on the image received by the image receiving unit according to a result of the region extraction performed by the region extraction unit; and records and holds the result in association with the determined region or transmits the result in association with the determined region to an external source via a transmission line. With this, the detected moving object images are separately held corresponding to the extracted regions. Thus, only a necessary part of the image can be selected from among the moving object images so as to be stored or provided to an external source, meaning the effective storage or output of the image as a graphic element is allowed. On account of this, it is useful when the image is stored into or transmitted to a device with a limited processing capacity, such as a cellular phone.

Also, the image receiving unit may receive a video sequence including two or more moving objects, and the region extraction unit may detect the two or more moving objects by performing the region extraction on the two or more moving objects. With this, not only one moving object which moves and changes shape, but also moving objects can be accurately detected from the image showing the moving objects.

Moreover, it is preferable that the moving object detection apparatus further include a motion estimation unit which estimates a motion of the moving object, by calculating a representative movement trajectory from the movement trajectories of the blocks included in the region extracted by the region extraction unit and estimating a motion of the region on the basis of the representative movement trajectory. With this, by estimating the motion of the moving object using the representative trajectory among the movement trajectories of the block, the robust motion estimation to noise can be achieved.

Also, the vector data classification apparatus according to another aspect of the present invention is a vector data classification apparatus which classifies vector data pieces into classes, each class including similar vector data pieces out of the vector data pieces, the vector data classification apparatus including: a vector data receiving unit which receives vector data pieces; a segmentation unit which performs segmentation so that the vector data pieces are divided into subsets each used for calculating a geodesic distance, and to set a part of the vector data pieces included in at least one of the subsets as common points shared by the subsets; a distance calculation unit which calculates a distance representing a similarity between a pair of vector data pieces, for each of the subsets; a geodesic distance calculation unit which transforms the distance calculated by the distance calculation unit into a geodesic distance which is a length of a path between the pair of vector data pieces via a vector data piece serving as a relay point; an approximate geodesic distance calculation unit which calculates an approximate geodesic distance bridging over the subsets, by integrating geodesic distances including the common points, among the geodesic distances obtained by the geodesic distance calculation unit; and a data classification unit which generates at least one class from the video sequence, by performing clustering using the calculated approximate geodesic distance so that similar vector data pieces are classified into one class.

With this, similar vector data pieces are classified into one group. For example, suppose that vector data pieces related to three-dimensional motions are received and an articulated object, such as a person, which is formed of parts moving differently is to be detected as a moving object. Even in such a case, the similar vector data pieces are classified as belonging to one region. Therefore, the region extraction is accurately performed, meaning that the moving object is reliably detected. To be more specific, the classification is accurately performed on a moving object, such as a person, that moves and changes shape, that is, the region extraction can be reliably performed.

Moreover, after the calculation of the geodesic distance for each of the subsets, the approximate geodesic distance bridging over the subsets is calculated by integrating the geodesic distances using the common points. On this account, as compared to the case where the vector data pieces are not classified into subsets, the geodesic distance is calculated for each pair of two vector data pieces with a smaller amount of calculation, which allows a high-speed moving object detection to be performed.

The following is a detailed description of the embodiments of the present invention, with reference to the drawings.

(First Embodiment)

First, a moving object detection apparatus and a moving object detection method in the first embodiment of the present invention is explained.

FIG. 1 is a diagram showing a configuration of a moving object detection apparatus 100 in the first embodiment. As shown in FIG. 1, the moving object detection apparatus 100 includes an image receiving unit 101, a motion analysis unit 102, a segmentation unit 103, a distance calculation unit 104, a geodesic distance transformation unit 105, an approximate geodesic distance calculation unit 106, a region extraction unit 107, and an output unit 108. The moving object detection unit 100 detects a moving object in a video sequence by performing region extraction to determine a region showing the whole or a part of the moving object.

The image receiving unit 101 is a processing unit witch receives temporally-different images (i.e., pictures) included in a video sequence. For example, the image receiving unit 101 is a video camera or a communication interface connected to a video camera.

The motion analysis unit 102 is a processing unit which calculates a movement trajectory as follows. The motion analysis unit 102 detects a motion of an image between two different images received by the image receiving unit 101, such as two temporally adjacent images, for each pair of blocks included in the two images respectively, each block having one or more pixels. Then, the motion analysis unit 102 concatenates the detected motions of the images into a single movement trajectory.

The segmentation unit 103 is a processing unit which divides the movement trajectories calculated by the motion analysis unit 102 into subsets, and sets a part of the movement trajectories as common points shared by the subsets. Here, the segmentation unit 103 sets the common points such that at least a part of the movement trajectories overlap one another or are connected to one another among the subsets. To be more specific, the segmentation unit 103 of the present embodiment divides the movement trajectories into the subsets in a position space of the image. For example, the segmentation unit 103 performs segmentation so as to divide the movement trajectories into the subsets in a position space of the image, so that blocks, which correspond to the movement trajectories, close to one another in the image belong to the same subset.

The distance calculation unit 104 is a processing unit which calculates a distance representing a similarity between two movement trajectories, among the movement trajectories, included in an individual subset. The distance calculation unit 104 calculates such distances for each of the subsets obtained through the segmentation performed by the segmentation unit 103. In the present embodiment, in order to obtain shape variations of the moving object in the images, the distance calculation unit 104 calculates a distance representing a similarity between block motions using a movement trajectory of a block "i" calculated by the motion analysis unit 102 and included in a subset and a moving trajectory of a block other than the block i but included in the same subset as the block i. For example, when movement trajectories corresponding to an N number of blocks are used, the resultant distances are calculated as an N by N matrix of distances.

Here, the distance matrix is obtained by calculating the distances for evaluating the motion similarities between the blocks. Since the distances between the blocks change in response to the motions of a moving object particularly when the object is for example a person that moves and changes shape like an articulated object, this distance matrix can represent the motions of the moving object. Note that the movement trajectory of the block i is referred to as the movement trajectory i hereafter. More specifically, a "distance" mentioned in the present specification indicates not only a distance between two points in a two-dimensional space, but also an arithmetic distance between multidimensional data pieces. Thus, the present distance can be represented as a value or a set of values in a distance matrix.

The geodesic distance transformation unit 105 is a processing unit which performs geodesic distance transformation on the distance matrix of each subset calculated by the distance calculation unit 104.

The approximate geodesic distance calculation unit 106 is a processing unit which calculates an approximate geodesic distance for a pair of two movement trajectories, among the movement trajectories calculated by the motion analysis unit 102. Specifically, the approximate geodesic distance calculation unit 106 calculates the approximate geodesic distance bridging over the subsets by integrating geodesic distances, among the geodesic distances obtained through the transformation by the geodesic distance transformation unit 105, using the common points. To be more specific, the approximate geodesic distance calculation unit 106 calculates the approximate geodesic distance bridging over the subsets by integrating the geodesic-distance matrices of the subsets calculated by the geodesic distance transformation unit 105. Here, the calculated geodesic distance is "approximate" because the geodesic distance bridging over the subsets is calculated as a generalized value using the movement trajectories set as the common points, instead of calculating the geodesic distance using all the movement trajectories belonging to these subsets.

The region extraction unit 107 is a processing unit which performs region extraction by determining a region including blocks having similar movement trajectories, on the basis of the distance calculated by the approximate geodesic distance calculation unit 106. Here, the region extraction unit 107 extracts at least one region from the video sequence received by the image receiving unit 101, by performing clustering to determine, as one region, the blocks having the movement trajectories separated by a geodesic distance shorter than a threshold, out of the geodesic distances integrated by the approximate geodesic distance calculation unit 106. A more detailed explanation is given as follows. The region extraction unit 107 of the present embodiment detects a discontinuous point in the distribution of distances between the movement trajectories from the geodesic distances bridging over the subsets obtained by the geodesic distance transformation unit 105 and the approximate geodesic distance calculation unit 106, using the distance matrices calculated by the distance calculation unit 104. Then, the region extraction unit 107 performs clustering on the continuously-distributed movement trajectories on the basis of the detected discontinuous point so as to classify, into one cluster, the movement trajectories separated by a distance shorter than the length of the discontinuous point. As a result of this, the region extraction unit 107 detects the moving object in the video sequence as well as extracting the image region from the video sequence.

The output unit 108 serves as, for example: a processing unit which provides the result of the moving object detection or region extraction performed by the region extraction unit 107; a writing unit which writes the result to a memory or a hard disk; and a display device which displays the result.

Figure 2:
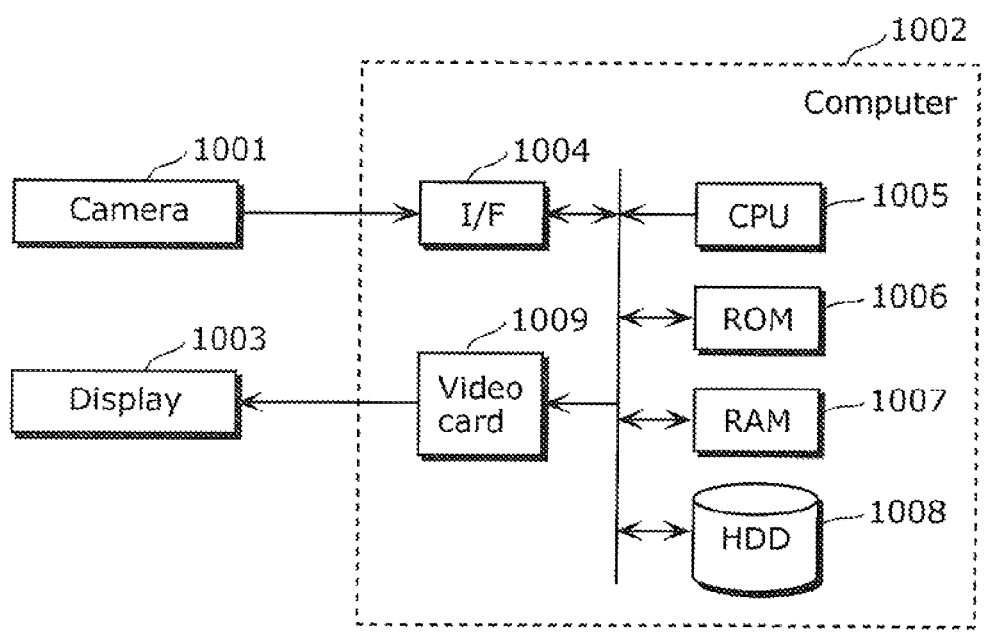
FIG. 2 is a diagram showing a hardware configuration of a case where the moving object detection apparatus in the first embodiment of the present invention is implemented as software.

It should be noted that each of the components (namely, the image receiving unit 101, the motion analysis unit 102, the segmentation unit 103, the distance calculation unit 104, the geodesic distance transformation unit 105, the approximate geodesic distance calculation unit 106, the region extraction unit 107, and the output unit 108) included in the moving object detection apparatus 100 may be implemented as software such as a program executed on a computer 1002 which includes a CPU 1005, a RAM 1007, a ROM 1006, a communication interface 1004 for connection to a camera 1001, an I/O port (such as a video card 1009), a hard disk 1008, and a display 1003, as shown in FIG. 2. Also note that each of the components may be implemented as hardware such as an electronic circuit. In other words, the components in the present embodiment except for an I/O device such as the display device may be implemented as: a program or data (i.e., software) to be executed by a computer; hardware, such as an electronic circuit, a memory, or a recording medium; or a mixture of hardware and software.

When the present invention is implemented as software, it should be obvious that the functional components of the present invention are implemented by the program which is executed using hardware resources including a CPU, a memory, and an I/O circuit of a computer. To be more specific, the functions of the processing units are implemented by the CPU which reads (or, fetches) processing-target data from the memory or the I/O circuit to execute calculation and then stores (or, provides) the calculation result temporarily into the memory or the I/O circuit.

When the present invention is implemented as hardware, the hardware may be: a one-chip semiconductor integrated circuit; semiconductor chips implemented on one circuit board; a device having all the components housed in one enclosure; or devices connected via transmission lines to achieve cooperative processing. For example, the present invention may be implemented as a server-client system whereby a storage unit of the present embodiment is set in a server apparatus and the processing units of the present embodiment are set in a client apparatus which conducts wireless communication with the present server apparatus.

The same can be applied to moving object detection apparatuses described in the following embodiments.

Figure 3:
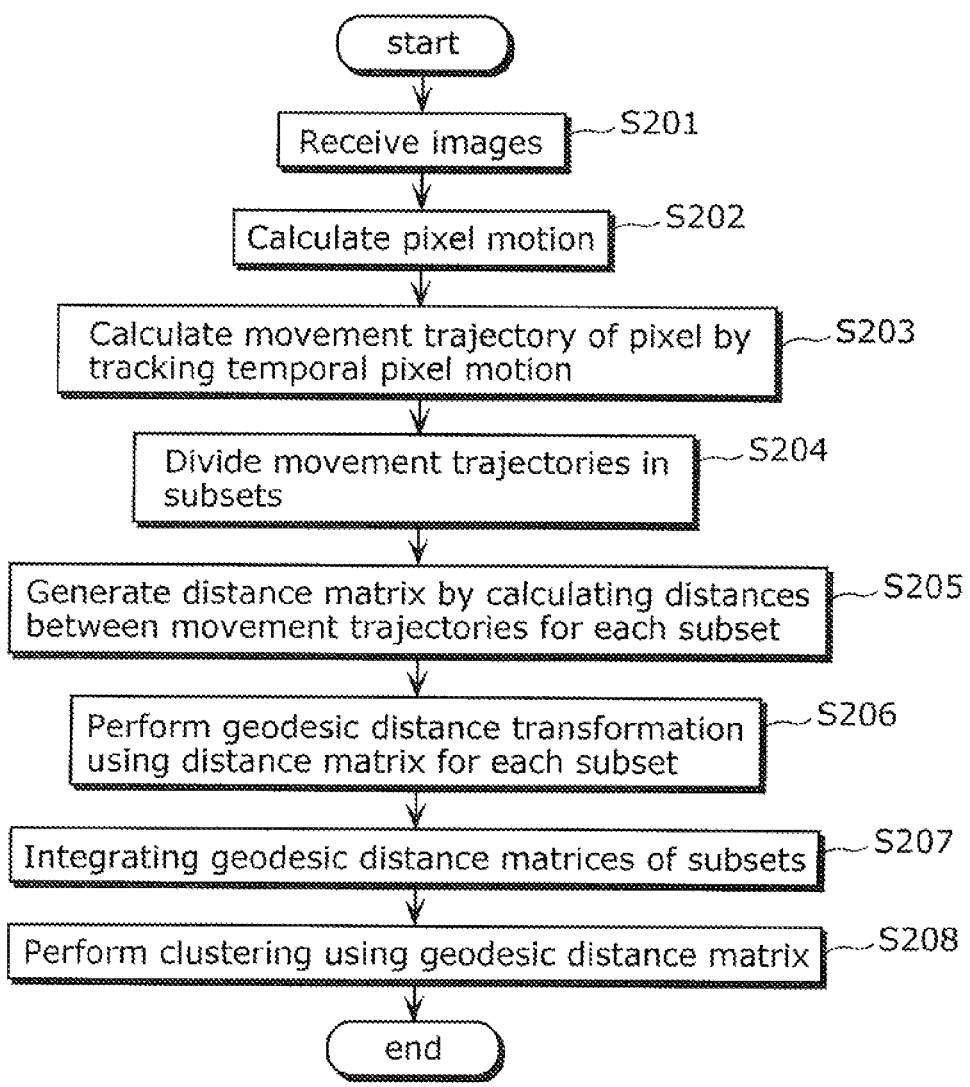
FIG. 3 is a flowchart showing a basic operation of the moving object detection apparatus in the first embodiment of the present invention.

The following is a detailed explanation about the case of detecting a moving object and performing region extraction using the moving object detection method according to the present invention, namely, about the operation performed by the moving object detection apparatus 100, with reference to a flowchart shown in FIG. 3.

First, in step S201, the image receiving unit 101 receives images.

Next, in step S202, the motion analysis unit 102 calculates a block motion using at least two images. In the present embodiment, as an example of calculating a block motion, a pixel motion is calculated. As an example of processing performed in units of blocks, processing performed in units of pixels is explained as follows in the present embodiment. Suppose a case where processing is to be performed in units of blocks each having pixels. In such a case, data or a representative value of a block is obtained by (i) adding data values of pixels in the block, (ii) calculating a mean value of the block, or (iii) calculating a center value of the block. Using the obtained representative value, the processing is performed in the same manner as the processing performed in units of pixels. It should be noted that "block motion" and "pixel motion" mentioned in the present specification refer to "motion between blocks in the pictures" and "motion between pixels in the pictures", respectively.

First, an example of calculating the pixel motion according to the optical flow calculation is explained. A technique of calculating a motion vector according to the optical flow calculation is disclosed by P. Anandan in "A Computational Framework and an Algorithm for the Measurement of Visual Motion", International Journal of Computer Vision, Vol. 2, pp. 283-310, 1989 (referred to a Non-Patent Reference 4 hereafter) and by Vladimir Kolmogorov and Ramin Zabih in "Computing Visual Correspondence with Occlusions via Graph Cuts", International Conference on Computer Vision, 2001 (referred to as Non-Patent Reference 5 hereafter).

For example, when a T number of images are received in step S201, images received at times t and t+1 are used for estimating a motion vector of a pixel i. The present motion vector is expressed as $(u^i_t, v^i_t)$. In this case here, frames are not necessarily consecutive, meaning that the pixel motion may be calculated using images received at times t and t+n, for example. Note that "n" is an integer of 1 or greater. Moreover, as the pixel motion, an affine parameter may be estimated instead of the aforementioned two-dimensional motion vector. In this case, motion information may be obtained for each of the pixels. Furthermore, when higher-speed processing is desired, an image may be divided into a grid and the motion information of only pixels at regular intervals on the grid may be obtained. Or, as described above, the image may be divided into blocks and the motion information may be obtained for each block. Also, when the motion vector is calculated according to the method disclosed in Non-Patent Reference 4, the confidence value is calculated and, therefore, only pixels having the motion information with high confidence values may be used. Moreover, when the motion vector is calculated according to the method disclosed in Non-Patent Reference 5, occlusions can be estimated and, therefore, the motion information of only unoccluded pixels may be used.

Furthermore, as a technique of calculating a pixel motion, a method of calculating a motion vector based on the assumption of affine motion of blocks may be used instead of the method of calculating the motion vector used on the assumption of the aforementioned translational motion of the blocks. A technique of calculating a motion vector based on the assumption of the affine motion is disclosed by Jianbo Shi and Carlo Tomasi in "Good Features to Track", IEEE Conference on Computer Vision and Pattern Recognition, pp. 593-600, 1994 (referred to as Non-Patent Reference 6 hereafter).

According to the above method, an affine parameter $A^i_t$ corresponding to a motion around the pixel i of the pictures received at the times t and t+1 is estimated. In regard to the pixel i, pixel positions $x^i_t$ and $x^i_{t+1}$ in the images received at the times t and t+1 have a relationship represented by Expression 1 as follows.

$$x_{t+1}^i = A_t^i x_t^i \qquad \text{Expression 1}$$

According to the above method, especially when the moving object may rotate, the motion of the pixel i can be estimated with high accuracy as compared to the case of the method of calculating the motion vector based on the assumption of a translational motion.

Figure 4:
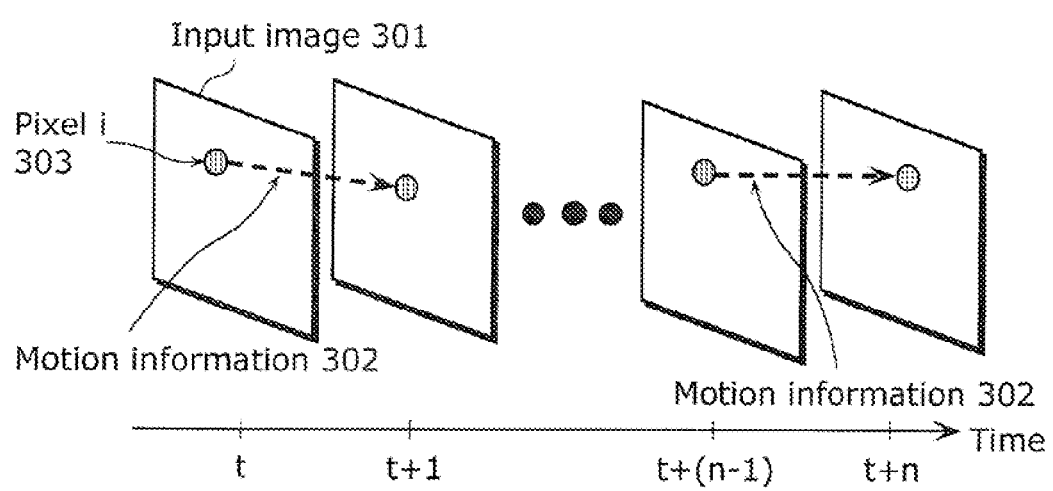
FIG. 4 is a diagram showing an example of processing performed by a motion analysis unit in the first embodiment of the present invention.

Next, in step S203, the motion analysis unit 102 calculates the movement trajectory i corresponding to the temporally-different images from the aforementioned pixel motions, using the motion information calculated in step S202. Hereafter, the movement trajectory of the pixel i is referred to as the movement trajectory i. As shown in FIG. 4, the motion of a pixel i 303 of an input image 301 received at the time t is traced, using motion information 302 obtained in step S202.

Here, the movement trajectory i, represented as "$x^i$" in this case, is calculated as follows, using a pixel position represented as $(x^i_t, y^i_t)$ at which the pixel i is located in the image at the time t.

$$x^i = (x^i_1, y^i_1, \ldots, x^i_t, y^i_t, \ldots, x^i_T, y^i_T) \qquad \text{Expression 2}$$

In Expression 2 above, "T" represents the number of pictures used in calculating the movement trajectory i. When Expression 2 is employed, it is possible that the following processing is not performed for a case of a movement trajectory with no movements or a movement trajectory with small movements.

Next, in step S204, the segmentation unit 103 divides a position space of an image 401 into a P number of subsets 402 as shown in FIG. 5. Here, a subset 402 is also a group of movement trajectories corresponding to a region obtained by the segmentation (i.e., the region, on the picture). When segmenting the space, the segmentation unit 103 sets the subsets such that these subsets have the common points, that is, the movement trajectory logically belonging to each of the subsets, or sets such a common point. To be more specific, as shown in FIGS. 5(a) and (b), the subsets 402 may be set in the positional space of the image 401 in such a manner as to overlap one another, and then the movement trajectories in the overlapping region (i.e., the region on the picture) may be set as common points 403. Also, as shown in FIG. 5(c), the movement trajectories close to, on the image, the boundaries between the subsets 402 may be set as the common points 403. Moreover, as shown in FIG. 5(d), the subsets may be spatially dense and the common points 403 may be spatially sparse. Furthermore, the subsets 402 are not necessarily rectangles in shape as shown in FIG. 5, and may be in the shape of squares, horizontally-long rectangles, circles, ovals, or polygons. It is preferable that subsets are set so as to collectively cover the entire image. For example, when the shape or movements of the target object is unpredictable in advance or when a rotational motion causing a camera to be upside down may occur, the influence of the rotations of the target object or the camera can be reduced by setting the subsets 402 in the shape of squares as shown in FIGS. 5(a), (c), and (d). Also, especially when the target object long in the vertical direction, such as a person, is to be extracted, the shape of the person can be accurately extracted by setting the shape of the subsets 402 in vertically-long rectangles as shown in FIG. 5(b). Likewise, when the target object is an animal, such as a dog, it is preferable that the subsets 402 are in the shape of horizontally-long rectangles in consideration of the shape of dogs. Moreover, when it is desired that the amount of calculation be reduced more, the moving trajectories close to the boundaries between the subsets 402, instead of the movement trajectories in the overlapping regions, may be set as the common points 403 as shown in FIG. 5(c). This produces the effect of reducing the amount of calculation more, because of the reduction in the overlaps. Furthermore, by setting the size of the subset in the upper part of the image smaller than that of the subset in the lower part of the image in order to benefit from the parsing effect, the region extraction can be performed with a higher degree of accuracy even in the case where the target object is large in the lower part of the image and small in the upper part of the image. It should be obvious that the effect of reducing the size of the subset in the upper part of the picture can also be achieved by a trapezoid-shaped subset instead of a square-shaped subset. Note that the number and size of subsets are described later.

Here, the movement trajectories corresponding to the region, i.e., the region on the image, are obtained by classifying the movement trajectories i into the subsets based on the positions of the regions on the image. For example, when the position expressed as $(x^i_1, y^i_1)$ on the image belongs to a subset "p", the movement trajectory i calculated by Expression 2 above that is located at the position $(x^i_1, y^i_1)$ at a time 1 is classified into the subset p. Also, when the position expressed as $(x^i_t, y^i_t)$ on the image belongs to the subset p, the movement trajectory i that is located at the position $(x^i_t, y^i_t)$ at the time t may be classified into the subset p. Moreover, by calculating a temporal mean value of the movement trajectory i calculated by Expression 2 above, a temporal mean position of the movement trajectory i on the image is calculated. The temporal mean position is expressed as follows.

$$(\overline{x^i}, \overline{y^i})$$

Then, the movement trajectory i may be classified into the subset p that includes the temporal mean position. The common point is also a movement trajectory corresponding to the region, i.e., corresponding to the region on the image. In this way, the image is divided into the P number of subsets based on the respective regions, i.e., based on the respective regions on the image. Then, on the basis of this result, the movement trajectories are accordingly classified into subsets p.

Next, in step S205, the distance calculation unit 104 calculates, for each of the subsets p obtained in step S104, a distance matrix including the similarity in pixel motion using the movement trajectories i belonging to the subset p. A linear distance $f_p(i, j)$ between the movement trajectories i and j can be calculated according to Expressions 3 to 13 as follows. Here, each of the distances as typified by Expressions 3 to 13 may include a nonlinear function. However, note that, in order to distinguish from a geodesic distance calculated through nonlinear transformation and a path searching method, these distances are referred to as the linear distances. Also note that the movement trajectories i and j belong to the same subset p. Then, the followings are calculated for each subset p.

$$f_p(i,j) = ptn_{ij} + w \cdot mtn_{ij} \qquad \text{Expression 3}$$

Here, "w" is a weighting factor, and is a parameter to be set by a designer. Also, instead of using Expression 3 above, the linear distance $f_p(i, j)$ may be defined as follows, $$f_p(i, j) = 1.0 - \exp\left(-\frac{w \cdot mtn_{ij}}{ptn_{ij}}\right) \qquad \text{Expression 4}$$

Here, "$ptn_{ij}$" represents a temporal mean value of a distance between the movement trajectories, and "$mtn_{ij}$" represents a temporal fluctuation component of a distance between the movement trajectories. These $ptn_{ij}$ and $mtn_{ij}$ are defined as follows.

$$ptn_{ij} = \frac{1}{T}\sum_{t=1}^{T} d^t_{ij} \qquad \text{Expression 5}$$

$$mtn_{ij} = \sqrt{\frac{1}{T}\sum_{t=1}^{T}(d^t_{ij} - ptn_{ij})^2} \qquad \text{Expression 6}$$

Here, also note the following expression.

$$d^t_{ij} = \sqrt{(x^i_t - x^j_t)^2 + (y^i_t + y^j_t)^2} \qquad \text{Expression 7}$$

As expressed by Expression 3 above, in addition to the temporal mean value of the distance between the movement trajectories expressed by Expression 5, the temporal fluctuation component of the distance between the movement trajectories expressed by Expression 6 is an element of the aforementioned linear distance $f_p$ (i, j). In particular, the temporal fluctuation component of the distance between the movement trajectories expressed by Expression 6 indicates the similarity in pixel motion. This similarity makes it possible to detect not only of a rigid body where the distance relationship between pixels does not temporally change, but also the shape variations of an articulated object or the like. Also, the same advantageous effect can be expected by using temporal fluctuation components as represented by Expressions 8 to 13, instead of using the temporal fluctuation component of Expression 6.

$$mtn_{ij} = \frac{1}{(T-1)} \sum_{t=1}^{T-1} (1 - \cos\theta_{ij}^t) \qquad \text{Expression 8}$$

$$\cos\theta_{ij}^t = \frac{\langle u_i^t \cdot u_i^t \rangle}{|u_i^t||u_j^t|} \qquad \text{Expression 9}$$

Here, "$u_i^t$" represents a motion vector ($u_t^i$, $v_t^i$) from the time t to the time t+1, and "$\langle u_i^t \cdot u_i^t \rangle$" represents an inner product.

Also, as a temporal fluctuation component, the following may be calculated.

$$mtn_{ij} = \text{mtn\_max} - \frac{1}{(T-1)} \sum_{t=1}^{T-1} \langle u_i^t \cdot u_i^t \rangle \qquad \text{Expression 10}$$

$$\text{mtn\_max} = \max_i \left( \frac{1}{(T-1)} \sum_{t=1}^{T-1} \langle u_i^t \cdot u_i^t \rangle \right) \qquad \text{Expression 11}$$

$$mtn_{ij} = \frac{1}{(T-1)} \sum_{t=1}^{T-1} \sqrt{(u_i^t - u_j^t)^2 + (v_i^t - v_j^t)^2} \qquad \text{Expression 12}$$

Here, also note the following expression.

$$u_i^t = (u_i^t, u_j^t) \qquad \text{Expression 13}$$

Next, In step S206, the geodesic distance transformation unit 105 calculates $f'_p$ (i, j) by performing nonlinear processing as follows, applying a threshold R to the linear distance $f_p$ (i, j) of the subset that is calculated according to Expression 3 or 4 above.

$$f'_p(i, j) = \begin{cases} f_p(i, j) & \text{if } i \text{ is } R-NearestNeighbor \\ \infty & \text{otherwise} \end{cases} \qquad \text{Expression 14}$$

Here, supposing that the movement trajectory i is currently being processed, an R number of movement trajectories j are selected in ascending order of the linear distance $f_p$ (i, j) measured from the movement trajectory i. Then, the distance between the movement trajectory i and each of the selected movement trajectories j is not changed, and the distance between the movement trajectory i and an unselected movement trajectory j is changed into an infinite distance. Although the movement trajectories j are selected in ascending order of the linear distance in the present example, the threshold R may be set as follows.

$$f'_p(i, j) = \begin{cases} f_p(i, j) & \text{if } f_p(i, j) < R \\ \infty & \text{otherwise} \end{cases} \qquad \text{Expression 15}$$

More specifically, the geodesic distance transformation unit 105 may select a predetermined number (R) of movement trajectories j in ascending order of the linear distance separated from the movement trajectory i, for each set of movement trajectories belonging to the individual subset p that are calculated by the motion analysis unit 102. Then, after performing the nonlinear processing so as to change a distance between the movement trajectory i and an unselected movement trajectory into an infinite distance, the geodesic distance transformation unit 105 may transform each of the distances into a geodesic distance. Or, the geodesic distance transformation unit 105 may select movement trajectories j located at a distance equal to or shorter than a predetermined threshold from the movement trajectory i, for each of the movement trajectories belonging to the subset p that are calculated by the motion analysis unit 102. Then, after performing the nonlinear processing so as to change a distance between the movement trajectory i and an unselected movement trajectory into an infinite distance, the geodesic distance transformation unit 105 may transform each of the distances into a geodesic distance.

It should be noted that the method of performing the nonlinear processing on the distance is not limited to the usage of the aforementioned function. Any method can be employed as long as the nonlinear transformation is performed on the distance related to the movement trajectories i and j.

Also, the processing according to Expression 14 or 15 may be performed after weighting the linear distance $f_p$ (i, j) by multiplying a weight calculated according to Expressions 16 and 17 as follows.

$$wf_{ij}^p = 1.0 - \exp\left(-z\left(\frac{1}{N_a}\sum_{a \in NN} f_p(a, j) + \frac{1}{N_b}\sum_{b \in NN} f_p(i, b)\right)\right) \qquad \text{Expression 16}$$

Here, "NN" indicates that processing is performed on points which are close to the movement trajectories and belong to the same subset p. Moreover, NN indicates that calculation is performed for each of movement trajectories "a" and "b", using: movement trajectories located within a predetermined range of distance from the movement trajectories i and j respectively; or an N number of movement trajectories in ascending order of the distance from the movement trajectories i and j respectively. More specifically, each of "$N_a$" and "$N_b$" indicates that the corresponding movement trajectories belong to the same subset p, and represents the number of movement trajectories within a predetermined range of distance or the aforementioned "N". Note that "z" is set by the designer.

Moreover, variance may be used as follows, instead of using Expression 16.

$$wf_{ij}^p = 1.0 - \exp\left(-z\left(\frac{1}{N_a}\sum_{a \in NN}(f_p(a, j) - \overline{f_p(a, j)})^2 + \frac{1}{N_b}\sum_{b \in NN}(f_p(i, b) - \overline{f_p(i, b)})^2\right)\right) \qquad \text{Expression 17}$$

Here, the following are defined.

$$\overline{f_p(a, j)} = \frac{1}{N_a} \sum_{a \in NN} f_p(a, j) \qquad \text{Expression 18}$$

$$\overline{f_p(i, b)} = \frac{1}{N_b} \sum_{b \in NN} f_p(i, b) \qquad \text{Expression 19}$$

Note that the definition of NN is the same as explained in the case of Expression 16 above.

By the transformation performed on $f_p$ (i, j) using the weight of Expression 16 or 17, $f_p$ (i, j) becomes relatively small when movement trajectories similar to the movement trajectories i and j are spatially concentrated, that is, when these similar movement trajectories are located close to one another. On the other hand, when the movement trajectories similar to the movement trajectories i and j are spatially sparse, that is, when these similar movement trajectories are located away from one another, $f_p$ (i, j) becomes relatively large as compared to the above case of the spatially-dense movement trajectories, by the transformation performed on $f_p$ (i, j) using the weight of Expression 16 or 17. That is to say, when the distance calculated by the distance calculation unit 104 is to be transformed into a geodesic distance, the weighting process is performed so that the geodesic distance becomes shorter when the movement trajectories included in the subset p obtained through the segmentation by the segmentation unit 103 are spatially closer. As a result, the distance transformation can be performed with consideration given to the spatial density of pixel movement trajectories.

Next, a geodesic distance $g_p$ (i, j) is calculated as follows, using the nonlinear distance $f'_p$ (i, j).

$$g_p(i,j) = \min(f'_p(i,j), f'_p(i,s) + f'_p(s,j)) \qquad \text{Expression 20}$$

Note that "min (x, y)" represents a function which returns a smaller one of x and y values. Also note that "s" indicates a movement trajectory s, and is a relay point to reach the movement trajectory j from the movement trajectory i. Here, the relay point s in $f'_p$ (i, s)+$f'_p$ (s, j) is not limited to one point. Also note that "p" corresponds to an individual subset. This method is achieved by the shortest-path search algorithm called Dijkstra's algorithm, and is disclosed by E. W. Dijkstra in "A note on two problems in connexion with graphs", Numerische Mathematik, pp. 269-271, 1959 (referred to as Non-Patent Reference 7 hereafter). In this way, the geodesic distance transformation unit 105 transforms each of the distances calculated by the distance calculation unit 104 by calculating the shortest path from one movement trajectory to another calculated by the motion analysis unit 102, the shortest path being obtained by combining the short distances satisfying a predetermined condition, among the distances calculated by the distance calculation unit 104.

Here, the nonlinear processing expressed by Expressions 14 and 15 above is explained with reference to the conceptual diagrams shown in FIG. 6(a) to (c). Although the processing expressed by Expression 15 is explained here, the same advantageous effect can be expected in the case of different nonlinear processing. FIG. 6(a) shows two-dimensional data distribution. Each of data points shown in the diagram corresponds to the movement trajectory i expressed by Expression 3 or 4 above. When the linear processing according to Expressions 14 to 17 is not performed, the distance between data point i and j is shorter than the distance between data points i and k, as shown in FIG. 6(b). However, when the processing is performed according to, for example, Expression 15 or 17, the distance between the data points i and j is calculated as a geodesic distance, instead of a Euclidean distance. The geodesic distance is indicated by an arrow passing through data points as shown in FIG. 6(c). Accordingly, unlike the case of using the Euclidean distance, the distance between the data points i and j is longer than the distance between the data points i and k.

Figure 7:
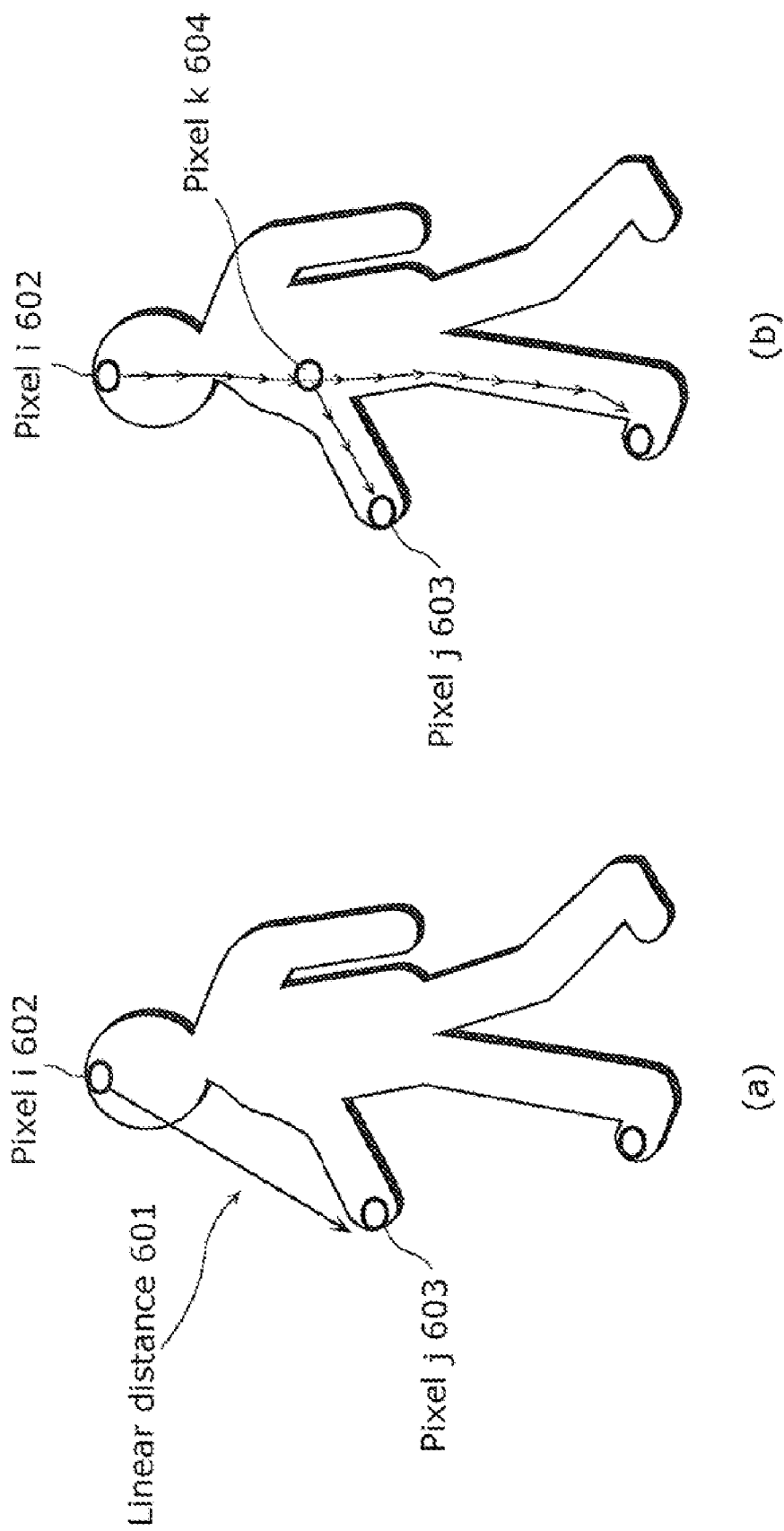
FIG. 7 is a diagram showing an example of an advantageous effect of a geodesic distance calculated by a geodesic distance transformation unit in the first embodiment of the present invention.

Here, the significance of the geodesic distance transformation as expressed by Expressions 14 to 17 is explained with reference to the conceptual diagrams shown in FIG. 7(a) and (b).

In order to clearly explain the difference between the linear distance $f_p$ (i, j) and the geodesic distance $g_p$ (i, j), the distance between the movement trajectories at the time t expressed by Expression 5 is explained here as an example. In practice, in addition to using the distance between the movement trajectories, the fluctuation component of the distance between the movement trajectories is used as the similarity in pixel motion, as expressed in Expression 3. By doing so, it becomes possible to detect not only the shape but also the shape variations of an articulated object or the like. FIG. 7(a) shows an example of the case where the nonlinear processing according to Expressions 14 to 17 above is not performed. For example, a distance between a pixel i602 located in the head region and a pixel j603 located in the hand region is indicated as a linear distance 601. On the other hand, when the nonlinear processing is performed according to Expressions 14 to 17, the distance between the pixels i602 and j603 is calculated as a linear sum representing a distance, namely, the geodesic distance, indicated by an arrow reaching the pixel j603 through a pixel k604 as shown in FIG. 7(b) on the assumption that the threshold R is appropriately set. As can be understood, the linear distance 601 cannot provide the continuous representation of the shape of the articulated object such as a human body. However, the geodesic distance can represent the continuity as the distance representing the articulated shape. Note that the method of calculating the geodesic distance is not limited to the method that requires the nonlinear processing performed according to Expressions 14 to 17 above. Also note that a linear or geodesic distance is contradictory to the similarity. To be more specific, the distance is shorter when the similarity is higher, and the distance is longer when the similarity is lower. On this account, when the similarity is used instead of the aforementioned linear or geodesic distance, the reciprocal of the similarity or a value obtained by subtracting the similarity value from a value equal to or greater than the maximum similarity value may be used as the distance such that the contradictory relationship as described is satisfied.

Next, in step S207, the approximate geodesic distance calculation unit 106 calculates an approximate geodesic distance bridging over the subsets by integrating the geodesic distance matrices $g_p$ (i, j) of the subsets. More specifically, the integration processing is performed as follows, using the common point set in step S204.

$$g(i, h) = \min_c (g_p(i, c) + g_{ij}(c, h)) \qquad \text{Expression 21}$$

Here, "c" represents the common point which is the movement trajectory belonging to both of the subsets p and q. That is, this movement trajectory is present across the subsets. It should be noted that the common point does not necessarily belong to two subsets and may belong to three or more subsets. In Expression 21, "i" and "h" indicate indexes corresponding to the different movement trajectories which belong to the subsets p and q, respectively. Note that, as shown in the example of FIG. 5, the common point c is not limited to one point.

Here, $$\min_{c}$$

is a function for calculating Expression 21 for at least one common point c and selecting a minimum value from the resultant values. In the present case, the subsets are not limited to the pair of the subsets p and q. To be more specific, by applying common points to Expression 21 and thus adding the geodesic distances in such a manner to perform the calculation across the subsets, the geodesic distance bridging over two or more subsets can be calculated.

Moreover, suppose that the movement trajectories close to the boundaries on the image between the subsets 402 are set as the common points 403 as shown in FIG. 5(c) or that the common points 403 are spatially sparse as shown in FIG. 5(d). In such a case, a linear distance $f_c(c_i, c_j)$ between the movement trajectory corresponding to a common point $c_i$ and the movement trajectory corresponding to a common point $c_j$ is calculated and the integration processing may be performed according to Expression 22 below.

$$g(i, h) = \min_{c_i, c_j} (g_p(i, c_i) + f_c(c_i, c_j) + g_p(c_j, h)) \quad \text{Expression 22}$$

Here, the linear distance $f_c(c_i, C_j)$ has an effect of connecting the common points. It should be noted that $f_c(c_i, c_j)$ may be calculated for each of the common points or that at least one distance between the common points which are spatially close to each other may be calculated.

Here, $$\min_{c_i, c_j}$$

is a function for calculating Expression 22 for at least two common points $c_i$ and $c_j$ and selecting a minimum value from the resultant values. In the present case, the subsets are not limited to the pair of the subsets p and q. To be more specific, by applying the linear distance combining common points to Expression 22 and thus adding the geodesic distances in such a manner to perform the calculation across the subsets, the geodesic distance bridging over two or more subsets can be calculated.

Figure 8:
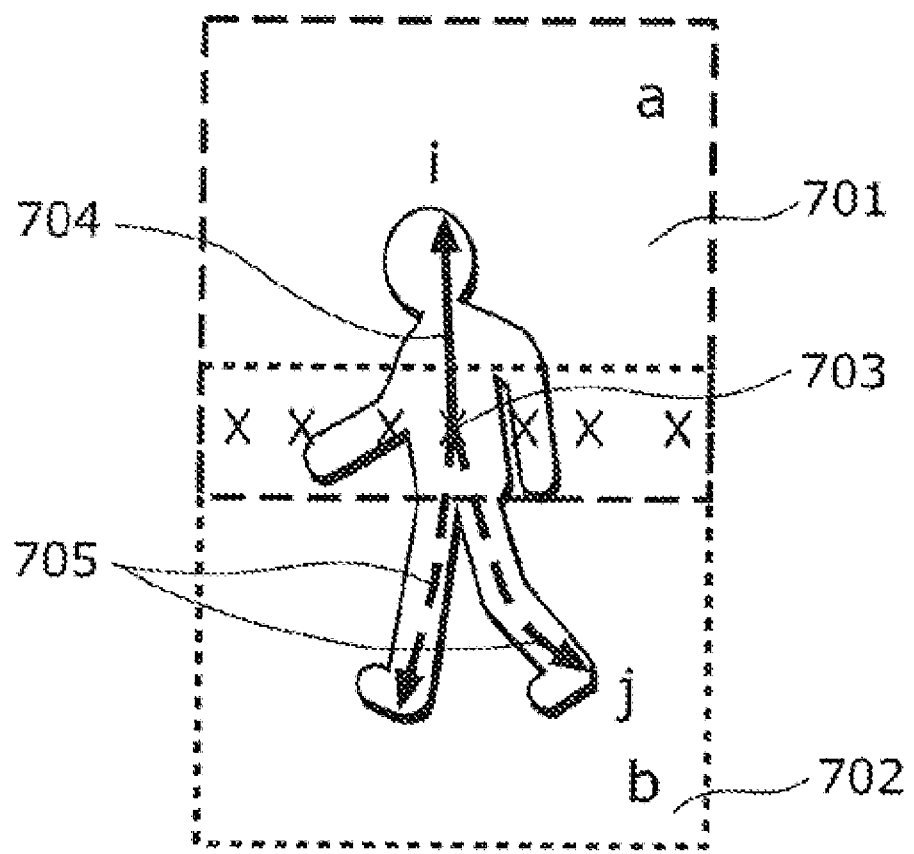
FIG. 8 is a diagram showing an example of processing performed by an approximate geodesic distance calculation unit in the first embodiment of the present invention.

In this way, the geodesic distances $g_p(i, j)$ calculated based on the subsets obtained using the common point c are integrated using the common point c, so that the approximate geodesic distance g (i, h) bridging over the subsets is calculated. As a result, the geodesic distance g (i, j) can be obtained at high speed for each of the movement trajectories calculated in step S203. The advantageous effect achieved by this method is explained with reference to FIG. 8. Although the number of subsets is two in the case shown in FIG. 8, the present invention does not limit the number of subsets. The position space is divided into different subsets "a" and "b" in step S204, and the geodesic distance for each of the subsets a and b, such as a geodesic distance 704 in the subset a and geodesic distances 705 in the subset b, is calculated in step S205. Then, the integration processing is performed using a common point 703, in step S207. As a result, an approximate geodesic distance g (i, j) bridging over the subsets a and b can be calculated, as shown by the movement trajectory i corresponding to a pixel located in the head region and the movement trajectory j corresponding to a pixel located in the foot region shown in FIG. 8.

Here, even in the case where an image of one target object is divided into at least two different subsets in step S204, the geodesic distance can be calculated with the same degree of accuracy as in the case where the segmentation into the subsets is not performed, by performing the integration processing.

Moreover, the geodesic distance can be obtained with a smaller amount of calculation, as compared to the case where the geodesic distance is calculated without segmentation into subsets. To be more specific, Non-Patent Reference 3 mentioned earlier discloses that, when the number of movement trajectories is N, the amount of calculation to obtain the geodesic distance is O ($N^2$ log N). Here, in the present embodiment, the amount of calculation to obtain the geodesic distance and to perform the integration processing is roughly calculated according to Expression 23 below.

$$O\left[M * \left(\left(\frac{N+C}{M}\right)^2\right)\log\left(\frac{N+C}{M}\right) + C^2 \log C\right] \quad \text{Expression 23}$$

Here, "M" represents the number of subsets, and "C" represents the total number of common points, that is, the total number of common points in the subsets shown in FIG. 5. "$C^2$ log C" represents the amount of calculation to perform the integration processing on the geodesic distances according to Expression 21 described above. For example, suppose that: N, the number of movement trajectories, corresponds to the VGA image size, namely 640×480; M is 10, and C is 10% of N. In this case, the amount of calculation is 0.11 percent as compared to the case where the segmentation into subsets is not performed. When the image size or the number of movement trajectories is known in advance, the reduced amount of calculation can be estimated on the basis of two variables, i.e., M and C. When accuracy is considered particularly important, it is preferable to increase the number of overlapping regions. This means that the total number of common points, i.e., C, may be increased. Moreover, when the amount of calculation is considered particularly important, the number of subsets, i.e., M, may be increased. However, when accuracy is taken into account, the total number of common points, i.e., C, needs to be increased as well. Therefore, it is necessary to determine, with consideration given to the shape and movements of the target object and to the balance with the degree of accuracy. As described thus far, the geodesic distance calculation can be performed at high speed by integrating the geodesic distances using the common point.

Figure 9:
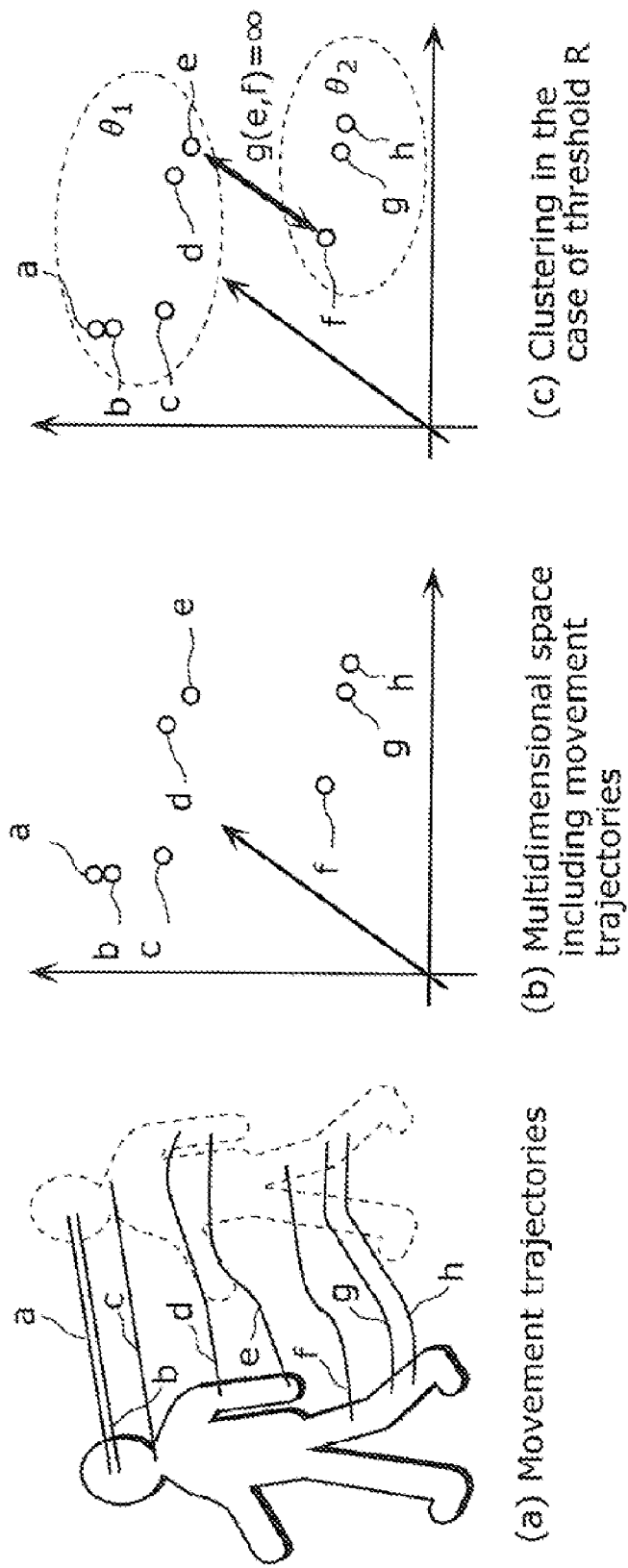
FIG. 9 is a diagram showing an example of processing performed by a region extraction unit in the first embodiment of the present invention.

Next, in step S208, the region extraction unit 107 performs region extraction by: detecting a discontinuous point using the geodesic distance g (i, j) obtained through the integration by the approximate geodesic distance calculation unit 106; and then determining a region which includes blocks having similar movement trajectories, based on the detected discontinuous point. Here, the discontinuous point is located at a position where g (i, j) becomes infinite between the movement trajectories i and j. An example of the geodesic distance obtained using the threshold R is explained with reference to FIG. 9(a) to (c). FIG. 9(a) shows movement trajectories "a" to "h", and FIG. 9(b) is a conceptual diagram showing the movement trajectories a to h of FIG. 9(a) in a multidimensional space. Although FIG. 9(a) shows eight movement trajectories a to h, a movement trajectory obtained on a per-pixel basis or on a per-block basis may be used in practice. In FIG. 9(b), one dot, that is, one of dots "a" to "h", in the multidimensional space corresponds to one movement trajectory represented by Expression 2 above. More specifically, the movement trajectories are obtained as a result of tracking not only pixels in one image but also pixels over temporally-different images. In the multidimensional space shown in FIG. 9(b), a distance between the dots corresponds to a geodesic distance calculated according to Expression 20 or 21, instead of a Euclidean distance between vectors. Here, an infinite distance is not applicable.

An example of the clustering shown in FIG. 9(c) is explained. Suppose that a distance between the movement trajectories a and b calculated according to Expression 3 or 4 is represented as f (a, b). In this case, in the multidimensional space shown in FIG. 9(b), the following holds: f (e, f)>f (c, d)>f (f, g)>f (b, c). When R is set as the threshold, only the distance f (e, f) is larger than the threshold R. In this case, when the geodesic distance is calculated according to Expression 20, $g_p$ (e, f) becomes infinite. On this account, the distance g (e, f) obtained as a result of integrating the geodesic distances according to Expression 21 or 22 also becomes infinite. Accordingly, the region extraction unit 107 determines that a discontinuous point is between the movement trajectories e and f. Thus, the geodesic distances between the movement trajectories a to d and the movement trajectory e do not cross the discontinuous point g (e, f) and thus are not transformed into infinite distances. On the other hand, each geodesic distance between one of the movement trajectories f to h and one of the movement trajectories a to e crosses the discontinuous point g (e, f) and thus is transformed into an infinite distance. To be more specific, when the geodesic distance between the movement trajectories i and j is not transformed into an infinite distance, this pair of movement trajectories i and j belongs to the same cluster. When the geodesic distance between the movement trajectories i and j is transformed into an infinite distance, these movement trajectories i and j belong to respective different clusters. Therefore, as shown in FIG. 9(c), the movement trajectories are classified into two clusters $\theta_1$ and $\theta_2$. The movement trajectories a to e corresponding to the upper body belong to the cluster $\theta_1$, and the movement trajectories f to h corresponding to the lower body belong to the cluster $\theta_2$. That is to say, these clusters are obtained as a result of directly performing the region extraction processing.

Moreover, as described later, moving objects may be separately extracted through the processing from step S201 to step S208 using different parameters. Here, when the region extraction is performed without using a movement trajectory having no movements, the resultant regions correspond to the respective moving objects. On account of this, in the present specification, it is not particularly necessary to distinguish between the processing of detecting an individual moving object and the processing of extracting regions corresponding to the moving objects in the image. Furthermore, when the region extraction is performed using a movement trajectory having no movements as well, it is possible, for example, to detect a region with the maximum size as a background and the rest as the moving object. However, the method of detecting the moving object from the result of the region extraction is not limited to this.

As described thus far, the moving object detection apparatus 100 in the present embodiment performs the region extraction on the similar movement trajectories clustered based on the distance between pixels or the similarity between the movement trajectories. Thus, the parts which are close to each other and show the similar movements are recognized as one region. Then, as a result of temporally tracking the regions of the moving object in the video sequence, the moving object or a part of the moving object can be detected and an image region including the moving object can be extracted, regardless of the pose of the articulated moving object. Also, it is unnecessary to set candidate regions as preprocessing. On top of that, advance information, such as shape information, on the target moving object does not need to be held or learned beforehand. Moreover, since the clustering is performed using thresholds based on the similarity between the movement trajectories, false detection of candidate regions and false region extraction resulting from such false detection do not occur. Such false detection becomes a problem especially when the image includes moving objects in various sizes or when a part of a moving object is occluded.

Furthermore, the geodesic distances are calculated for each of the subsets and are then integrated using the common points, so as to obtain the geodesic distance bridging over the subsets. Therefore, the geodesic distance between all the pairs of movement trajectories can be calculated with a smaller amount of calculation, as compared to the case where the movement trajectories are not divided into subsets. This allows the moving object detection to be performed at high speed.

Accordingly, the moving object detection apparatus 100 performs region extraction, namely, moving object detection, with accuracy at high speed on the pictures including an image of the moving object such as a person that moves and changes shape, regardless of the pose or size of the moving object.

(First Modification of First Embodiment)

A moving object detection apparatus in the first modification of the first embodiment according to the present invention is explained as follows.

The present modification describes an example of a case where the segmentation into subsets is performed according to a method different from the method used in the first embodiment.

The moving object detection apparatus in the first modification has the same configuration as the one described in the first embodiment, except that the segmentation unit 103 performs different processing. Therefore, the explanation about the same components is omitted here.

As mentioned, the present modification is different from the first embodiment in the processing performed by the segmentation unit 103. In the first embodiment above, as shown in FIG. 5, the position space of the image 401 is divided into the P number of subsets 402. In the present modification, movement trajectories as represented by Expression 2 in the multidimensional space are divided into a P number of subsets. That is, in the multidimensional space that presents a movement trajectory, i.e., a multidimensional vector, movement trajectories are classified into subsets so that the similar movement trajectories belong to the same subset.

The processing performed here is explained with reference to the flowchart shown in FIG. 3. The processes of steps S201 to S203 are the same as those in the first embodiment and, therefore, the explanation is omitted.

Figure 10:
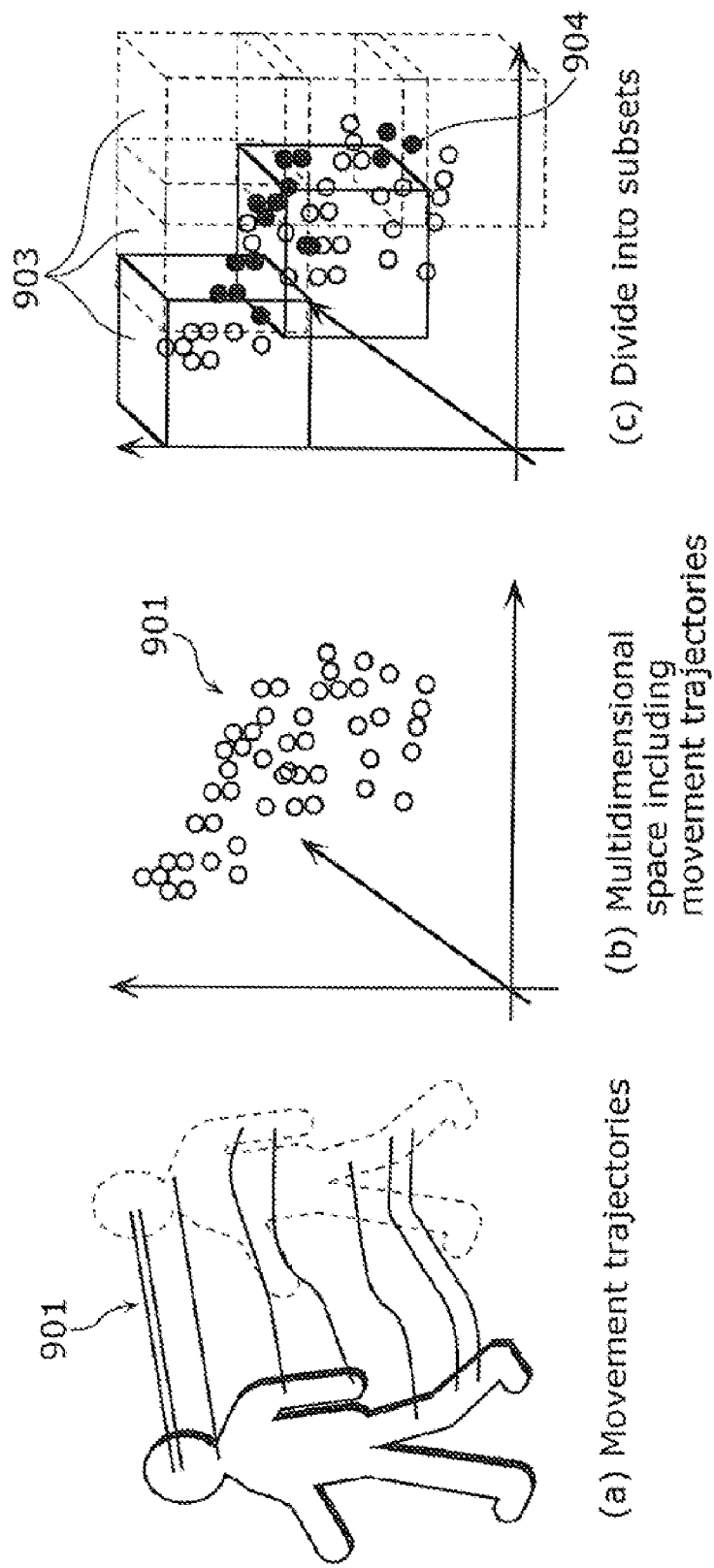
FIG. 10 is a diagram showing an example of processing performed by a segmentation unit in a first modification of the first embodiment according to the present invention.

In step S204, the segmentation unit 103 divides the movement trajectories represented by Expression 2 in the multidimensional vector space, as shown in FIG. 10(a) to (c). FIG. 10(a) shows movement trajectories 901, and FIG. 10(b) shows a conceptual diagram showing the movement trajectories 901 of FIG. 10(*a*) in the multidimensional vector space. Here, a multidimensional vector, i.e., a dot in a multidimensional vector space, corresponds to a movement trajectory represented by Expression 2 above. More specifically, FIG. 10(*b*) shows a result of tracking not only pixels in one image but also pixels over temporally-different images. The segmentation unit 103 divides the multidimensional vector space into sub-regions as shown in FIG. 10(*c*). A subset 903 is a group of dots, i.e., a group of movement trajectories, existing in an individual subset in the multidimensional vector space. In FIG. 10(*c*), common points 904 are indicated as filled-in dots. The subsets 903 may be set in the multidimensional vector space so as to overlap one another, and then the movement trajectories belonging to the overlapping regions may be set as the common points 904. Also, as is the case explained using FIG. 5(*c*) above, the movement trajectories close to the boundary with an adjacent subset 903 in the multidimensional vector space may be set as the common points 904. Or, the subsets 903 may be spatially dense and the common points 904 may be spatially sparse. Furthermore, the subset 903 is not necessarily a rectangular parallelepiped in shape as shown in FIG. 10(*c*), or in reality, an n-dimensional rectangular parallelepiped. For example, the subset 903 may be in the shape of a hypersphere, hyperelliptic, or n-dimensional polyhedron. It is preferable that subsets collectively include all the movement trajectories.

Here, a different method employed in step S204 is described. First, the following calculation is performed on all the movement trajectories.

$$f(i,j)=ptn_{ij}+w \cdot mtn_{ij} \qquad \text{Expression 24}$$

Here, i and j represent all the movement trajectories calculated according to Expression 2. Also, $ptn_{ij}$ and $mtn_{ij}$ are defined according to Expressions 5 to 7, respectively. Next, a distance matrix f (i, j), which is a matrix of distances each between the movement trajectories, calculated according to Expression 24 is considered as row vectors of movement trajectories. To be more specific, a row vector of the i-th row corresponds to the movement trajectories i. Then, each row vector can be considered as a multidimensional vector. On this account, the row vectors of the aforementioned distance matrix can be conceptually represented by the dots in the multidimensional space shown in FIG. 10(*b*). Thus, in the multidimensional vector space, the movement trajectories can be divided into the subsets as shown in FIG. 10(*c*), as in the case of the first embodiment above.

Moreover, in the multidimensional space where the multidimensional vectors are presented, PCA may be performed using the movement trajectories, that is, the aforementioned multidimensional vectors. PCA can reduce the multidimensional vector space to a lower dimensional space. For example, when the multidimensional vector space is reduced to a two-dimensional space, the movement trajectories can be divided into the subsets through the same segmentation performed in the position space of the image as shown in FIG. 5.

The processes performed in step S209 and the subsequent steps are the same as those in the first embodiment and, therefore, the explanation is omitted here.

As described thus far, the moving object detection apparatus in the first modification performs the region extraction on the similar movement trajectories clustered based on the distance between pixels or the similarity between the movement trajectories. Thus, the parts which are close to each other and show the similar movements are recognized as one region. Then, as a result of temporally tracking the regions of the moving object in the video sequence, the moving object or a part of the moving object can be detected and an image region including the moving object can be extracted, regardless of the pose of the articulated moving object. Also, it is unnecessary to set candidate regions as preprocessing. On top of that, advance information, such as shape information, on the target moving object does not need to be held or learned beforehand. Moreover, since the clustering is performed using thresholds based on the similarity between the movement trajectories, false detection of candidate regions and false region extraction resulting from such false detection do not occur. Such false detection becomes a problem especially when the image includes moving objects in various sizes or when a part of a moving object is occluded.

Accordingly, the moving object detection apparatus in the present modification performs region extraction, namely, moving object detection, with accuracy at high speed on the pictures including an image of the moving object such as a person that moves and changes shape, regardless of the pose or size of the moving object.

(Second Modification of First Embodiment)

A moving object detection apparatus in the second modification of the first embodiment according to the present invention is explained as follows.

The present modification describes an example of a case where the region extraction unit 107 performs region extraction according to a method different from the method used in the first embodiment.

The moving object detection apparatus in the second modification has the same configuration as the one described in the first embodiment, except that the region extraction unit 107 performs different processing. Therefore, the explanation about the same components is omitted here.

As mentioned, the present modification is different from the first embodiment in the processing performed by the region extraction unit 107. More specifically, the region extraction unit 107 performs dimensionality reduction on a geodesic distance matrix and then executes clustering on the movement trajectories in the lower dimensional space, so as to achieve the region extraction, that is, the moving object detection.

Figure 11:
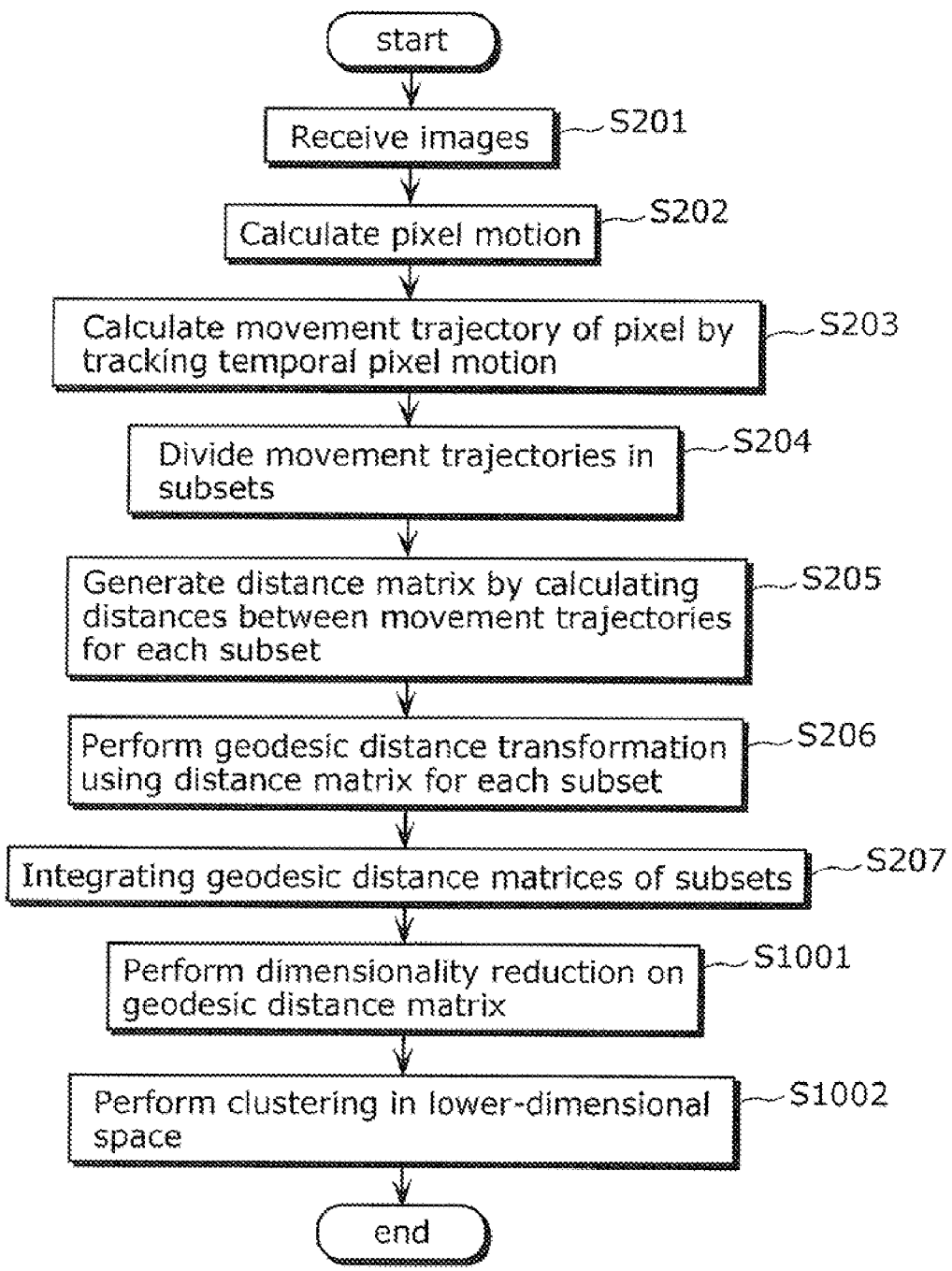
FIG. 11 is a flowchart showing a basic operation of a moving object detection apparatus in a second modification of the first embodiment according to the present invention.

The processing performed here is explained with reference to the flowchart shown in FIG. 11. The processes of steps S201 to S207 are the same as those in the first embodiment and, therefore, the explanation is omitted.

In step S1001, the region extraction unit 107 performs dimensionality reduction on the geodesic distance matrix obtained in step S207. The dimensionality reduction can be achieved by obtaining an eigensystem after performing Young-Householder transformation. With this technique, data distributed in the multidimensional space is efficiently projected onto a lower-dimensional space. Also, this technique can provide data robust to noise of input data. Here, noise occurs in the case where the motion information includes an error when the movement trajectory is calculated according to Expression 2 above.

To be more specific, suppose here that the nonlinear distance matrix is expressed as below.

$$G=\{g(i,j)\} \qquad \text{Expression 25}$$

Then, the region extraction unit 107 performs Young-Householder transformation, by which a centered matrix "H" is multiplied from both sides, on Expression 25 as follows.

This transformation is performed so as to transform an inter-point distance matrix into a barycentric distance matrix.

$$\tau(G) = \frac{HG^{(2)}H}{2} \qquad \text{Expression 26}$$

Here, "H" represents a centered matrix and is expressed as follows.

$$H_{ij} = (I - 1/N) \qquad \text{Expression 27}$$

Here, "I" represents a unit matrix and "N" represents the number of movement trajectories calculated according to Expression 2.

Also, the following expression is formulated.

$$G^{(2)} = \{g(i,j)^2\} \qquad \text{Expression 28}$$

Next, in order to perform the dimensionality reduction, the region extraction unit 107 calculates a Q number of eigenvectors $e_q$ of T(G) and eigenvalues $\lambda q$ corresponding to the eigenvectors $e_q$.

Suppose that the following expression is formulated.

$$g^i = (g(i,0), g(i,1), \ldots, g(i,N)) \qquad \text{Expression 29}$$

In this case, a result of projecting "$g^i$" onto a lower-dimensional space can be represented as data "$z^i_q$" as follows.

$$z_n^i = \sqrt{\lambda_q} e_q^i \qquad \text{Expression 30}$$

Note that "$e^i_q$" represents the i-th element of the q-th eigenvector $e_q$. Also note that "Q" representing the number of eigenvectors may be determined empirically according to scenes, or may be determined based on a contribution ratio "$a_Q$" calculated from the eigenvalues $\lambda q$ as follows.

$$a_Q = \frac{\sum_{q=1}^{Q} \lambda_q}{\sum_{q=1}^{N} \lambda_q} \qquad \text{Expression 31}$$

Here, Q represents the number of eigenvectors to be used, that is, the number of dimensions in the lower-dimensional space, and N represents the total number of eigenvectors. Thus, Q obtained when the contribution ratio $a_Q$ is equal to or larger than a fixed value may be set as the number of eigenvectors.

Accordingly, the movement trajectory i calculated according to Expression 2 can be associated with the data $z^i_q$ provided by the eigenvector $e_q$ in the space obtained through the nonlinear dimensionality reduction.

Figure 12:
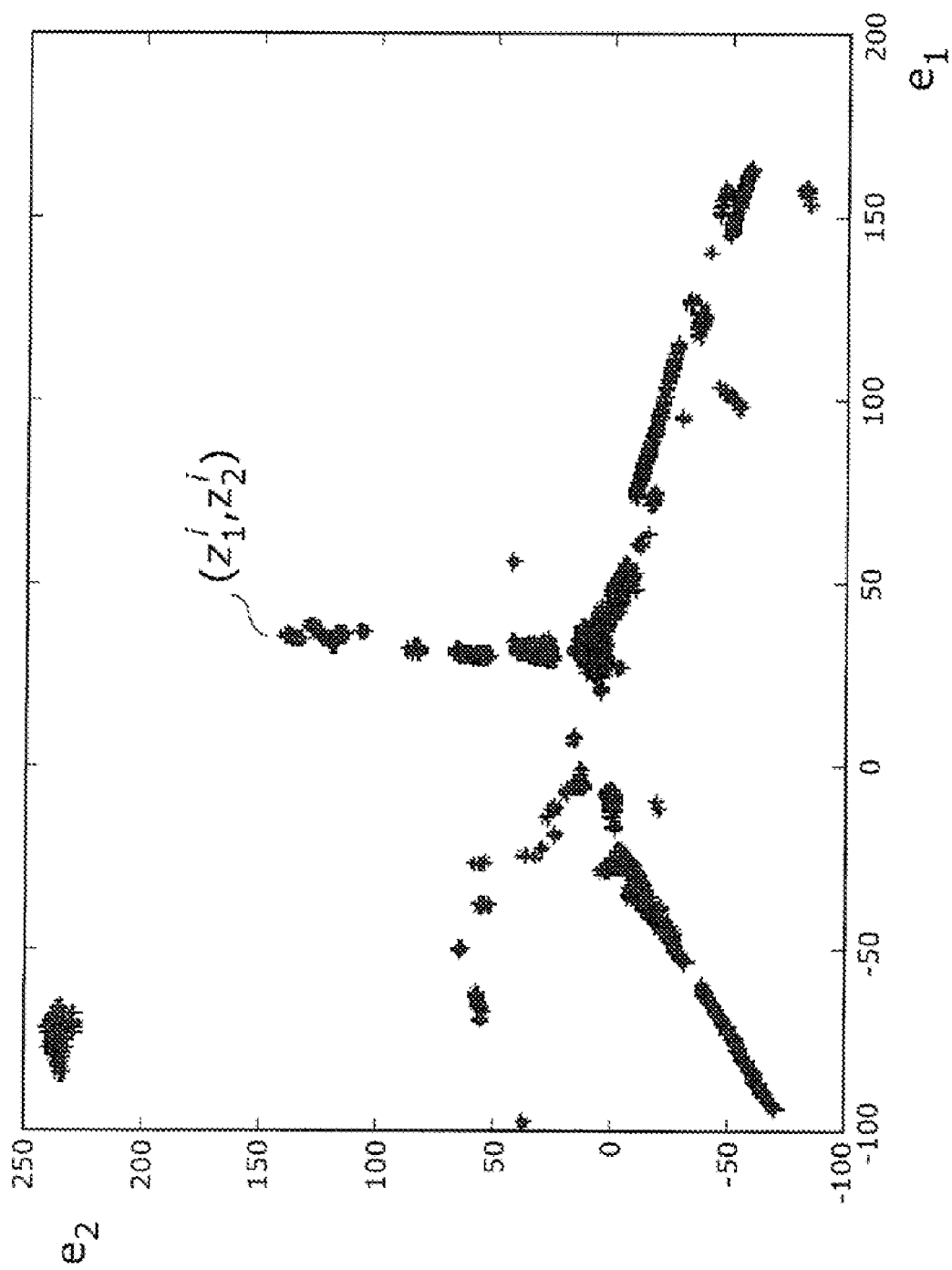
FIG. 12 is a diagram showing a result of dimensionality reduction performed by a region extraction unit in the second modification of the first embodiment according to the present invention.

FIG. 12 is a diagram showing a result of projecting the movement trajectory i onto the space obtained through the nonlinear dimensionality reduction. The horizontal and vertical axes indicate eigenvectors "$e_1$" and "$e_2$", respectively. A dot represented as ($z^i_1$, $z^i_2$) projected onto two dimensions is a result of projecting $g^i$. Here, the data $z^i_q$ in the lower-dimensional space has a one-to-one correspondence with the temporal movement trajectory $x^i$ corresponding to the pixel i on the image. On account of this, the dot represented as ($z^i_1$, $z^i_2$) can be considered to correspond to the movement trajectory i. In the present modification, the number of dimensions in the lower-dimensional space is two in order to visualize the result. However, the number of dimensions does not necessarily need to be two, and the data can be projected with a higher degree of accuracy when the number of dimensions is larger.

Next, in step S1002, the region extraction unit 107 performs clustering on the data projected onto the space which has been reduced in step S1001 as shown in FIG. 12, so as to achieve the moving object detection and region extraction.

A segment is expressed as follows. The segment refers to a region to be extracted, which is to say, the segment corresponds to a result of the moving object detection.

$$\theta = \{\theta_1, \ldots \theta_m \ldots \theta_M\} \qquad \text{Expression 32}$$

Here, "M" represents the number of segments and is determined empirically according to scenes. Note that M used here is different from M included in Expression 23 above.

Each segment region $\theta_m$ is expressed by a parameter below.

$$\overline{z_m}, Z_m$$

Here, $$\overline{z_m}$$

represents a mean value of coordinate values of data belonging to the segment region $\theta_m$ in the lower-dimensional space, and "$Z_m$" represents a covariance matrix related to the coordinate values of data belonging to the segment $\theta_m$.

Note that an initial value of $$\overline{z_m}$$

may be determined on a random basis. Alternatively, the lower-dimensional space may be evenly divided into a grid, and coordinate values at an intersection point may be set as the initial value.

Note that $$\overline{z_m}, Z_m$$

can be expressed as follows.

$$\overline{z_m} = \begin{bmatrix} \overline{z_1^m} \\ \vdots \\ \overline{z_P^m} \end{bmatrix} \qquad \text{Expression 33}$$

$$z_m = \frac{1}{C_m} \sum_{c_m=1}^{C_m} \begin{bmatrix} z_1^{c_m} - \overline{z_1^m} \\ \vdots \\ z_P^{c_m} - \overline{z_P^m} \end{bmatrix} [z_1^{c_m} - \overline{z_1^m} \ \ldots \ z_P^{c_m} - \overline{z_P^m}] \qquad \text{Expression 34}$$

Here, "$C_m$" represents the number of data pieces belonging to the segment $\theta_m$ in the lower-dimensional space.

A specific calculation method is explained as follows. First, the region extraction unit 107 calculates the segment $\theta_m$ to which the data $z_i$ of the lower-dimensional space belongs, using a distance function in the following expression.

$$\psi_m(z_i) = \phi_m(z_i) + \ln|Z_m| - \ln p(\omega_m) \qquad \text{Expression 35}$$

Here, "$\psi_m(z_i)$" represents a distance between the data $z_i$ corresponding to the movement trajectory i in the lower-dimensional space and the corresponding segment $\theta_m$. Each of the data pieces belong to the segment $\theta_m$ where $\psi_m(z_i)$ is at the minimum value. Note that "$\phi_m(zi)$" represents a Mahalanobis distance and is expressed as follows.

$$\phi_m(z_i) = (z_i - \overline{z_m})^t Z_m^{-1} (z_i - \overline{z_m}) \qquad \text{Expression 36}$$

Also note here that $\phi_m(zi)$ may be used in place of $\psi_m(z_i)$.

Moreover, "$p(\omega_m)$" may be set as a constant value. Or, when the segmentation is performed on a predetermined moving object, such as a person, "$p(\omega_m)$" may be set in advance based on the shapes or area ratios of body parts. Note that $\omega_m$ represents a weighting factor of the segment $\theta_m$.

Next, the region extraction unit 107 updates the parameter described below using the data $z_i$ belonging to the segment $\theta_m$, based on the calculation result of Expression 35, as follows.

$$\overline{z_m}, Z_m \qquad \text{Expression 37}$$

$$\overline{z_m} = \frac{\sum_{c_m=1}^{C_m} \omega_{c_m} z_{c_m}}{\sum_{c_m=1}^{C_m} \omega_{c_m}}$$

$$Z_m = \frac{\sum_{c_{mk}=1}^{C_m} \omega_{c_m}^2 (z_{c_m} - \overline{z_m})(z_{c_m} - \overline{z_m})^t}{\sum_{c_m=1}^{C_m} \omega_{c_m}^2} \qquad \text{Expression 38}$$

Here, $$Z_{c_m}$$

represents the data belonging to the segment $\theta_m$ in the lower-dimensional space. Note that w may be set to be equal to 1, or may be adjusted according to a difference from the mean value of the input data. In this way, the region extraction unit 107 can calculate the segment $\theta_m$ to which the data in the lower-dimensional space belongs, by repeating the distance calculation and parameter update according to Expressions 35 to 38 a predetermined number of times. In addition to the above processing, a different clustering method, such as the k-means clustering algorithm or a competitive learning algorithm, may be employed.

Figure 13:
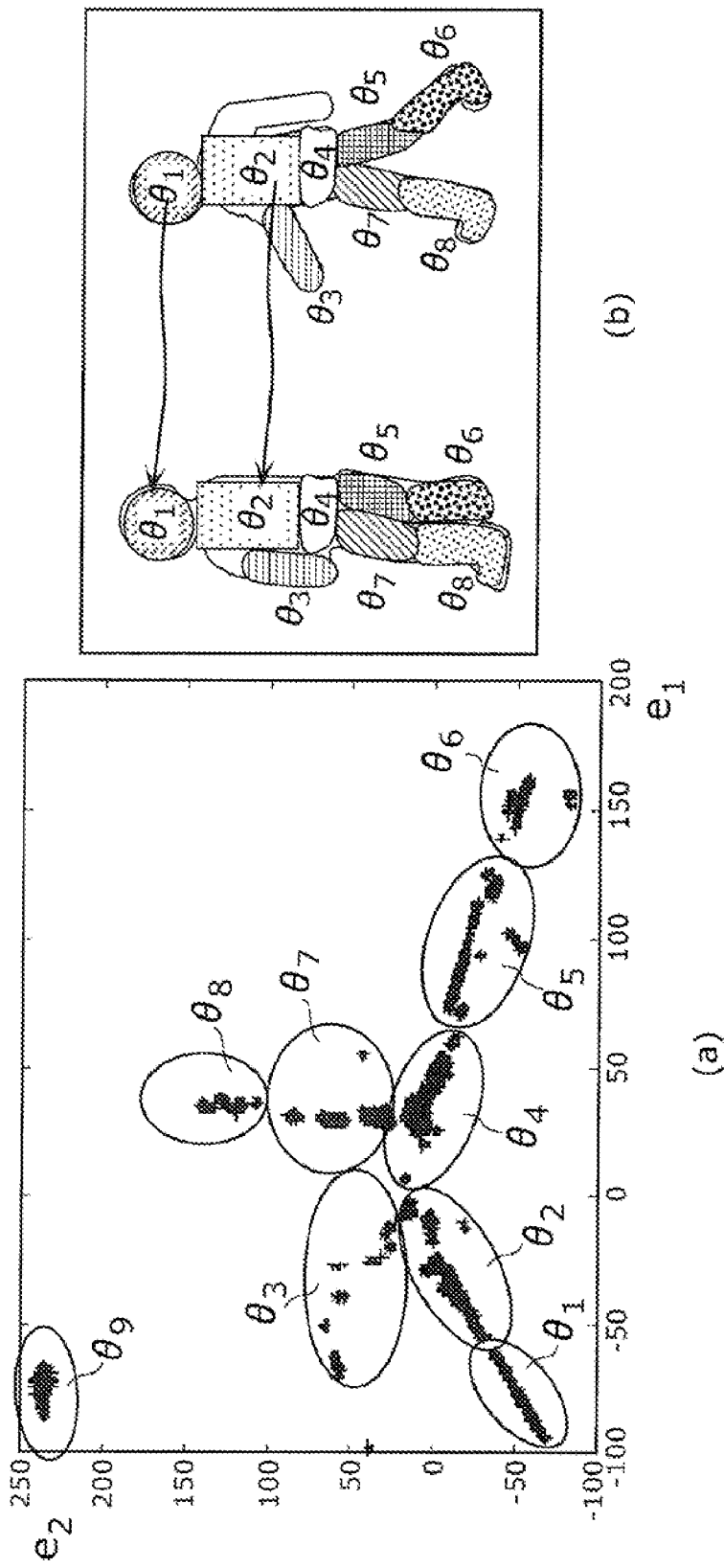
FIG. 13 is a diagram showing a result of moving object detection performed by the region extraction unit in the second modification of the first embodiment according to the present invention.

FIG. 13(*a*) and (*b*) is a diagram showing an example in which an image of a walking person is received as an input and the segmentation is performed on the data in the lower-dimensional space, in the case where M=9. The correspondences of the segments $\theta_1$ to $\theta_9$ of the image in the lower-dimensional space are as follows. The segment $\theta_1$ corresponds to the head region of the person; the segment $\theta_2$ corresponds to the upper body region; the segment $\theta_3$ corresponds to the arm region; the segment $\theta_4$ corresponds to the lower body region; the segments $\theta_5$ and $\theta_7$ correspond to the thigh regions; and the segments $\theta_6$ and $\theta_6$ correspond to the lower leg regions. The segment $\theta_9$ mainly corresponds to a part of a background.

As indicated by the arrows in FIG. 13(*b*), the segments in the lower-dimensional space are obtained as a result of tracking not only pixels in one image but also pixels over temporally-consecutive images. More specifically, as a result of dividing the lower-dimensional space into the segments and temporally tracking the regions of the moving object in the image sequence, the moving object or the body part of the moving object included in the image sequence can be detected and the image including the object can be extracted.

Also, moving objects can be detected in the same method described above, by changing the parameters. To be more specific, the threshold R in Expression 14 or 15 may be set larger than in the case of the segmentation into body parts.

Figure 14:
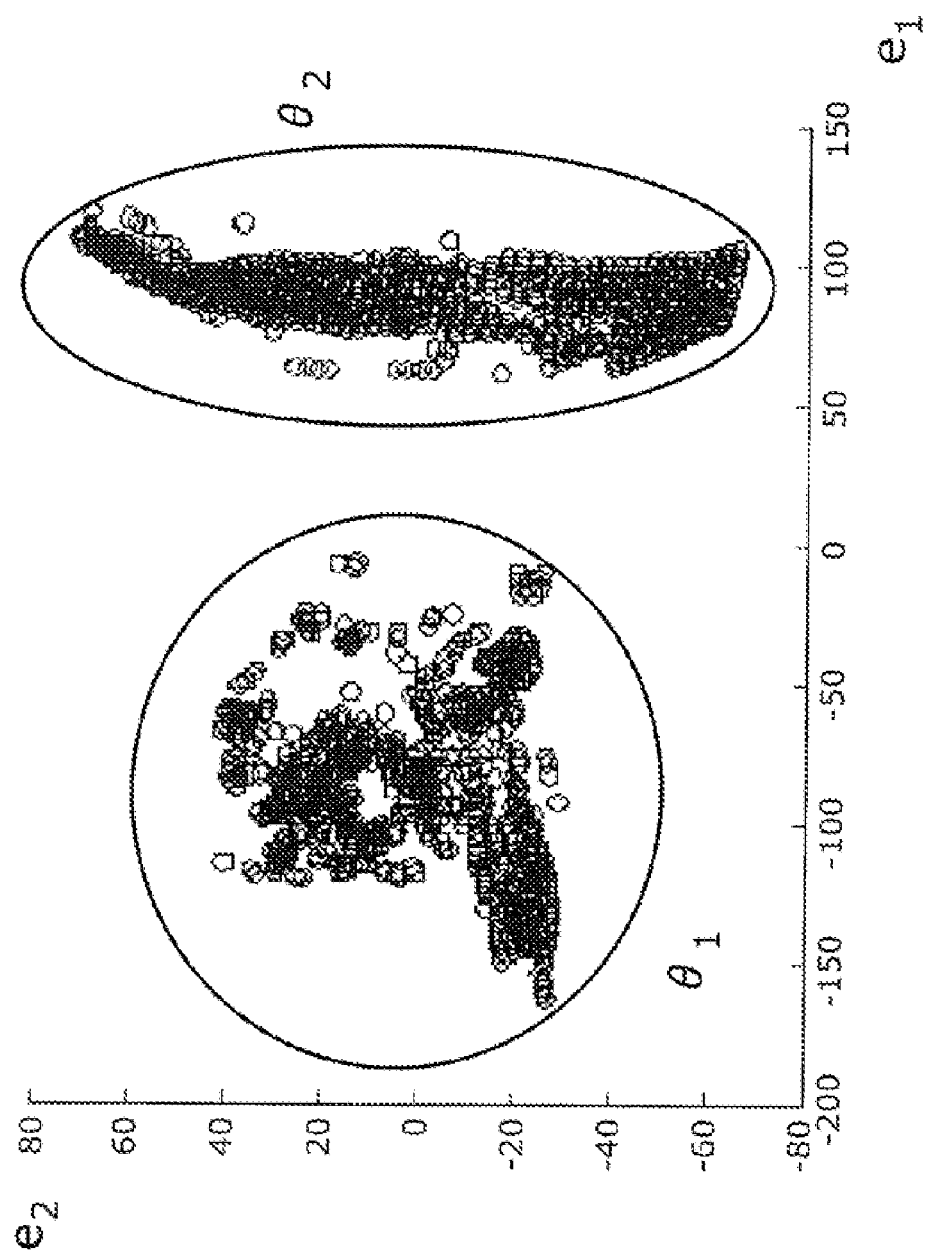
FIG. 14 is a diagram showing a result of dimensionality reduction performed by the region extraction unit in the second modification of the first embodiment according to the present invention.

FIG. 14 is a diagram showing an example of the result of the case where an image including a walking person and a traveling bicycle is received as an input and the segmentation is performed on the data projected in the lower-dimensional space, where M=2. The correspondences of the segments $\theta_1$ and $\theta_2$ of the image in the lower-dimensional space are as follows. The segment $\theta_1$ corresponds to the motion of the bicycle in the image; and the segment $\theta_2$ corresponds to the walking motion of the person in the image. Accordingly, as a result of performing the segmentation in the lower-dimensional space, the motions of the bicycle and person can be separately detected, that is, the corresponding regions can be separately extracted, in an easy and stable manner.

In the present modification, unlike the case of Expression 2, a movement trajectory with no movements is not used as an input. For this reason, only two moving objects which are one person and one bicycle traveling are projected onto the lower-dimensional space. It should be obvious that a movement trajectory with no movements may be used as an input. Here, as in the case of the first embodiment, the segments in the lower-dimensional space are obtained as a result of tracking not only pixels in one image but also pixels over temporally-consecutive images. More specifically, as a result of dividing the lower-dimensional space into the segments and temporally tracking the regions of the moving objects in the image sequence, each of the moving objects can be detected.

As described thus far, the moving object detection apparatus in the second modification performs the region extraction on the similar movement trajectories which are robust to noise such as false motion detection, by performing the clustering after the dimensionality reduction, based on the distance between pixels or the similarity between the movement trajectories. Thus, the parts which are close to each other and show the similar movements are recognized as one region. Then, as a result of temporally tracking the regions of the moving object in the video sequence, the moving object or a part of the moving object can be detected and an image region including the moving object can be extracted, regardless of the pose of the articulated moving object. Also, it is unnecessary to set candidate regions as preprocessing. On top of that, advance information, such as shape information, on the target moving object does not need to be held or learned beforehand. Moreover, since the clustering is performed using thresholds based on the similarity between the movement trajectories, false detection of candidate regions and false region extraction resulting from such false detection do not occur. Such false detection becomes a problem especially when the image includes moving objects in various sizes or when a part of a moving object is occluded.

Accordingly, the moving object detection apparatus in the present modification performs region extraction, namely, moving object detection, with accuracy at high speed on the pictures including an image of the moving object such as a person that moves and changes shape, regardless of the pose or size of the moving object.

(Third Modification of First Embodiment)

A moving object detection apparatus in the third modification of the first embodiment according to the present invention is explained as follows.

The present modification describes an example of a case where criteria are set for the region extraction explained in the first embodiment, and candidates for the region extraction are accordingly generated. Then, the region extraction is achieved by selecting, from among the generated candidates, the candidate having the number closest to a predetermined number of moving objects.

Figure 15:
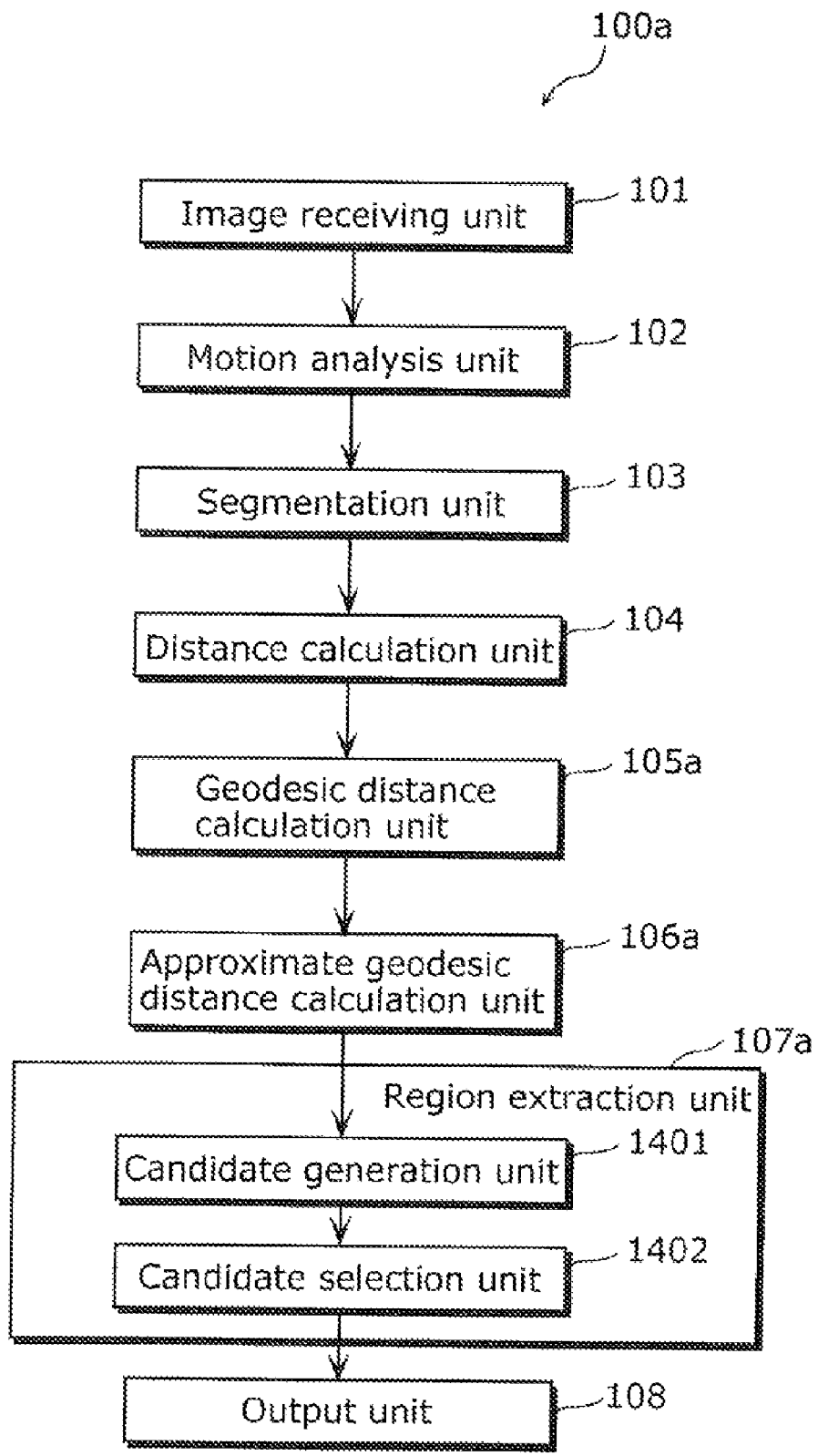
FIG. 15 is a diagram showing a basic configuration of a third modification of the first embodiment according to the present invention.

FIG. 15 is a diagram showing a configuration of a moving object detection apparatus 100*a* in the third modification of the first embodiment. As shown in FIG. 15, the moving object detection apparatus 100*a* includes an image receiving unit 101, a motion analysis unit 102, a segmentation unit 103, a distance calculation unit 104, a geodesic distance transformation unit 105*a*, an approximate geodesic distance calculation unit 106*a*, a region extraction unit 107*a*, and an output unit 108. The region extraction unit 107a has a candidate generation unit 1401 and a candidate selection unit 1402. The moving object detection unit 100a detects the moving object in a video sequence by performing region extraction to determine a region showing the whole or a part of the moving object in the video sequence.

The image receiving unit 101, the motion analysis unit 102, the segmentation unit 103, and the distance calculation unit 104 are identical to those described in the first embodiment and, therefore, the explanation thereof is omitted here.

The geodesic distance transformation unit 105a is a processing unit which: generates criteria, or thresholds, for the distance matrix of each subset calculated by the distance calculation unit 104; and performs geodesic distance transformation for each of the generated criteria so as to generate geodesic distances for each of the criteria.

The approximate geodesic distance calculation unit 106a is a processing unit which calculates, for each of the criteria, an approximate geodesic distance bridging over the subsets by integrating the geodesic distance matrices of the subsets calculated by the geodesic distance transformation unit 105a.

The candidate generation unit 1401 is a processing unit which: performs the region extraction by clustering movement trajectories calculated by the motion analysis unit 102 based on the geodesic distance matrix integrated for each of criteria by the approximate geodesic distance calculation unit 106a; and generates a result of the region extraction as candidates for the region extraction. To be more specific, the candidate generation unit 1401 detects, using a threshold, a discontinuous point in the distribution of distances each between the movement trajectories, and then performs clustering on the continuously distributed movement trajectories so that the movement trajectories separated by a geodesic distance equal to or shorter than a length of the detected discontinuous point are classified into one cluster. As a result, the candidate generation unit 1401 generates candidates for region extraction for each of the thresholds.

The candidate selection unit 1402 is a processing unit which: obtains an instruction regarding the number of classes by reference to a predetermined numeric value or by receiving an instruction from an external source such as a user; selects a candidate having the number of segments close to the obtained number of classes, from among the candidates generated by the candidate generation unit 1401; and then outputs the selected candidate as a result of performing the region extraction using the movement trajectories calculated by the motion analysis unit 102. More specifically, the candidate selection unit 1402 selects a region extraction result that indicates the number of regions closest to the instructed number of classes, from among the candidates generated by the candidate generation unit 1401 using the thresholds. That is to say, the candidate selection unit 1402 selects the region extraction result according to the instructed number of classes.

The output unit 108 is identical to the one described in the first embodiment. Therefore, the final result of the moving object detection and region extraction can be obtained.

Figure 16:
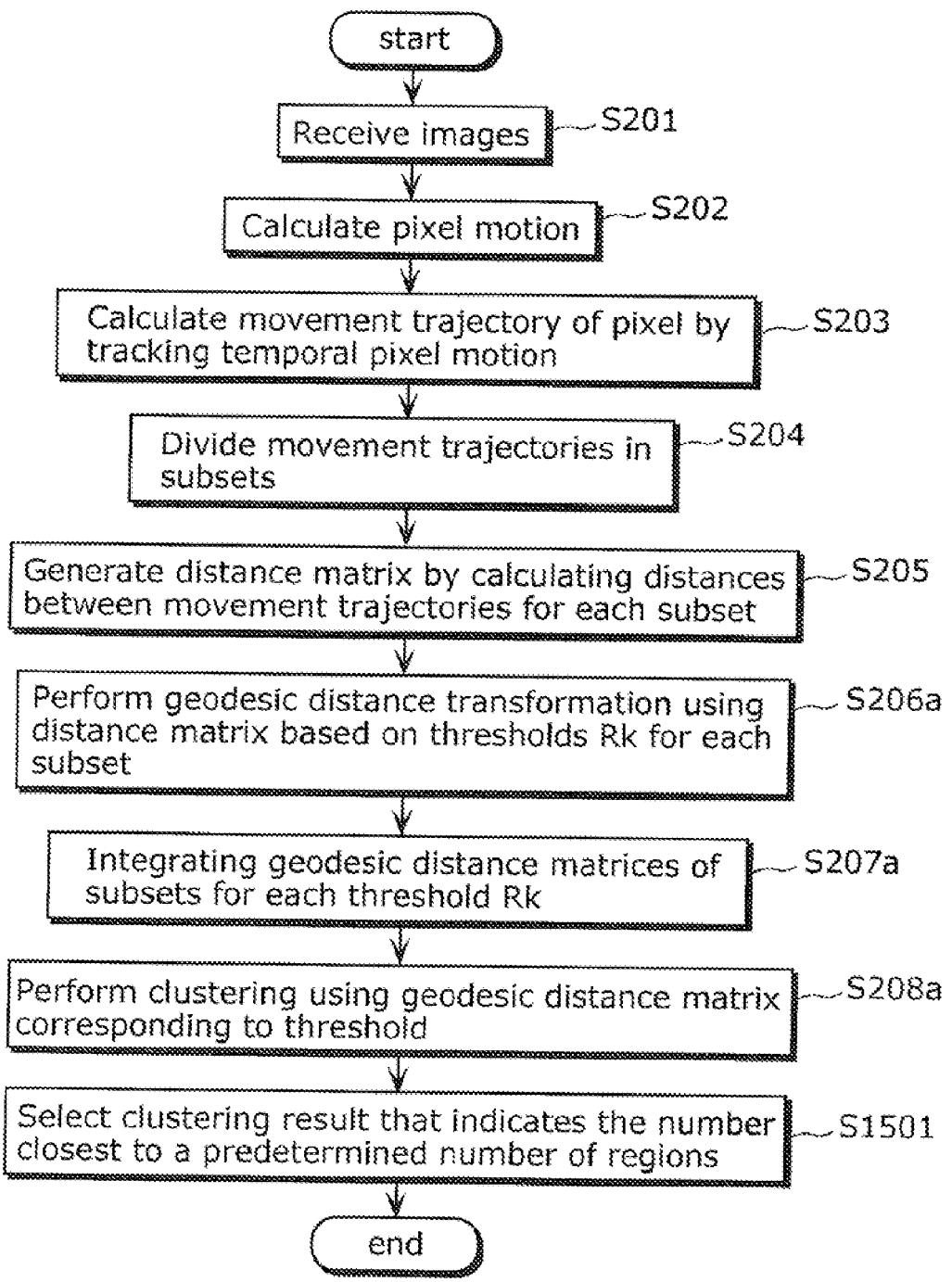
FIG. 16 is a flowchart showing a basic operation of a moving object detection apparatus in the third modification of the first embodiment according to the present invention.

The following is a detailed explanation about a moving object detection method, that is, an operation of the moving object detection apparatus 100a, in the third modification according to the present invention. The explanation is given based on an example of the moving object detection and region extraction, with reference to the flowchart shown in FIG. 16. Steps S201 to S205 are the same as those in the first embodiment and, therefore, the explanation thereof is omitted.

In step S206a, the geodesic distance transformation unit 105a generates a "K" number of thresholds "$R_k$" as the criteria for the linear distance $f_p(i, j)$ of the subset p calculated according to Expression 3 or 4, and calculates $f^k_p(i, j)$ for each of the thresholds by performing the nonlinear processing as follows using the K number of thresholds $R_k$.

$$f'^k_p(i, f) = \begin{cases} f_p(i, j) & \text{if } i \text{ is } R_k - NearestNeighbor \\ \infty & \text{otherwise} \end{cases} \quad \text{Expression 39}$$

Here, supposing that the movement trajectory i is currently being processed, an $R_k$ number of movement trajectories j are selected in ascending order of the linear distance measured from the movement trajectory i. Then, the distance between the movement trajectory i and each of the selected movement trajectories j is not changed, and the distance between the movement trajectory i and an unselected movement trajectory j is changed into an infinite distance. Although the movement trajectories j are selected in ascending order of the linear distance in the present example, the threshold $R_k$ may be set as follows.

$$f'_p(i, j) = \begin{cases} f_p(i, j) & \text{if } f_p(i, j) < R \\ \infty & \text{otherwise} \end{cases} \quad \text{Expression 40}$$

More specifically, the geodesic distance transformation unit 105a may select a predetermined number of movement trajectories j in ascending order of the linear distance separated from the movement trajectory i, for each of the linear distance matrices of the movement trajectories belonging to the subset p calculated by the distance calculation unit 104, using the K number of thresholds $R_k$. Then, after performing the nonlinear processing so as to change a distance between the movement trajectory i and an unselected movement trajectory into an infinite distance, the geodesic distance transformation unit 105a may transform each of such distances into a geodesic distance. Or, the geodesic distance transformation unit 105a may select movement trajectories j located at a distance equal to or shorter than a predetermined threshold from the movement trajectory i. Then, after performing the nonlinear processing so as to change a distance between the movement trajectory i and an unselected movement trajectory into an infinite distance, the geodesic distance transformation unit 105a may transform each of such distances into a geodesic distance.

It should be noted that the method of performing the nonlinear processing on the distance is not limited to the usage of the aforementioned function. Any method can be employed as long as the nonlinear transformation is performed on the distance related to the movement trajectories i and j.

Also, the processing according to Expression 39 or 40 may be performed after weighting the linear distance $f_p(i, j)$ by multiplying a weight calculated according to Expressions 16 and 17, as explained in the first embodiment.

Next, a geodesic distance is calculated as follows, using the nonlinear distance $f'_k(i, j)$.

$$g_p^k(i,j) = \min(f'^k_p(i,j), f'^k_p(i,s) + f'^k_p(s,j)) \quad \text{Expression 41}$$

Note that "min (x, y)" represents a function which returns a smaller one of x and y values. Also note that "s" indicates a movement trajectory s, and is a relay point to reach the movement trajectory j from the movement trajectory i. Here, the relay point s in $f^k_p(i, s)$ $f^k_p(s, j)$ is not limited to one point.

Also note that "p" corresponds to an individual subset and "k" corresponds to the thresholds $R_k$.

Next, in step S207a, the approximate geodesic distance calculation unit 106a calculates an approximate geodesic distance bridging over the subsets by integrating the geodesic distance matrices $g^k_p$ (i, j) of the subsets, for each of the thresholds $R_k$. More specifically, the integration processing is performed as follows, using the common point set in step S204.

$$g^k(i, h) = \min_c(g^k_p(i, c) + g^k_p(c, h)) \quad \text{Expression 42}$$

Here, "c" represents the common point which is the movement trajectory belonging to both of the subsets p and q. That is, this movement trajectory is present across the subsets. It should be noted that the common point does not necessarily belong to two subsets and may belong to three or more subsets. In Expression 21, "i" and "h" indicate the different movement trajectories which belong to the subsets p and q, respectively. Note that, as shown in the example of FIG. 5, the common point c is not limited to one point.

Here, $$\min_c$$

is a function for calculating Expression 42 for at least one common point c and, from the resultant values, selecting a minimum value. In the present case, the subsets are not limited to the pair of the subsets p and q, and thus the geodesic distance bridging over two or more subsets can be calculated. It should be obvious that calculation of connecting the common points can be performed for each threshold according to Expression 22 above.

Next, in step S208a, the candidate generation unit 1401 performs clustering by detecting a discontinuous point using the integrated geodesic distance matrix $g^k$ (i, j) corresponding to the threshold $R_k$. Here, the discontinuous point is located at a position where $g^k$ (i, j) becomes infinite between the movement trajectories i and j. An example of the result of the geodesic distance transformation performed for the thresholds $R_k$ is explained with reference to FIGS. 17(a) to (e). FIG. 17(a) shows movement trajectories "a" to "h", and FIG. 17(b) is a conceptual diagram showing the movement trajectories a to h of FIG. 17(a) in a multidimensional space. Although eight movement trajectories a to h are shown, a movement trajectory obtained on a per-pixel basis or on a per-block basis may be used in practice. In FIG. 17(b), one dot in the multidimensional space corresponds to one movement trajectory calculated according to Expression 2 above. More specifically, the movement trajectories are obtained as a result of tracking not only pixels in one image but also pixels over temporally-different pictures. In the multidimensional space, a distance between the dots corresponds to a geodesic distance, instead of a Euclidean distance between vectors.

When the threshold $R_k$ is a sufficiently large value, that is, when the threshold $R_k$ is larger than the maximum value of $f_p$ (i, j), for example, the geodesic distance $g^k$ (i, j) corresponding to each pair of the moving trajectories i and j does not become infinite as shown in FIG. 17(c). Therefore, the number of clusters is one since no discontinuous point is present. On the other hand, when the threshold $R_k$ is a sufficiently small value, that is, when the threshold $R_k$ is smaller than the minimum value of $f_p$ (i, j), for example, the geodesic distance $g^k_p$ (i, j) corresponding to each pair of the moving trajectories i and j becomes infinite. Therefore, the number of clusters is equal to the number of movement trajectories. In this case, it is efficient to set the value of the threshold $R_k$ between the maximum and minimum values of $f_p$ (i, j) and to perform clustering. An example of the clustering shown in FIG. 17(d) is explained. When $R_1$ is set as the threshold, the geodesic distance $g^1$ (e, f) calculated in step S207a of calculating an approximate geodesic distance becomes infinite. Accordingly, It is determined that a discontinuous point is between the movement trajectories e and f. Thus, the geodesic distances between the movement trajectories a to d and the movement trajectory e do not cross the discontinuous point $g^1$ (e, f) and thus are not transformed into infinite distances. On the other hand, each geodesic distance between one of the movement trajectories f to h and one of the movement trajectories a to e crosses the discontinuous point $g^1$ (e, f) and thus is transformed into an infinite distance. To be more specific, when the geodesic distance between the movement trajectories i and j is not transformed into an infinite distance, this pair of movement trajectories i and j belongs to the same cluster. When the geodesic distance between the movement trajectories i and j is transformed into an infinite distance, these movement trajectories i and j belong to respective different clusters. Therefore, as shown in FIG. 17(c), the movement trajectories are classified into two clusters $\theta_1$ and $\theta_2$. Moreover, suppose that $R^2$ which is smaller than $R_1$ is set as the threshold and that the following geodesic distances calculated in step S207a of calculating an approximate geodesic distance become infinite: $g^2$ (C, d), $g^2$ (e, f), and $g^2$ (f, g), as shown in FIG. 17(e). In this case, it is determined that discontinuous points are between the movement trajectories c and d, between the movement trajectories e and f, and between the movement trajectories f and g. Thus, as in the case of clustering as shown in FIG. 17(d), the movement trajectories are classified on the basis of whether or not the geodesic distance is infinite and are accordingly classified into four clusters $\theta_1$, $\theta_2$, $\theta_3$, and $\theta_4$. With the processing described thus far, the pair of movement trajectories not having an infinite geodesic distance is considered to be continuous and thus classified into the same cluster, and the pair of movement trajectories having an infinite geodesic distance is considered to be discontinuous and thus classified into different clusters according to the discontinuous point.

That is to say, the candidate generation unit 1401 may determine, for each of the movement trajectories calculated by the motion analysis unit 102, the N-th shortest distance separated from the present movement trajectory, and generate, as thresholds to be used for generating candidates for region extraction, distance values selected from the determined distances in a descending order.

Next, in step S1501, the candidate selection unit 1402 selects the clustering result that indicates the number of clusters closest to a predetermined number of classes or closet to the number instructed by an external source, from among the clustering results obtained in step S208a. In the case shown in FIGS. 17(a) to (e), when the number of classes M is set at 4, the clustering result obtained when the threshold is $R_2$, that is, the result shown in FIG. 17(e), is selected. When the number of classes M is set at 2, the clustering result obtained when the threshold is $R_1$, that is, the result shown in FIG. 17(d), is selected. Then, the output unit 108 outputs the result, assigning a label to each of the movement trajectories.

The third modification allows the region extraction to be performed in consideration of the pixel position and motion similarity, by calculating the distance between the movement trajectories according to Expression 3 or 4. The specific example of the clustering shown in FIG. 17 is explained. When M=2, the regions corresponding to the upper and lower bodies can be classified into different clusters because of a significant difference in movement between the lower and upper bodies. Also, when M=4, the regions corresponding to the head, arm, thigh, and lower leg can be classified into different clusters, which are more than those in the case where M=2, because of differences in movement between the head and the arm and between the thigh and the lower leg. It should be noted that the number of thresholds is not limited two, and any number of thresholds may be set. Here, suppose that there is no result indicating the number of clusters equal to the predetermined number of classes. In such a case: the result indicating the number closest to the predetermined number may be selected; the result indicating the number smaller than and closest to the predetermined number may be selected; or the result indicating the number larger than and closest to the predetermined number may be selected. Moreover, as in the examples of the clustering shown in FIGS. 17(d) and (e), the region extracted as corresponding to the upper body in FIG. 17(d) can be extracted as corresponding to the head and arm in FIG. 17(e). In other words, region extraction can be performed hierarchically. Thus, the region extraction reflecting the structure of the target object is possible. For example, when body movements during sports or walking is to be analyzed, it is possible to analyze a movement of a detailed part and also a rough movement of the object, such as a movement in the center of gravity in the region or movement of only the upper body, at the same time according to the number of classes.

Furthermore, using the present method, detection and region extraction can be performed for body parts of a single moving object and, in addition to this, when more than one moving object is present, detection and region extraction can also be performed for each of the moving objects.

In this way, clustering is performed, using thresholds, based on the discontinuous point calculated using the geodesic distance, and then the clustering result indicating the number of clusters closest to the predetermined number of classes is selected. As a result of this, detection and region extraction can be achieved.

As described thus far, the moving object detection apparatus 100a in the third modification performs the region extraction on the similar movement trajectories clustered based on the distance between pixels or the similarity between the movement trajectories. Thus, the parts which are close to each other and show the similar motions are recognized as one region. Then, as a result of temporally tracking the regions of the moving object in the video sequence, the moving object or a part of the moving object can be detected and an image region including the moving object can be extracted, regardless of the pose of the articulated moving object. Also, it is unnecessary to set candidate regions as preprocessing. On top of that, advance information, such as shape information, on the target moving object does not need to be held or learned beforehand. Moreover, since the clustering is performed using thresholds based on the similarity between the movement trajectories, false detection of candidate regions and false region extraction resulting from such false detection do not occur. Such false detection becomes a problem especially when the image includes moving objects in various sizes or when a part of a moving object is occluded.

Accordingly, the moving object detection apparatus in the present modification performs region extraction, namely, moving object detection, with accuracy at high speed on the pictures including an image of the moving object such as a person that moves and changes shape, regardless of the pose or size of the moving object.

(Fourth Modification of First Embodiment)

Figure 18:
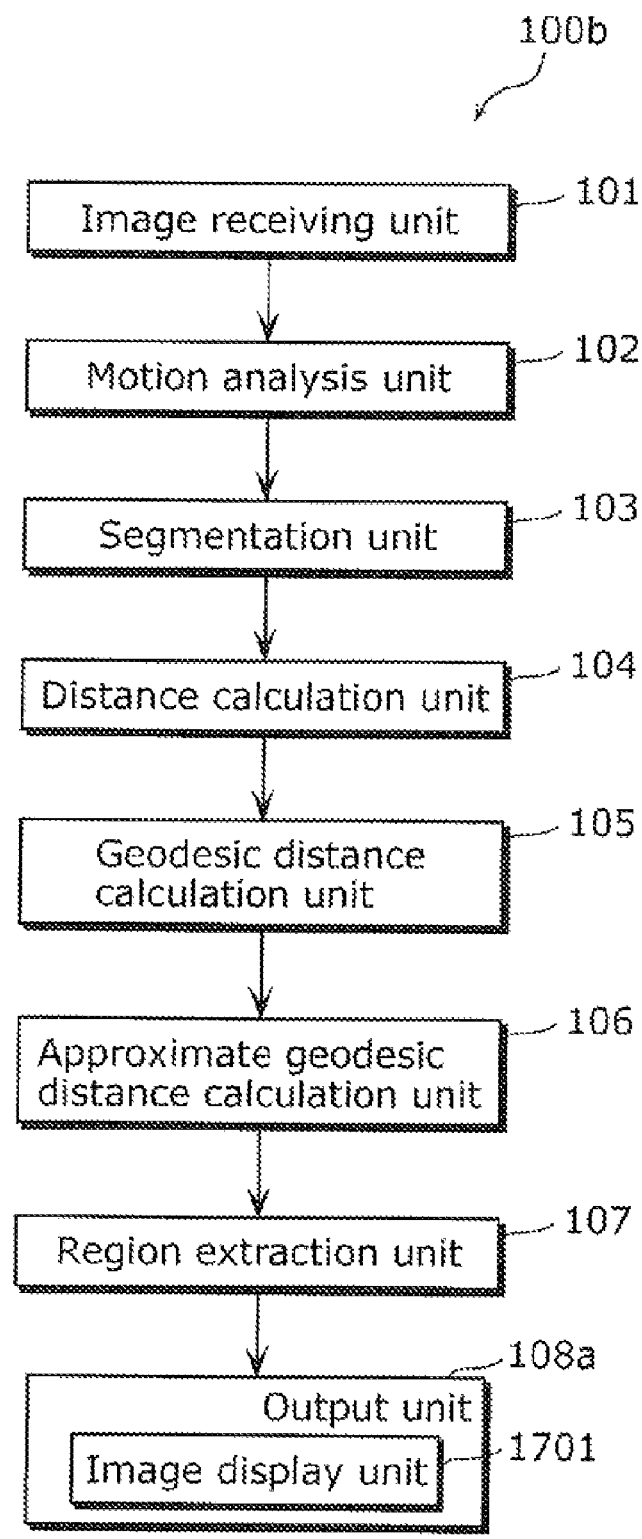
FIG. 18 is a diagram showing a basic configuration of a fourth modification of the first embodiment according to the present invention.

A moving object detection apparatus in the fourth modification of the first embodiment according to the present invention is explained as follows. The present modification describes an example of a case where a function of displaying, as an image, the result of moving object detection and region extraction of the first embodiment is added. A moving object detection apparatus 100b in the fourth modification basically has the same configuration as the one described in the first embodiment, as shown in FIG. 18. However, the moving object detection apparatus 100b includes an input unit 108a having an image display unit 1701, in place of the output unit 108 of the first embodiment. With this characteristic unit, a region extracted by the region extraction unit 107 can be displayed as an image on a monitor or the like.

In addition to the function of the output unit 108 in the first embodiment, the output unit 108a has the image display unit 1701. The image display unit 1701 is a processing unit which displays the result of region extraction performed by the region extraction unit 107 by superimposing the result on the video, i.e., the image, received by the image receiving unit 101. The image display unit 1701 is configured by a display, such as an LCD, and a display control unit for controlling the display. FIGS. 19(a) and (b) is a diagram showing examples displayed by the image display unit 1701. FIG. 19(a) shows a result of extraction according to the third modification in the case of performing the region extraction on moving objects when M=3. FIG. 19(b) shows a result of extraction in the case of performing the region extraction on one moving object when M=8. As shown, each extracted region $\theta_m$ of the image is, for example, color-coded so as to be identified on the monitor or the like. On the monitor, color-coding may be performed according to the moving objects as shown in FIG. 19(a), or the parts of the moving object may be separately displayed as shown in FIG. 19(b). As can be seen from FIG. 19, the moving object detection apparatus 100b in the present modification can detect the moving objects according to the above-described region extraction as shown in FIG. 19(a), and can also detect parts belonging to one moving object, that is, can extract regions from one moving object as shown in FIG. 19(b).

Here, the movement trajectory i represented by Expression 2 above corresponds to one of the regions $\theta_m$, except for outliers. On this account, by selecting a pixel in the picture on the basis of the movement trajectory i belonging to the region $\theta_m$ and performing color-coding according to a region label m, the extracted region can be easily displayed on the image. Accordingly, in addition to the advantageous effect of accurately performing region extraction on the video sequence including a person or the like that moves and changes shape as explained in the first embodiment, the moving object detection apparatus 100b in the fourth embodiment has the advantageous effect of allowing the user, by displaying the extracted region on the video, to easily identify an individual moving object, an individual part of the moving object, and even movements of the moving object and the part. Moreover, as another method, for a case where a predetermined number of regions or more are extracted, an alarm unit which sounds an alarm indicating the completion of region extraction instead of displaying the result may be provided in place of the image display unit. Alternatively, the alarm unit and the image display unit may be combined.

(Fifth Modification of First Embodiment)

Figure 20:
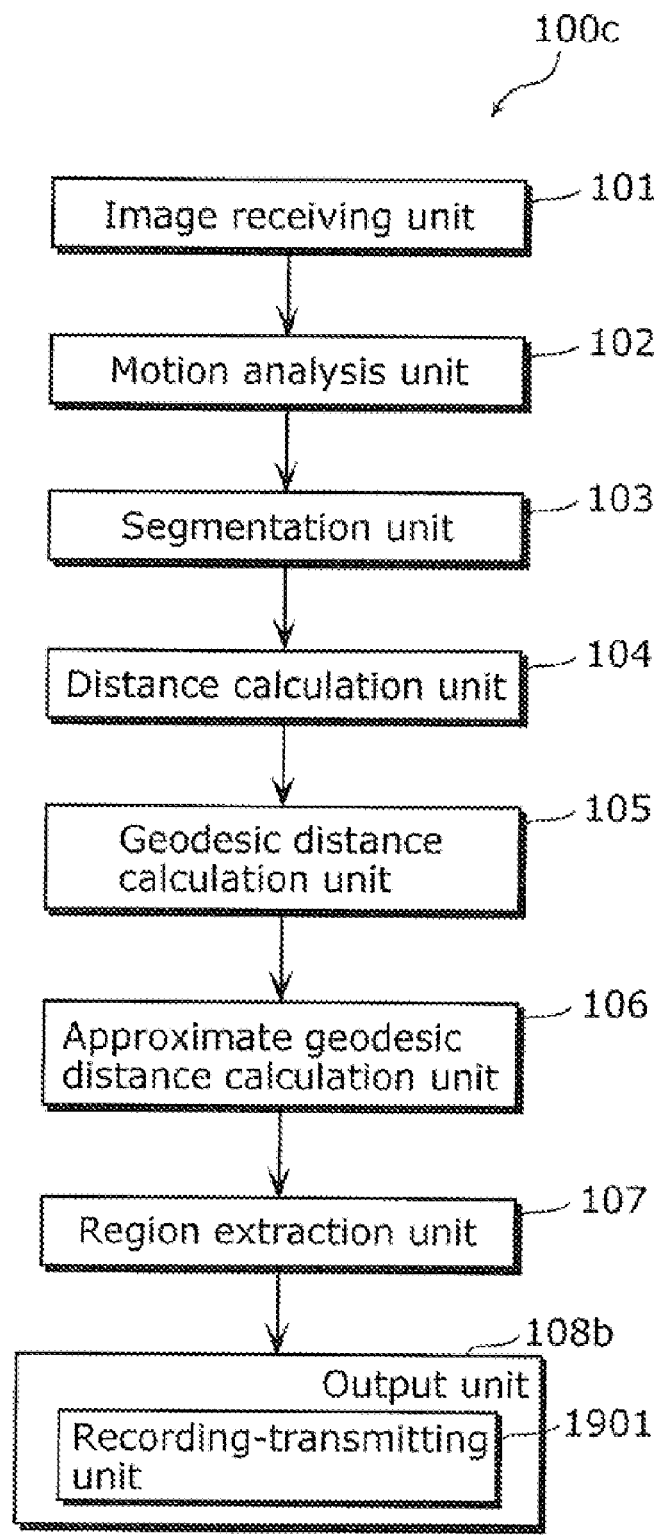
FIG. 20 is a diagram showing a configuration of a moving object detection apparatus in a fifth modification of the first embodiment according to the present invention.

A moving object detection apparatus in the fifth modification of the first embodiment according to the present invention is explained as follows. The present modification describes an example of a case where a recording-transmitting function is added. With this function, the result of moving object detection and region extraction performed in the first embodiment is recorded and transmitted for each of the extracted region. A moving object detection apparatus 100c in the fifth modification basically has the same configuration as the one described in the first embodiment, as shown in FIG. 20. However, the moving object detection apparatus 100c includes an input unit 108b having a recording-transmitting unit 1901, in place of the output unit 108 of the first embodiment.

In addition to the function of the output unit 108 in the first embodiment, the output unit 108b has the recording-transmitting unit 1901. The recording-transmitting unit 1901 is a processing unit which: determines a region in the image received by the image receiving unit 101 based on the result of region extraction performed by the region extraction unit 107; and records the region extraction result for each determined region into an internal or external memory or onto a recording medium such as a hard disk (or the recording-transmitting unit 1901 itself holds the result) or transmits the region extraction result for each determined region to an external source via, for example, a communication interface and a transmission line. That is, as in the above case of the displaying function, the recording-transmitting unit 1901 separately records or transmits the resultant image obtained by the region extraction, in association with the region label $\theta_m$. Also, it is possible to compress the motion information, by averaging the motion information corresponding to the individual region as below. Usually, it is necessary to hold the motion information for each pixel. According to the following processing, however, holding one movement for one region suffices. For example, when the motion vector $(u^i_t, v^i_t)$ of the pixel i is used as the motion information, the averaged motion information can be calculated for each of the extracted regions as follows.

$$u^m_t = \frac{1}{C_m} \sum_{c_m=1}^{C_m} u^{c_m}_t \quad \text{Expression 43}$$

$$v^m_t = \frac{1}{C_m} \sum_{c_m=1}^{C_m} v^{c_m}_t \quad \text{Expression 44}$$

Here, "$C_m$" represents the number of pixels or movement trajectories belonging to the region $\theta_m$.

Also, $$u^{c_m}_t, v^{c_m}_t$$

represents a motion vector of a pixel belonging to the region $\theta_m$. FIG. 21 is a diagram showing an example of a data structure in the case where the region extraction has been performed on a "t" number of images received from a time "T" and the segments obtained as a result of the region extraction as shown in FIG. 19(a) are recorded or transmitted. To be more specific, the following are recorded and transmitted: the region labels $\theta_m$ as identifiers; positions and values of pixels respectively belonging to the region labels $\theta_1$ to $\theta_3$ in the image at the time T; and respective motion vectors $u^m_T, v^m_T, u^m_{T+1}, v^m_{T+1}, \ldots, u^m_{T+t}$ and $v^m_{T+t}$ corresponding to the region labels from the time T to a time T+t. It should be obvious that, instead of using the position and value of the pixel in the image, a region label may be assigned to each pixel in one image received at the time T before transmission. With this, since it is only necessary to transmit the motion information pieces as many as the number of regions, recording and transmitting can be achieved with efficiency as compared to the case where the t number of pictures are transmitted. In particular, the smaller the number of regions with respect to the number of pixels, the higher the degree of efficiency.

In the case where the motion information is compressed using affine motion, a mean value of the changing pixel position may be calculated based on affine motion instead of Expressions 43 and 44.

As described thus far, the moving object detection apparatus 100c in the fifth modification can record and transmit the extracted region while compressing the pixel motion information. Accordingly, in addition to the advantageous effect of accurately performing region extraction on the video sequence including a person or the like that moves and changes shape as explained in the first embodiment, the moving object detection apparatus 100c in the fifth embodiment has the advantageous effect of implementing a high degree of coding efficiency by using one piece of motion information for one extracted region.

Moreover, a segment-region reconstruction unit may be separately provided so that the information having been recorded and transmitted can be reconstructed. To be more specific, the image at the time T is reconstructed using the positions and values of the pixels corresponding to the region labels shown in FIGS. 19(a) and (b). Furthermore, the images received from the time T to the time T+t can be reconstructed, by moving the pixels of the time T using information on the movement trajectories of the pixels. Here, when a fixed camera is used, only the movement trajectory information indicating other than 0 may be used and also a background image may be obtained and held in advance by the segment-region reconstruction unit, so that the reconstructed image is superimposed on the background image. This produces an advantageous effect of allowing the image to be reconstructed with a small amount of calculation using the information efficiently recorded and transmitted.

(Second Embodiment)

Next, a moving object detection apparatus and a moving object detection method in the second embodiment of the present invention are described.

The present embodiment describes the moving object detection apparatus having an additional function of estimating motion of the moving object on the basis of the result of the moving object detection and region extraction performed according to the moving object detection method described in the first embodiment.

Figure 22:
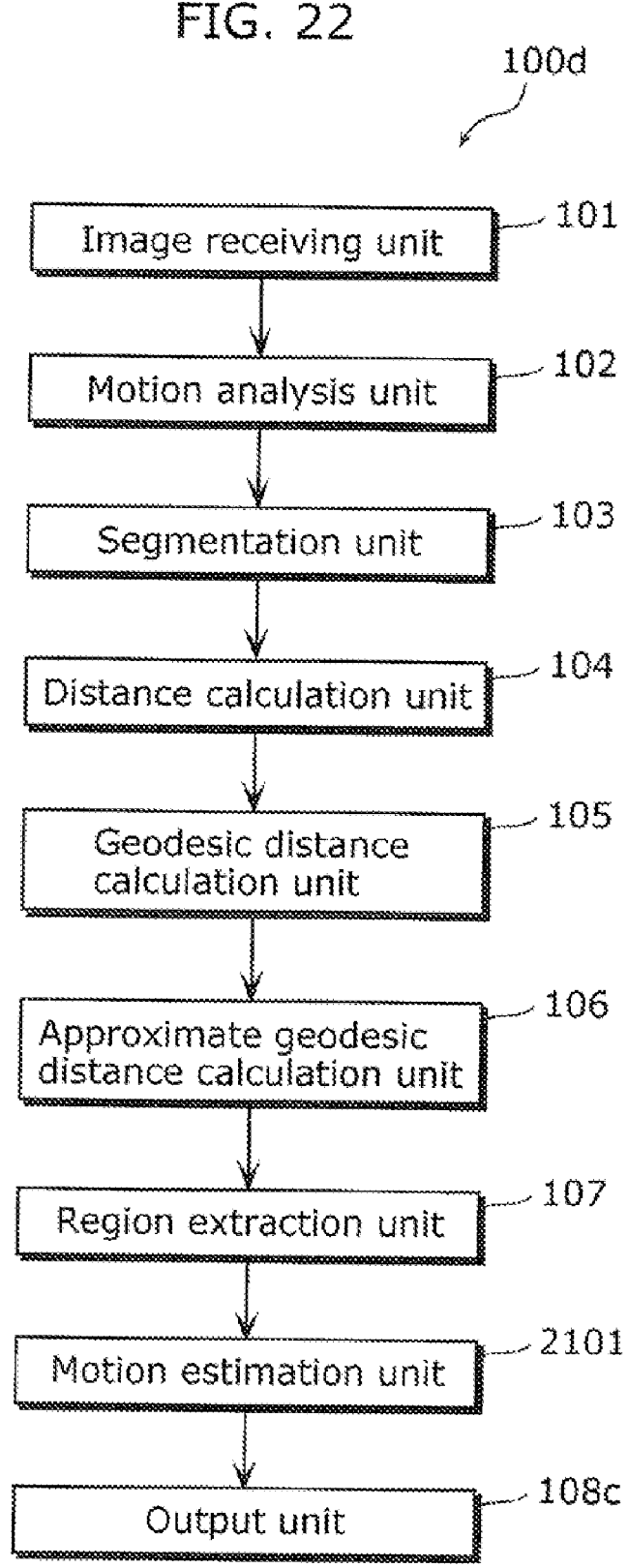
FIG. 22 is a diagram showing an example of a configuration of a moving object detection apparatus in a second embodiment of the present invention.

FIG. 22 is a diagram showing a configuration of a moving object detection apparatus 100d in the second embodiment. As shown in FIG. 22, the moving object detection apparatus 100d of the second embodiment includes an image receiving unit 101, a motion analysis unit 102, a segmentation unit 103, a distance calculation unit 104, a geodesic distance transformation unit 105, an approximate geodesic distance calculation unit 106, a region extraction unit 107, and an output unit 108c. In addition to these units, the present moving object detection apparatus 100d includes a motion estimation unit 2101 as a function of estimating motion of the moving object.

The motion estimation unit 2101 receives the result of region extraction as an input, calculates a representative trajectory from the movement trajectories of the pixels included in the individual extracted region, and estimates the motion of the moving object on the basis of the representative trajectory.

In addition to the function of the output unit 108 in the first embodiment, the output unit 108c outputs information on a position of the moving object or a position of a part of the moving object which is estimated by the motion estimation unit 2101.

Figure 23:
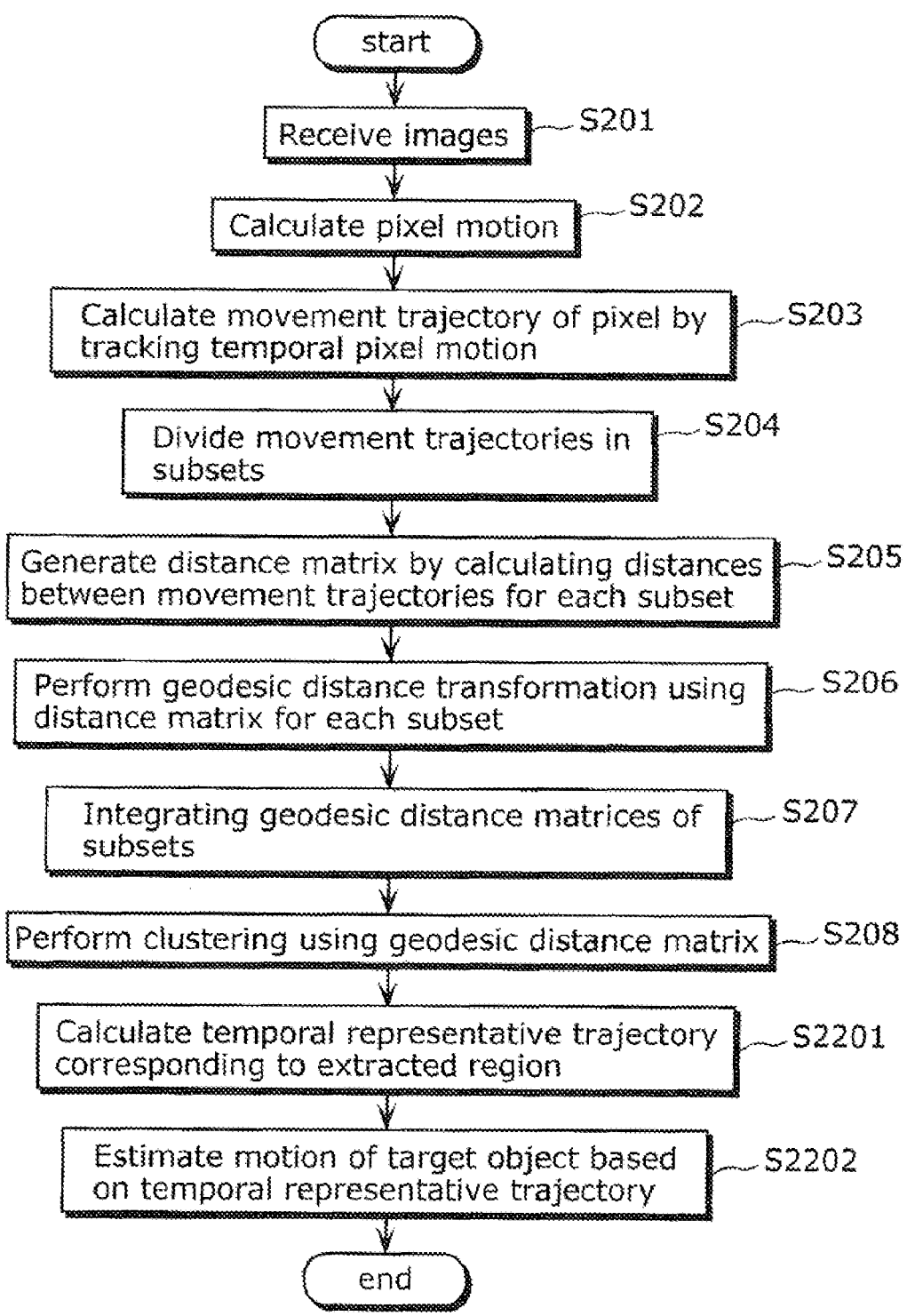
FIG. 23 is a flowchart showing a basic operation of the moving object detection apparatus in the second embodiment of the present invention.

FIG. 23 shows a flowchart of the processing performed in the second embodiment. The processes from S201 to S209 are the same as those in the first embodiment and, therefore, the explanation is omitted.

In step S2201, the motion estimation unit 2101 calculates a representative point and a representative trajectory thereof of a cluster using the result of region extraction performed in step S208, as follows.

Here, suppose that a movement trajectory of a pixel belonging to the cluster region $\theta_m$ is represented as below.

$$x^{cm}$$

The motion estimation unit 2101 calculates the representative trajectory for each cluster region $\theta_m$ according to the following expression. In the present embodiment, a mean trajectory is calculated as the representative trajectory for example.

However, each movement trajectory of the pixel represented as $$x^{cm}$$

may be weighted in the following calculation. Or, the movement trajectory of the pixel corresponding to the center of gravity of the cluster in the image may be set as the representative trajectory.

$$\overline{x^m} = \frac{1}{C_m}\sum_{c=1}^{C_m} x^{cm} \qquad \text{Expression 45}$$

Here, "$C_m$" represents the number of pixels or movement trajectories belonging to the region $\theta_m$.

Figure 24:
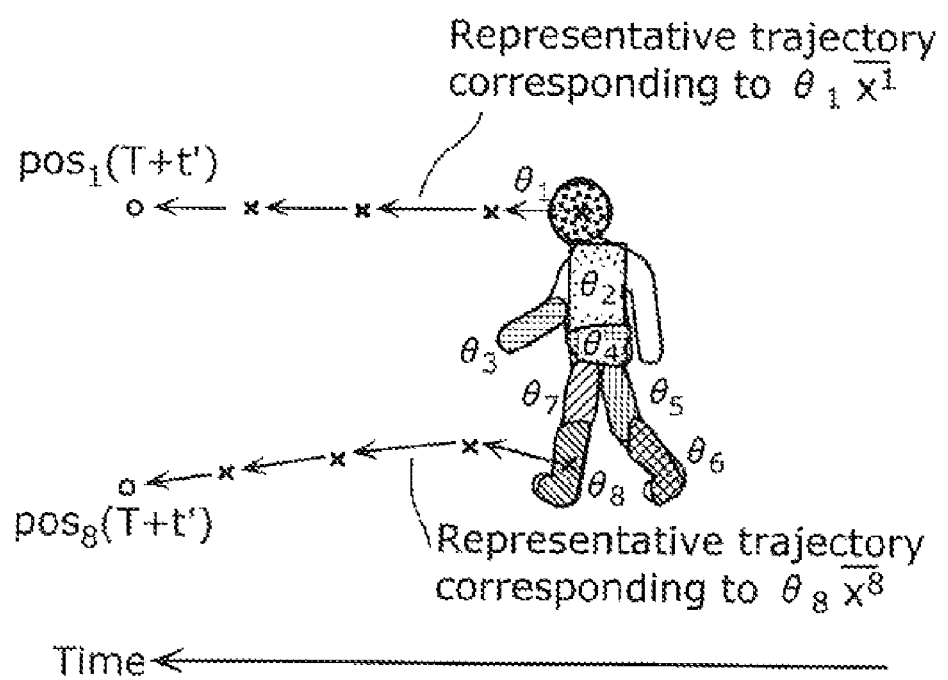
FIG. 24 is a diagram showing an example of motion estimation in the second embodiment of the present invention.

FIG. 24 is a diagram showing an example of the case where the representative trajectory is calculated for each cluster region $\theta_m$ according to Expression 45. Note here that, for the sake of simplicity, FIG. 24 shows only the representative trajectories of the cluster regions $\theta_1$ and $\theta_8$ corresponding to the head and the lower leg, respectively. In the diagram, "x" represents an element of the following that corresponds to the time t, and indicates a pixel position.

$$\overline{x^m}$$

As expressed by Expression 3 or 4, the region extraction through the clustering in the nonlinear space is performed in consideration of the similarity in pixel motion. On account of this, only the movement trajectories of the pixels which are similar in motion are used, thereby obtaining the representative trajectory with a higher degree of accuracy as compared to the case of using the method for simply calculating a temporal mean of the movement trajectories of the adjacent pixels. By calculating the representative trajectory for each of the cluster regions in this way, the motion can be represented accurately and easily for each part of the moving object.

Next, in step S2202, the motion estimation unit 2101 estimates a position of the moving object to be located at a time after the time T, on the basis of the representative trajectory calculated in step S2201. First, the following is an explanation of a specific example of calculating an acceleration using the representative trajectory so as to estimate the position of the moving object to be located at and after a time T+1. When three or more time-series images are received, an acceleration vector "$s_t^m$" can be obtained according to Expression 46 as follows for each of the representative trajectories expressed below.

$$\overline{x^m}$$

$$s_{t+1}^m = \{u_{t+1}^{m1} - u_t^m\} - \{u_t^m - u_{t-1}^m\} \qquad \text{Expression 46}$$

Here, "$u_t^m$" represents a motion vector and can be expressed as follows.

$$u_t^m = (u_t^m, v_t^m) \qquad \text{Expression 47}$$

Using the acceleration vector calculated according to Expression 46, the motion estimation unit 2101 can estimate a position "$pos_m$ (T+t')" of the moving object located at a time T+t' for each part of the moving object as shown by arrows and open circles in FIG. 24, as follows.

$$pos_m(T+t') = pos_m(T) + t'u_T^m + \tfrac{1}{2}t'^2 s_T^m \qquad \text{Expression 48}$$

Then, the output unit 108c outputs the position of the moving object or the position of the part of the moving object which is estimated in step S2202. In this way, the estimation taking into account the acceleration can be achieved. This produces an advantageous effect of estimating a position of the moving object according to the acceleration when the moving object suddenly moves fast or suddenly stops. Also, an affine parameter may be used instead of the motion vector. Since the affine parameter can represent motion including a rotational motion and is thus suitable for representing a rotation of an arm or leg, a position of an articulated object in particular can be estimated more accurately.

Moreover, instead of the motion vector or the acceleration described above, an N-dimensional function may be fitted directly to the representative trajectory $x^m$. Suppose that a T number of time-series images are received.

In this case, the N-dimensional function can be fitted to the position information in the T number of images included in the following.

$$\overline{x^m}$$

Thus, the position $pos_m$ (T+t') at the time (T+t') in the image can be estimated in such a manner as to be consistent with a value of the fitting function. More specifically, a smoother motion can be expressed when the fitting function is employed, which means that the motion estimation can be achieve with a higher degree of accuracy. In particular, since estimation consistent with the fitting function is possible, the accuracy in estimation increases when the fitting function is closer to an original motion. It should be obvious that the position estimation using the images is applicable to temporal interpolation.

As described thus far, the moving object detection apparatus 100d in the present embodiment can calculate the movement trajectories of the pixels having the similarity in motion as belonging to one cluster and thus calculate the representative trajectory with accuracy. The present moving object detection apparatus 100d has an advantageous effect of expressing a motion for each part of an articulated object or the like in particular and accurately estimating a position of the part of the object without setting candidate regions as preprocessing.

(Third Embodiment)

Next, a moving object detection apparatus and a moving object detection method in the third embodiment of the present invention are described.

The present embodiment describes the moving object detection apparatus which develops the moving object detection method described in the first embodiment so as to perform the moving object detection and region extraction using sets of images taken by cameras, respectively.

Figure 25:
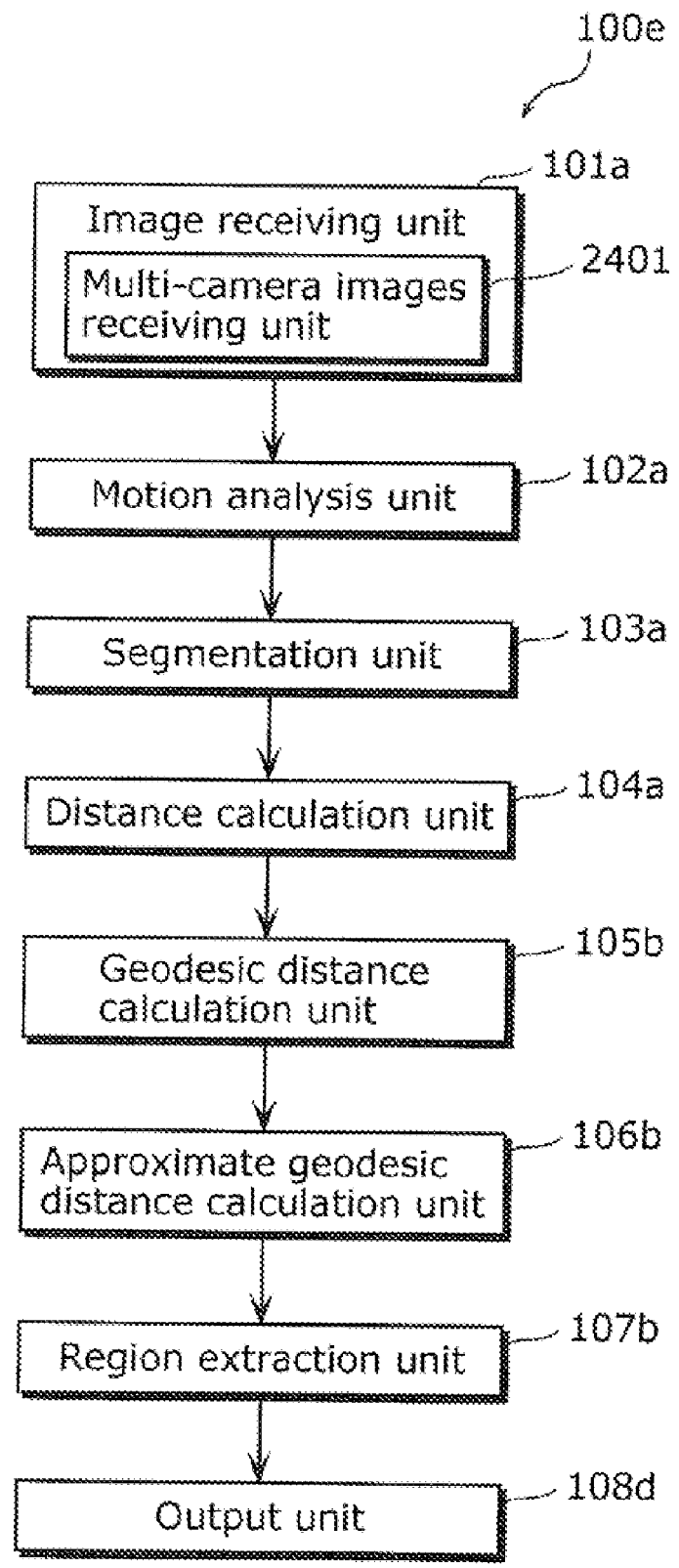
FIG. 25 is a diagram showing an example of a configuration of a moving object detection apparatus in a third embodiment of the present invention.

FIG. 25 is a diagram showing a configuration of a moving object detection apparatus 100e in the third embodiment. As shown in FIG. 25, the moving object detection apparatus 100e in the present embodiment includes an image receiving unit 101a having a multi-camera image receiving unit 2401, a motion analysis unit 102a, a segmentation unit 103a, a distance calculation unit 104a, a geodesic distance transformation unit 105b, an approximate geodesic distance calculation unit 106b, a region extraction unit 107b, and an output unit 108d. Note that since the moving object detection apparatus 100e in the present embodiment basically has the same configuration as the one described in the first embodiment, aspects different from the first embodiment are mainly explained hereafter.

Figure 26:
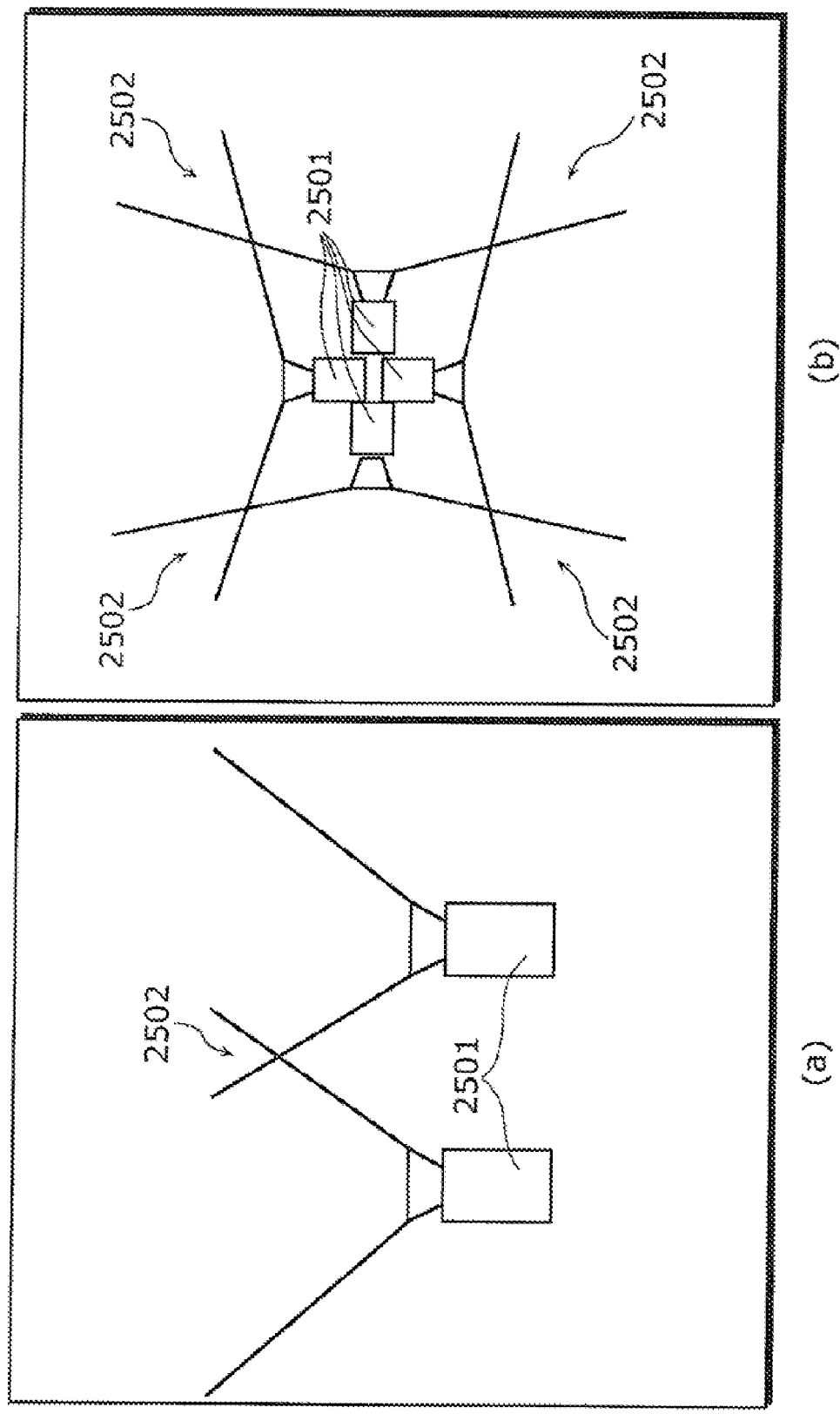
FIG. 26 is a diagram showing examples of camera arrangement in the case of the moving object detection apparatus in the third embodiment of the present invention.

In addition to the function of the output unit 108 in the first embodiment, the output unit 108a has the multi-camera image receiving unit 2401. The multi-camera image receiving unit 2401 is a processing unit which receives video sequences from cameras that have image capturing ranges overlapping one another, as shown in FIGS. 26(a) and (b). For example, the multi-camera image receiving unit 2401 is a video camera or a communication interface connected to a video camera. Note that the arrangement and number of cameras are not limited to those shown in FIGS. 26(a) and (b). As a capturing condition for the pictures to be received by the multi-camera image receiving unit 2401, it is only necessary that the cameras are set in such a manner that their image capturing ranges overlap one another.

The motion analysis unit 102a is a processing unit which calculates a movement trajectory according to a method similar to the one employed by the motion analysis unit 102 in the first embodiment. That is, the motion analysis unit 102a calculates the movement trajectory for each block included in an individual one of the pictures taken by the individual one of the cameras and received by the multi-camera image receiving unit 2401, the block having one or more pixels. Also, the images taken by the cameras may be integrated into one image based on the overlapping image capturing ranges. In such a case, the integrated image can be processed as one image according to the method described in the first embodiment and, therefore, the explanation of this method is not repeated here.

The segmentation unit 103a is a processing unit which sets, as common points, at least one of the movement trajectories in the overlapping image capturing ranges. Here, the segmentation unit 103a stores, as one subset, movement trajectories calculated for each set of images taken by the individual camera, so that the movement trajectories corresponding to the set of images taken by a camera "p" are associated with a subset "p". It should be noted that an image captured by the camera may be divided into the subsets as in the first embodiment. In such a case, the processing is performed according to the method described in the first embodiment and, therefore, the explanation of this method is not repeated here.

The distance calculation unit 104a is a processing unit which calculates a distance representing a similarity between the movement trajectories calculated using the images taken by the individual cameras. In order to obtain shape variations of the moving object in the images, the distance calculation unit 104a calculates a distance representing a similarity between block motions using a movement trajectory of a block "i" calculated by the motion analysis unit 102 and included in a subset and a trajectory of a block other than the block i but included in the same subset as the block i. For example, when movement trajectories corresponding to an N number of blocks are used, the resultant distances are calculated as an N by N matrix of distances. Here, the distance matrix is obtained by calculating the distances for evaluating the motion similarities between the blocks.

Since the distances between the blocks change in response to the motions of a moving object particularly when the object is for example a person that moves and changes shape like an articulated object, this distance matrix can represent the motions of the moving object.

The geodesic distance transformation unit 105b is a processing unit which performs geodesic distance transformation on the distance matrix calculated by the distance calculation unit 104, for each subset corresponding to the set of images taken by the camera.

The approximate geodesic distance calculation unit 106b is a processing unit which calculates an approximate geodesic distance bridging over the subsets, namely, the sets of images taken by the different cameras. For doing so, the approximate geodesic distance calculation unit 106b integrates, by using the common points, the geodesic distance matrices of the subsets calculated by the geodesic distance transformation unit 105b corresponding to the sets of images taken by the different cameras.

The region extraction unit 107b is a processing unit which performs the region extraction by determining a region including blocks having the similar movement trajectories, on the basis of the approximate distance calculated by the approximate geodesic distance calculation unit 106b.

In addition to the function of the output unit 108 in the first embodiment, the output unit 108d outputs the result of region extraction performed by the region extraction unit 107b through integrating the images taken by the different cameras, that is, the result of the target object detection.

Figure 27:
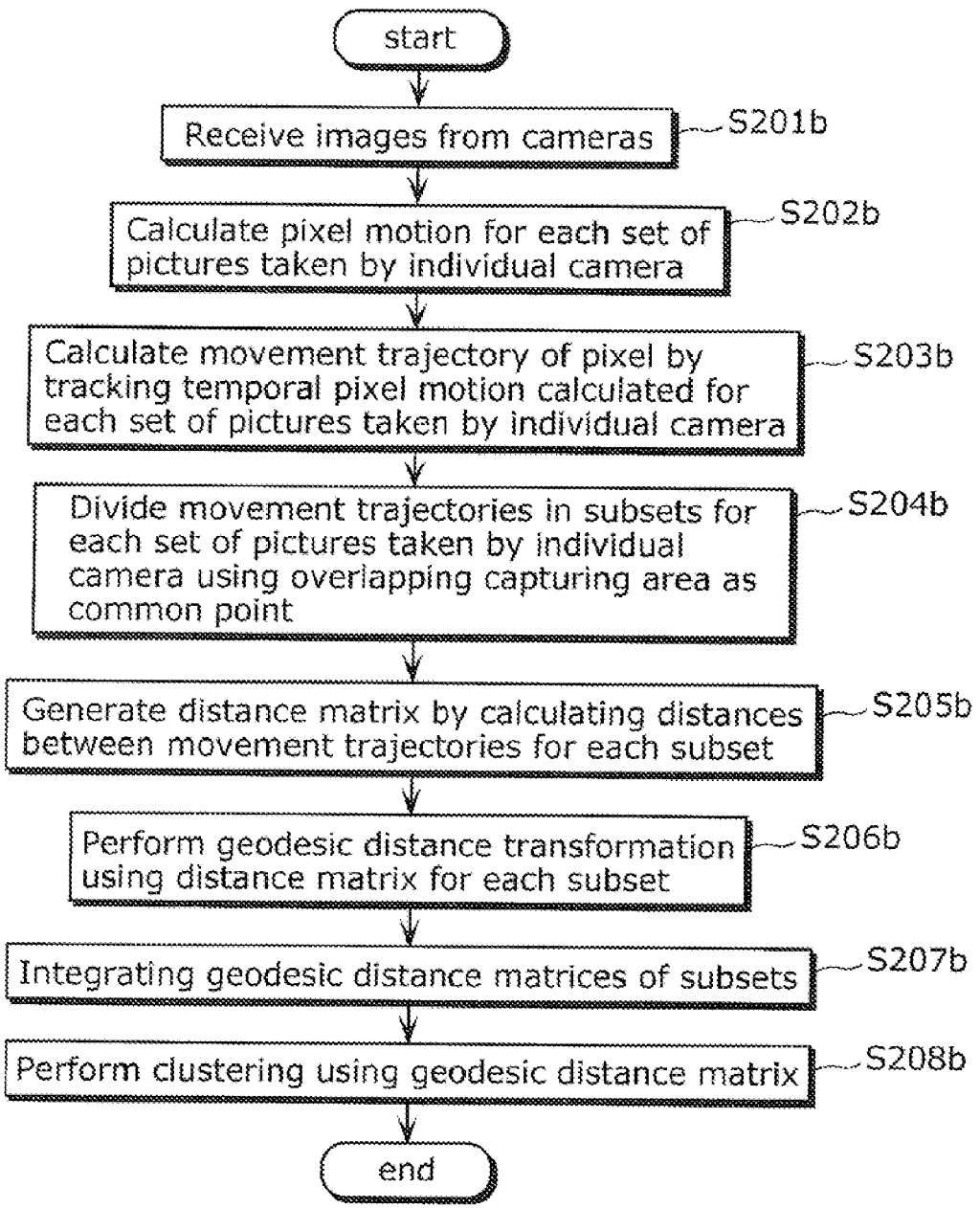
FIG. 27 is a flowchart showing a basic operation of the moving object detection apparatus in the third embodiment of the present invention.

The following is a detailed explanation about the case of detecting a moving object and performing region extraction using the moving object detection method according to the present invention, namely, about the operation performed by the moving object detection apparatus 100e, with reference to a flowchart shown in FIG. 27.

First, in step S201b, the multi-camera image receiving unit 2401 receives a set of images from each of the cameras, as shown in FIGS. 26(a) and (b).

Next, in step S202b, the motion analysis unit 102a calculates a block motion between at least two images taken by the individual camera. This processing is performed on the set of images taken by the individual camera according to the method employed in step S202 in the first embodiment and, therefore, the explanation of this method is not repeated here.

Next, in step S203b, the motion analysis unit 102a calculates the movement trajectory represented by Expression 2 above for each set of images taken by the individual camera, through the processing performed using the motion information calculated in step S202b as in step S203 explained in the first embodiment. The present case is different from the case in the first embodiment only in that the processing of step S203 is to be performed for each set of images taken by the individual camera and, therefore, the explanation of this step is not repeated here. Note that, however, Expression 2 is replaced, for the sake of convenience, with Expression 49 as follows so that the movement trajectories can be identified corresponding to the cameras, respectively.

$$X^{p,i} = (x_1^{p,i}, y_1^{p,i}, \ldots, x_t^{p,i}, y_t^{p,i}, \ldots, x_T^{p,i}, y_T^{p,i})$$ Expression 49

Here, "p_i" represents the movement trajectory i of the images captured by the camera p.

Next, in step S204b, the segmentation unit 103a sets a "P" number of subsets 402 for the sets of images taken by the cameras as shown in FIGS. 28(a) and (b). Here, a subset is a group of movement trajectories obtained based on the images taken by the individual camera. Note here that FIGS. 28(a) and (b) correspond to FIGS. 26(a) and (b), respectively. For example, as shown in FIG. 28(a), the segmentation unit 103a sets common points 2704 in an overlapping image capturing region 2703 of captured images 2701 and 2702. It should be obvious that the number of cameras used in the present invention is not limited to two, and as shown in FIG. 28(b), the common points 2704 may be set in each of overlapping image capturing regions 2703 of captured images 2710 to 2713. Here, an overlapping image capturing region refers to a region on the image for the case where at least one same location is captured by cameras set at different positions. Also, it is only necessary to set at least one common point in the overlapping image capturing region. Then, the processing may be performed, considering the set of pictures taken by the individual camera or the corresponding movement trajectories as the subset p obtained through segmentation in the first embodiment. The subsequent processing is the same as the processing performed in step S204 in the first embodiment and, therefore, the explanation of this step is not repeated here.

Next, in step S205b, the distance calculation unit 104a calculates a distance matrix, considering that the movement trajectories calculated in step S204b for each set of images taken by the individual camera belong to the subset p. Then, the processing may be performed, considering the set of images taken by the individual camera or the corresponding movement trajectories as the subset p obtained through segmentation in the first embodiment. The subsequent processing is the same as the processing performed in step S205 in the first embodiment and, therefore, the explanation of this step is not repeated here.

Next, in step S206b, the geodesic distance transformation unit 105b calculates a geodesic distance, using the distance matrices calculated in step S205b. The subsequent processing is the same as the processing performed in step S206 in the first embodiment and, therefore, the explanation of this step is not repeated here.

Figure 28:
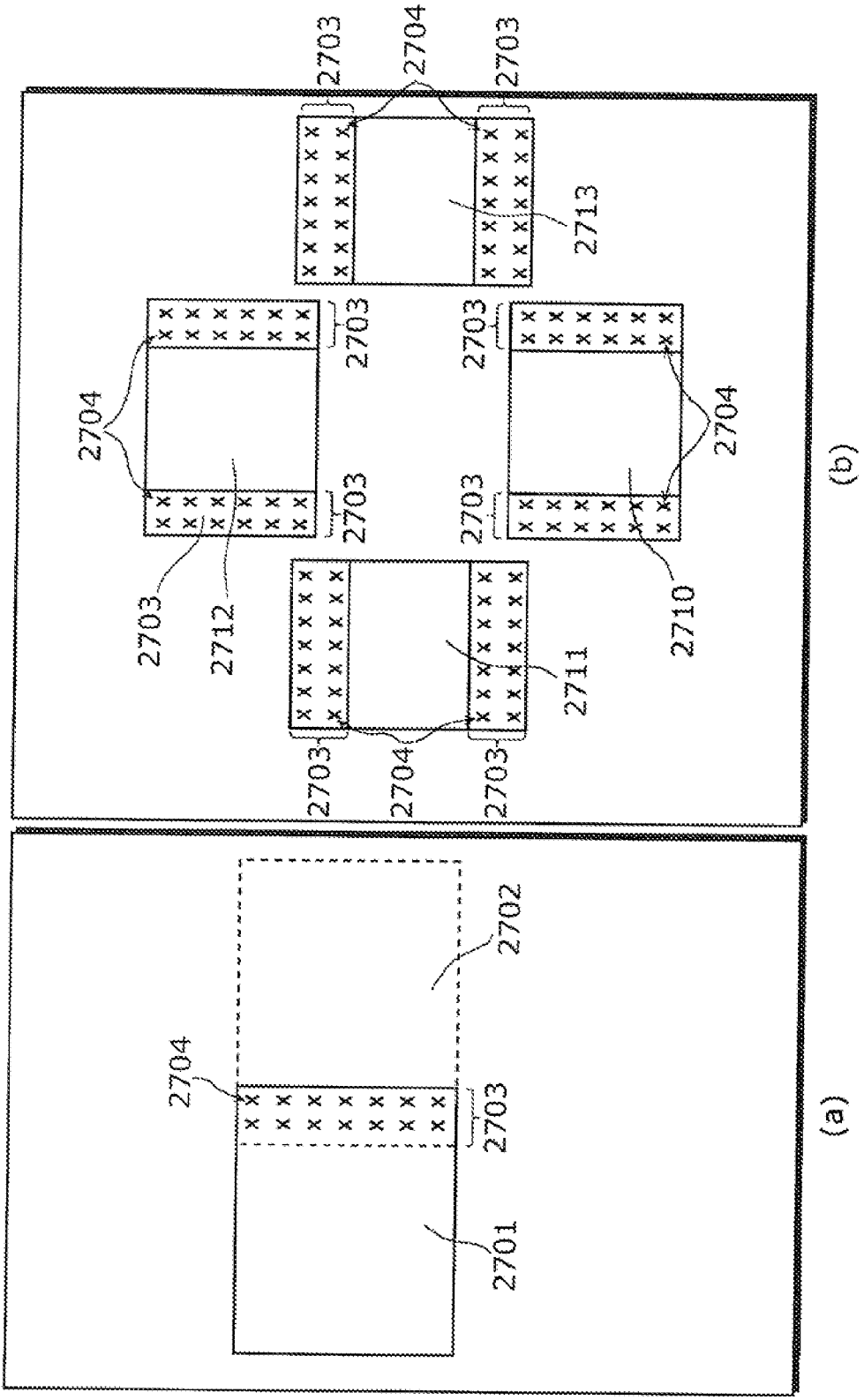
FIG. 28 is a diagram showing examples of processing performed by a segmentation unit in the third embodiment of the present invention.

Next, in step S207b, the approximate geodesic distance calculation unit 106b integrates the geodesic distance matrices calculated in step S206b for the sets of images taken by the cameras p. In the present case, the processing performed in step S207 in the first embodiment may be performed using the common points in the overlapping capturing regions as shown in FIG. 28. Thus, the explanation of step S207 is not repeated here.

Next, in step S208b, the region extraction unit 107b performs region extraction by: detecting a discontinuous point using the geodesic distance obtained through the integration by the approximate geodesic distance calculation unit 106; and then determining a region which includes blocks having similar movement trajectories, based on the detected discontinuous point. In this case, too, the processing performed in step S208 in the first embodiment may be performed and, therefore, the explanation of this step is not repeated here.

Accordingly, the moving object detection apparatus 100e in the third embodiment receives the sets of images taken by the different cameras respectively, and performs the region extraction, namely, the moving object detection, with accuracy at high speed on the images including a moving object such as a person that moves and changes shape or a moving object that moves across the image capturing ranges of the different cameras, regardless of the pose or size of the moving object.

(Fourth Embodiment)

Next, a data classification apparatus and a method thereof are described as application examples of a moving object detection apparatus and a method thereof according to the fourth embodiment of the present invention.

Figure 29:
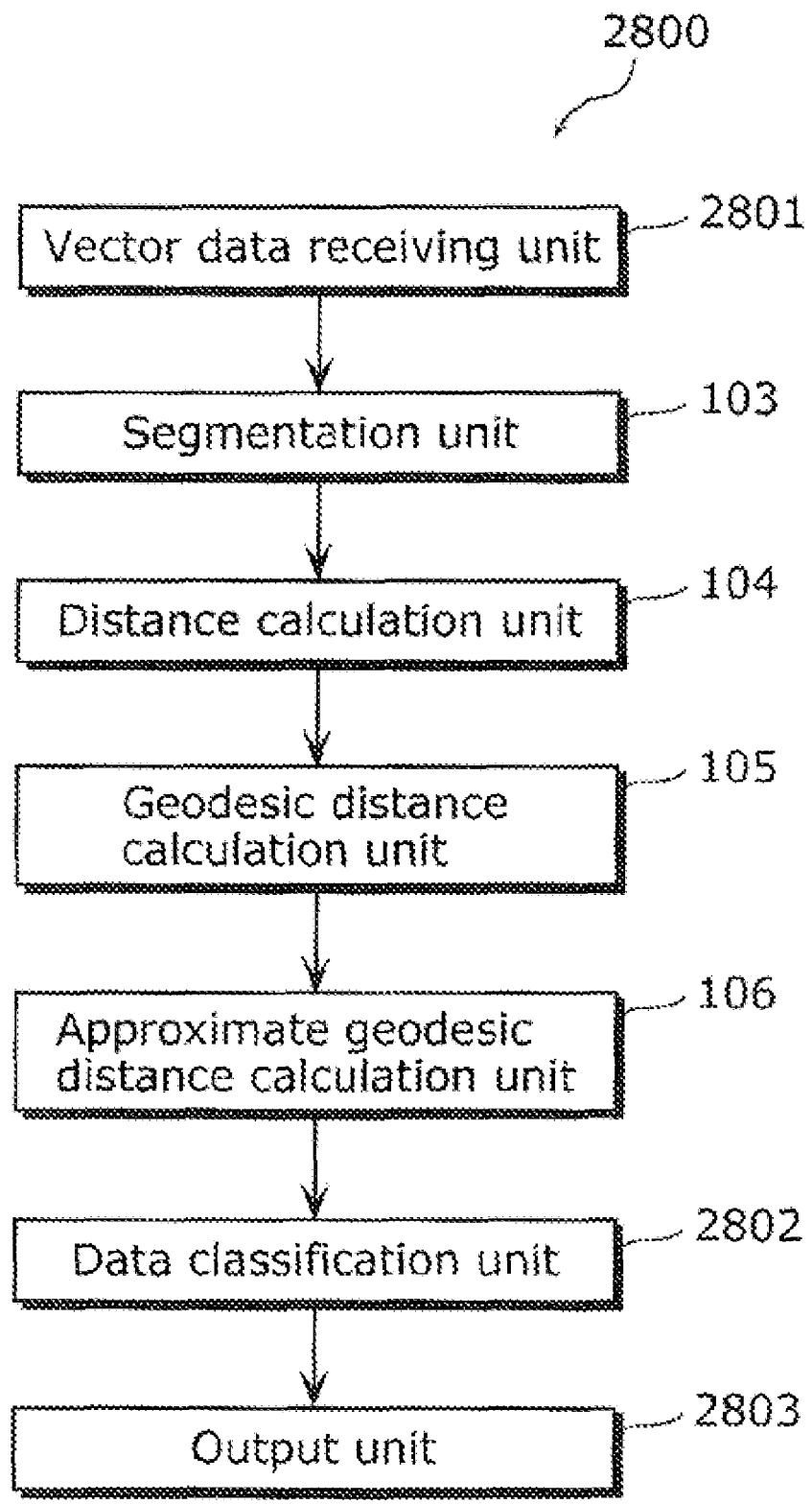
FIG. 29 is a diagram showing an example of a configuration of a moving object detection apparatus in a fourth embodiment of the present invention.
Figure 30:
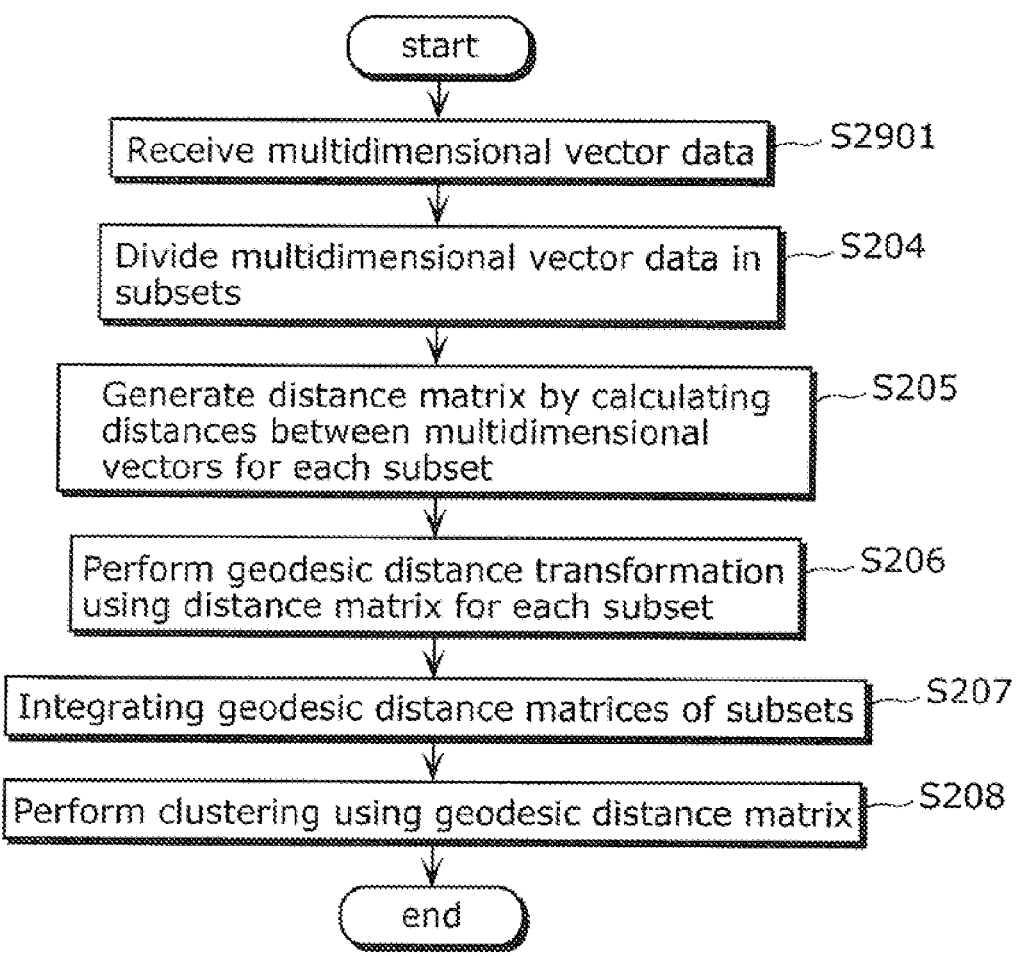
FIG. 30 is a flowchart showing a basic operation of the moving object detection apparatus in the fourth embodiment of the present invention.

FIG. 29 is a diagram showing a configuration of a data classification apparatus 2800 in the fourth embodiment. As shown in FIG. 29, the data classification apparatus 2800 includes a vector data receiving unit 2801, a segmentation unit 103, a distance calculation unit 104, a geodesic distance transformation unit 105, an approximate geodesic distance calculation unit 106, a data classification unit 2802, and an output unit 2803. In the present embodiment, multidimensional vector data pieces, such as the aforementioned movement trajectories, are received as inputs and classified.

The vector data receiving unit 2801 is a processing unit which receives vector data. For example, the vector data may be data indicating three-dimensional positions obtained from a stereo camera or from computer graphics, or may be data representing temporal changes of these positions.

The segmentation unit 103 divides the multidimensional vectors received by the vector data receiving unit 2801 into a P number of subsets in the multidimensional vector space as in the first modification of the first embodiment. Then, the segmentation unit 103 sets, as common points, a part of the vector data included in one of subsets, that is, a part of the vector data included in at least one of the adjacent subsets for example.

The distance calculation unit 104, the geodesic distance transformation unit 105, and the approximate geodesic distance calculation unit 106 are identical to those described in the first embodiment and the first modification of the first embodiment, and the explanations about these units are thus omitted here. The first embodiment and the first modification of the first embodiment describe the cases where the processing target data is "movement trajectories" whereas the present embodiment describes the case where the processing target data is "vector data". This is the only aspect that is different from the first embodiment and first modification, meaning that the processes performed by the respective processing units in the present embodiment are the same as those described in the first embodiment and first modification.

As is the case with the region extraction unit 107 in the first embodiment, the data classification unit 2802 performs data classification by clustering the similar multidimensional vector data. In the present embodiment, the data classification unit 2802 detects a discontinuous point in the distribution of distances each between the multidimensional vectors from the approximate geodesic distances obtained by the geodesic distance transformation unit 105 and the approximate geodesic distance calculation unit 106 using the distance matrices calculated by the distance calculation unit 104. Then, the region extraction unit 107 performs clustering on the continuously-distributed multidimensional vector data on the basis of the detected discontinuous point so as to classify, into one cluster, the multidimensional vectors separated by a distance shorter than the length of the discontinuous point. Then, the output unit 2803 writes the result obtained by the data classification unit 2802 into a memory, a hard disc, or the like, or displays the result on a display panel or the like, for example.

Note that, as in the case of the components included in the moving object detection apparatus, the components included in the data classification apparatus of the present embodiment except for the I/O device such as the display device may be implemented as: a program or data (i.e., software) to be executed by the computer 1002 shown in FIG. 2; hardware, such as an electronic circuit, a memory, or a recording medium; or a mixture of hardware and software.

The following is a detailed explanation about the case of classifying the multidimensional vector data using the vector-data classification method according to the present invention, namely, about the operation performed by the data classification apparatus 2800, with reference to a flowchart shown in FIG. 3.

First, in step S2901, the vector data receiving unit 2801 receives vector data pieces. Here, the vector data may be any multidimensional vectors as long as they include elements as represented in Expression 2 above.

The processing from step S204 to step S208 may be performed in the same manner as in the first modification of the first embodiment, only by replacing the movement trajectories with the multidimensional vector data.

In this way, when the data representing the three-dimensional positions obtained by a range finder or a stereo camera are received as the multidimensional vectors, the data classification apparatus 2800 in the fourth embodiment can classify the three-dimensional target object on the basis of the three-dimensional positions, as in the case of classifying the movement trajectories. Note that the multidimensional vector data to be received as an input may be any vector data as long as it can be analyzed according to the multidimensional scaling method. Here, the geodesic distance transformation has advantageous effects of classifying data with high nonlinearity with a higher degree of accuracy and executing the classification at high speed.

(Supplemental Remarks on First Embodiment)

Figure 31:
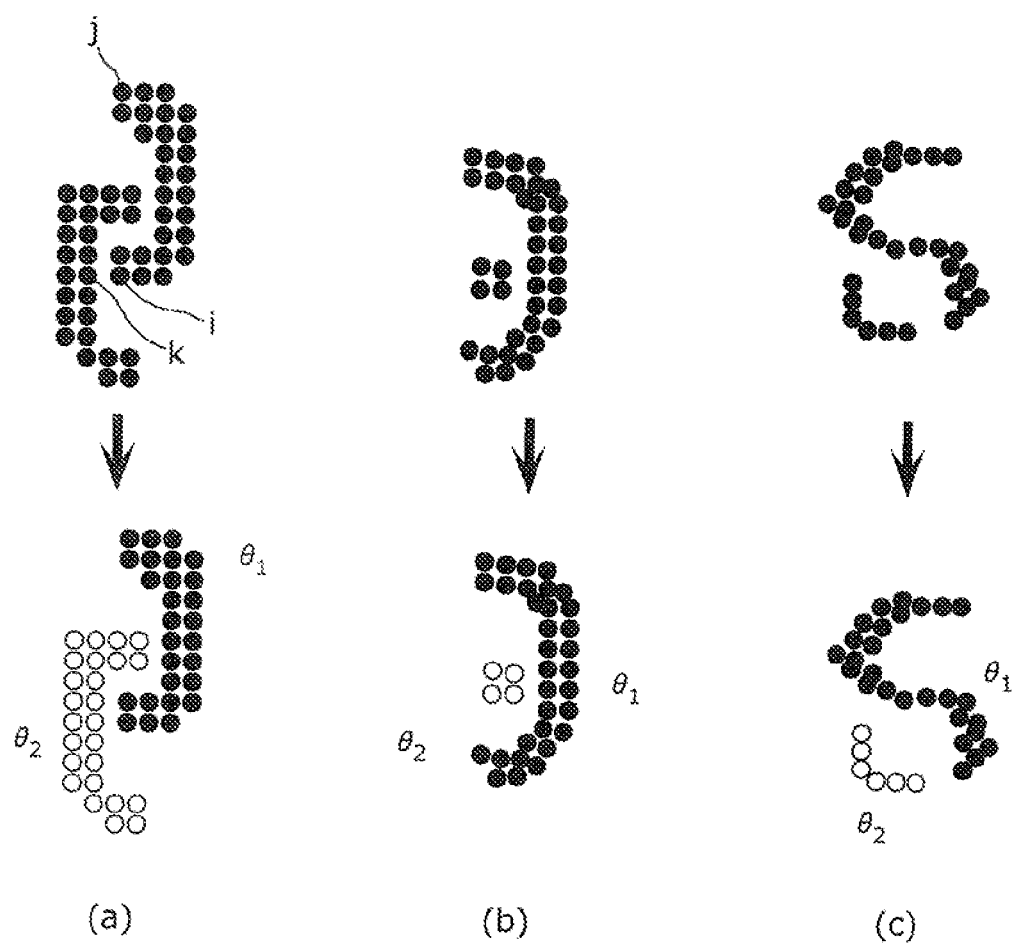
FIG. 31 is a diagram showing examples of graphics which can be divided according to a method described in the first embodiment of the present invention.

Here, supplemental remarks are made on properties of a moving object on which region extraction is executable using the method described in the first embodiment. FIG. 31(*a*) to (*c*) is a diagram showing examples of graphics which can be divided according to the method described in the first embodiment. By employing the method of the first embodiment, each graphic representation can be extracted as graphics $\theta_1$ and $\theta_2$. In the present example, the moving directions of the graphics $\theta_1$ and $\theta_2$ shown in FIG. 31(*a*) to (*c*) may be the same or different. However, pixels belonging to the graphic $\theta_1$ have to show the same motion and also pixels belonging to the graphic $\theta_1$ have to show the same motion.

Figure 6:
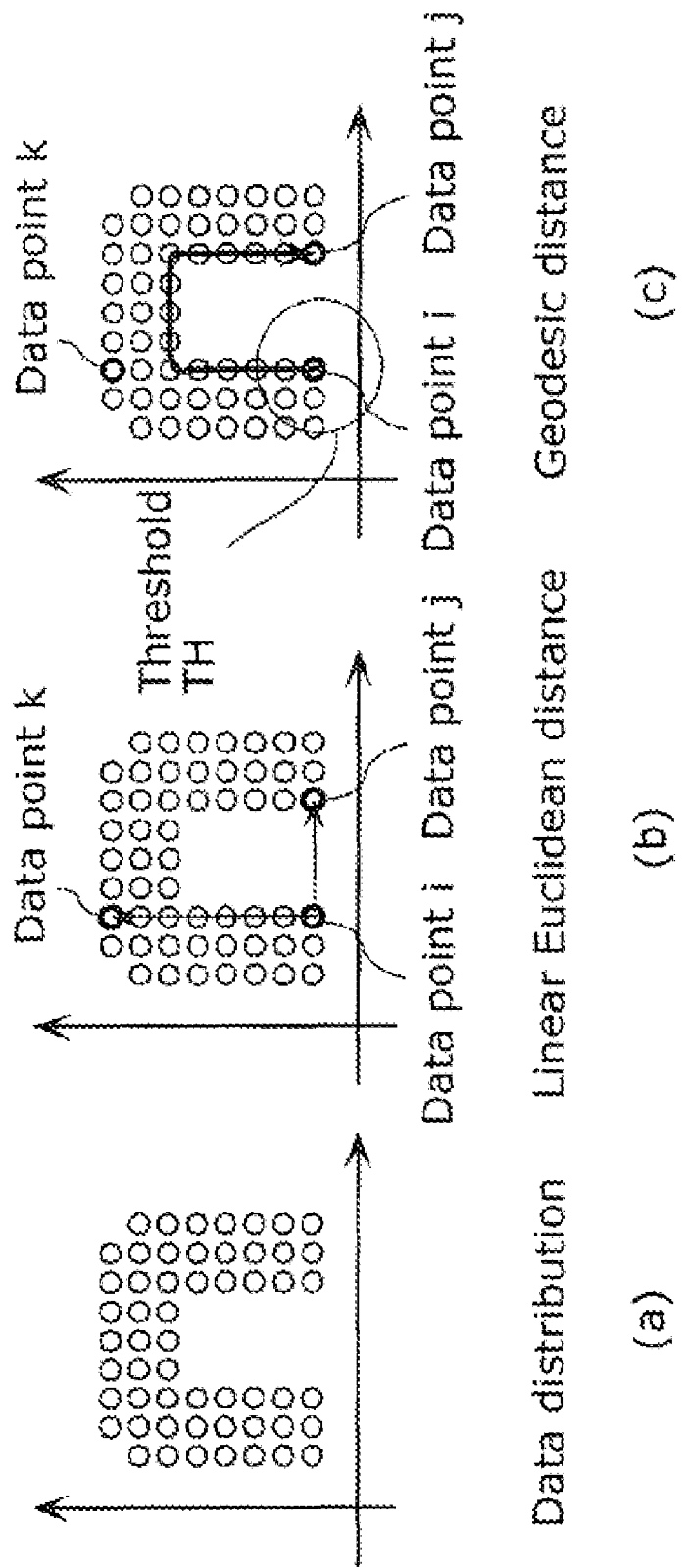
FIG. 6 is a diagram showing an example of an advantageous effect of a geodesic distance calculated by a geodesic distance transformation unit in the first embodiment of the present invention.

In steps S205 and S207 in the first embodiment, the geodesic distance transformation having the characteristics as shown in FIG. 6 is performed. With this, a distance measured along the movement trajectories can be calculated, instead of a common Euclidean distance. Accordingly, a distance measured along the shape can be calculated, corresponding to the curved shape commonly found in the graphics shown in FIG. 31(*a*) to (*c*).

Moreover, in step S208, clustering is performed, considering that the discontinuous point is located between the movement trajectories having an infinite geodesic distance. Thus, when a distance between the movement trajectories is longer than the threshold, the graphics $\theta_1$ and $\theta_2$ can be extracted as the result of region extraction performed based on the discontinuous point.

In this way, according to the present embodiment, regions can be extracted based on a discontinuous point when the moving object has a curved shape and a constant discontinuous point.

On the other hand, when the processing of steps S205 and S207 is not performed, the distance between the movement trajectory belonging to the graphic $\theta_1$ and the movement trajectory belonging to the graphic $\theta_2$ is calculated as a Euclidean distance. Thus, as explained with reference to FIG. 6 above, the distance between the points i and j are longer than the distance between the points i and k. That is, the distance between the points belonging to the same class is longer than the distance between the points belonging to the different classes. Also, when the geodesic distance transformation is not performed in step S205, this means that the processing to measure along the data is not performed. Thus, whether it is a discontinuous or continuous point that is present between the adjacent movement trajectories cannot be determined. For this reason, in the case of the examples shown in FIG. 31, it is difficult to perform the region extraction based on the discontinuous point when the moving object has a curved shape and a constant discontinuous point.

Accordingly, clustering in the first embodiment is performed using the geodesic distance in consideration of the continuity related to the similarity between the movement trajectories, as compared to the case of clustering performed using a linear Euclidean distance. Therefore, even in the case of intricate regions, it is reliably determined whether the regions belong to the same object (or the same part) or to different objects (or different part).

Although the moving object detection apparatus and the method thereof and the data classification apparatus and the method thereof have been explained based on the embodiments and modifications above, the present invention is not limited to these embodiments and modifications. The present invention includes other embodiments implemented through various modifications which are conceived by those having skill in the art without departing from the scope of the present invention and through a combination of arbitrary components of the above embodiments and modifications without departing from the scope of the present invention.

For example, the present invention also includes a moving object detection apparatus configured by adding the recording-transmitting unit 1901 of the fifth modification of the first embodiment and the motion estimation unit 2101 of the second embodiment to the fourth modification of the first embodiment.

Moreover, the moving object detection apparatus according to the present invention may include a segmentation unit 103b included in a moving object detection apparatus 100f shown in FIG. 32, in place of the segmentation unit used in the above embodiments. In addition to the function of the segmentation unit 103 in the first embodiment, the segmentation unit 103b has two processing units, namely, a manual setting unit 1031 and an automatic setting unit 1032, which support the processing of dividing the movement trajectories calculated by the motion analysis unit 102 into subsets.

The manual setting unit 1031 divides the movement trajectories calculated by the motion analysis unit 102 into subsets, according to the spatial segmentation designated by the user in association with the images received by the image receiving unit 101. For example, when the user specifies, on the image, using a mouse or the like, a region in which a moving object is expected to exist or move, the manual setting unit 1031 classifies this region as one subset, that is, classifies the movement trajectories corresponding to the block included in this region as one subset. In the case where, for example, the moving object moves along a passage, this passage may be set as one region.

On the other hand, without receiving such an input from the user, the automatic setting unit 1032 automatically divides the movement trajectories calculated by the motion analysis unit 102 into subsets. For example, by reference to the motions detected by the motion analysis unit 102, the automatic setting unit 1032 classifies a region having a motion larger than a predetermined threshold as one region and divides a region not having a motion larger than the threshold into subsets. As a result, the automatic setting unit 1032 automatically divides the movement trajectories into subsets. Also, the motions detected by the motion analysis unit 102 may be temporally accumulated, so that a region having a larger cumulative value is set as one region.

For example, the image capturing range is known in advance in the case of a fixed camera with pan, tilt, and zoom capabilities that is employed in a monitoring system or the like. On this account, a region in which the moving object is to move in the image can be previously determined in many cases. For such a case, a degree of accuracy in particular can be prevented from decreasing.

The segmentation unit 103*b* can avoid the risk of reducing the accuracy of the geodesic distance calculation, the risk being caused when the region of the image including the moving object is divided into subsets. Thus, the segmentation unit 103*b* can keep the accuracy of detecting the moving object from decreasing.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be used as an apparatus which detects the whole or a part of a moving object in a video sequence. To be more specific, the present invention can be used as a moving object detection apparatus which detect a moving object in a video sequence by performing region extraction on an image including the moving object such as a person that moves and changes shape, on the basis of motions in blocks between images, each block including one or more pixels. For example, the present invention can be used as a motion analysis apparatus, a monitoring apparatus, and a moving object detection apparatus built in an AV appliance such as a video camera or a TV.

What is claimed is:

1. A moving object detection apparatus which detects a moving object in a video sequence by extracting a region corresponding to a whole or a part of an image of the moving object, said moving object detection apparatus comprising:
   an image receiving unit configured to receive a set of images included in the video sequence;
   a motion analysis unit configured to calculate movement trajectories, each of the movement trajectories being calculated by: detecting a motion of the image between a pair of images included in the set of images, for each pair of blocks included in the pair of images, each block having one or more pixels; and concatenating motions detected from all pairs of images included in the set of images;
   a segmentation unit configured to perform segmentation so that the movement trajectories are divided into subsets, and to set a part of the movement trajectories as a common point shared by the subsets;
   a distance calculation unit configured to calculate a distance representing a similarity between a pair of movement trajectories, for each of the subsets;
   a geodesic distance calculation unit configured to transform the distance calculated by said distance calculation unit into a geodesic distance;
   an approximate geodesic distance calculation unit configured to calculate an approximate geodesic distance bridging over the subsets, by integrating geodesic distances including the common point, among the geodesic distances obtained by said geodesic distance calculation unit; and
   a region extraction unit configured to extract at least one region from the video sequence, by performing clustering using the calculated approximate geodesic distance so that blocks having similar movement trajectories are classified into one region.

2. The moving object detection apparatus according to claim 1,
   wherein said image receiving unit is configured to receive sets of images corresponding to video sequences captured by cameras, respectively,
   said motion analysis unit is configured to calculate the movement trajectories for each of the video sequences,
   said segmentation unit is configured to hold the movement trajectories calculated for each of the video sequences as one subset, and
   said region extraction unit is configured to extract at least one region from the video sequences by performing the clustering.

3. The moving object detection apparatus according to claim 1,
   wherein said segmentation unit is configured to perform the segmentation, so as to divide the movement trajectories into the subsets on the image in a position space of the blocks corresponding to the movement trajectories.

4. The moving object detection apparatus according to claim 3,
   wherein said segmentation unit is configured to perform the segmentation, so as to divide the movement trajectories into the subsets according to a spatial segmentation designated by a user for the video sequence.

5. The moving object detection apparatus according to claim 3,
   wherein said segmentation unit is configured to perform the segmentation so that subsets close to each other, among the subsets, partly overlap one another, and to set a movement trajectory included in, an overlapping region as the common points.

6. The moving object detection apparatus according to claim 3,
   wherein said segmentation unit is configured to set, as the common points set for each of the subsets, a movement trajectory, among the movement trajectories included in the subset, which is located close to a boundary with an adjacent subset.

7. The moving object detection apparatus according to claim 1,
   wherein each of the movement trajectories is represented by a multidimensional vector, and
   said segmentation unit is configured to perform the segmentation, so as to divide the movement trajectories into the subsets in a multidimensional vector space expressing the multidimensional vector.

8. The moving object detection apparatus according to claim 1,
   wherein said geodesic distance transformation unit is configured to transform each of the distances calculated by said distance calculation unit into the geodesic distance, by calculating a shortest path between a pair of movement trajectories calculated by said motion analysis unit, the shortest path being obtained by combining short distances satisfying a predetermined condition, among the distances calculated by said distance calculation unit.

9. The moving object detection apparatus according to claim 8,
wherein said geodesic distance transformation unit is configured to transform each of the distances calculated by said distance calculation unit into the geodesic distance, by calculating the shortest path after: selecting a predetermined number of distances in ascending order, from among distances each between a pair of movement trajectories included in an individual subset; and performing nonlinear processing to change an unselected distance into an infinite distance.

10. The moving object detection apparatus according to claim 8,
wherein said geodesic distance transformation unit is configured to transform each of the distances calculated by said distance calculation unit into the geodesic distance, by calculating the shortest path after: selecting distances each being equal to or shorter than a threshold, from among distances each between a pair of movement trajectories included in an individual subset; and performing nonlinear processing to change an unselected distance into an infinite distance.

11. The moving object detection apparatus according to claim 1,
wherein said region extraction unit is configured to detect at least one discontinuous point in a distribution of the approximate geodesic distances calculated by said approximate geodesic distance calculation unit, and to perform the clustering so that the movement trajectories separated by a geodesic distance shorter than a gap of the detected discontinuous point are classified into one cluster.

12. The moving object detection apparatus according to claim 1,
wherein said region extraction unit is configured to perform dimensionality reduction on the approximate geodesic distance calculated by said approximate geodesic distance calculation unit, by calculating an eigenvalue and an eigenvector, and to perform the clustering in a lower-dimensionality space.

13. The moving object detection apparatus according to claim 1,
wherein said geodesic distance transformation unit is configured to generate criteria used for transforming the distance into the geodesic distance, and to transform the distance into the geodesic distance using each of the criteria so as to generate the geodesic distances for each of the criteria,
said approximate geodesic distance calculation unit is configured to integrate the geodesic distances for each of the criteria, and
said region extraction unit includes:
a candidate generation unit configured to generate a result of the region extraction as a candidate for each of the criteria, by extracting the region through the clustering performed on the integrated approximate geodesic distance corresponding to the criterion; and
a candidate selection unit configured to obtain an instruction regarding the number of classes, select a candidate having the number of extracted regions close to the obtained number of classes, from among the candidates generated by said candidate generation unit, and output the selected candidate as a result of the region extraction performed by said region extraction unit.

14. The moving object detection apparatus according to claim 13,
wherein said geodesic distance transformation unit is configured to generate a threshold as the criteria, and generate the geodesic distance for each of the criteria by combining distances shorter than the threshold, among the distances calculated by said distance calculation unit.

15. The moving object detection apparatus according to claim 1, further comprising
an image display unit configured to display a result of the region extraction performed by said region extraction unit by superimposing the result onto the image received by said image receiving unit.

16. The moving object detection apparatus according to claim 1, further comprising
a recording-transmitting unit configured: to determine a region on the image received by said image receiving unit according to a result of the region extraction performed by said region extraction unit; and to record and hold the result in association with the determined region or to transmit the result in association with the determined region to an external source via a transmission line.

17. The moving object detection apparatus according to claim 1,
wherein said image receiving unit is configured to receive a video sequence including two or more moving objects, and
said region extraction unit is configured to detect the two or more moving objects by performing the region extraction on the two or more moving objects.

18. The moving object detection apparatus according to claim 1, further comprising
a motion estimation unit configured to estimate a motion of the moving object, by calculating a representative movement trajectory from the movement trajectories of the blocks included in the region extracted by said region extraction unit and estimating a motion of the region on the basis of the representative movement trajectory.

19. A vector data classification apparatus which classifies vector data pieces into classes, each class including similar vector data pieces out of the vector data pieces, said vector data classification apparatus comprising:
a vector data receiving unit configured to receive vector data pieces;
a segmentation unit configured to perform segmentation so that the vector data pieces are divided into subsets each used for calculating a geodesic distance, and to set a part of the vector data pieces included in at least one of the subsets as a common point shared by the subsets;
a distance calculation unit configured to calculate a distance representing a similarity between a pair of vector data pieces, for each of the subsets;
a geodesic distance calculation unit configured to transform the distance calculated by said distance calculation unit into a geodesic distance which is a length of a path between the pair of vector data pieces via a vector data piece serving as a relay point;
an approximate geodesic distance calculation unit configured to calculate an approximate geodesic distance bridging over the subsets, by integrating geodesic distances including the common points, among the geodesic distances obtained by said geodesic distance calculation unit; and
a data classification unit configured to generate at least one class from the video sequence, by performing clustering using the calculated approximate geodesic distance so that similar vector data pieces are classified into one class.

20. A moving object detection method of detecting a moving object in a video sequence by extracting a region corresponding to a whole or a part of an image of the moving object, said moving object detection method comprising:

receiving a set of images included in the video sequence;

calculating movement trajectories, each of the movement trajectories being calculated by: detecting a motion of the image between a pair of images included in the set of images, for each pair of blocks included in the pair of images, each block having one or more pixels; and concatenating motions detected from all pairs of images included in the set of images;

performing segmentation so that the movement trajectories are divided into subsets, and setting a part of the movement trajectories as common points shared by the subsets;

calculating a distance representing a similarity between a pair of movement trajectories, for each of the subsets;

transforming the calculated distance into a geodesic distance;

calculating an approximate geodesic distance bridging over the subsets, by integrating geodesic distances including the common points, among the calculated geodesic distances; and extracting at least one region from the video sequence, by performing clustering using the calculated approximate geodesic distance so that blocks having similar movement trajectories are classified into one region.

21. A non-transitory computer-readable recording medium for use in a computer, the recording medium having a computer program recorded thereon for detecting a moving object in a video sequence by extracting a region corresponding to a whole or a part of the moving object, said computer program causing the computer to execute:

the steps included in the moving object detection method according to claim 20.

* * * * *